United States Patent
Sudou et al.

(10) Patent No.: US 10,477,090 B2
(45) Date of Patent: Nov. 12, 2019

(54) WEARABLE DEVICE, CONTROL METHOD AND NON-TRANSITORY STORAGE MEDIUM

(71) Applicant: KYOCERA Corporation, Kyoto-shi, Kyoto (JP)

(72) Inventors: Tomohiro Sudou, Yokohama (JP); Saya Miura, Yokohama (JP)

(73) Assignee: KYOCERA CORPORATION, Kyoto-shi, Kyoto ( * ) Notice: Subject to any disclaimer, the term of this patent is extended or adjusted under 35 U.S.C. 154(b) by 0 days.

(21) Appl. No.: 15/553,236

(22) PCT Filed: Feb. 24, 2016

(86) PCT No.: PCT/JP2016/055522
§ 371 (c)(1),
(2) Date: Aug. 24, 2017

(87) PCT Pub. No.: WO2016/136838
PCT Pub. Date: Sep. 1, 2016

(65) Prior Publication Data
US 2018/0063397 A1 Mar. 1, 2018

(30) Foreign Application Priority Data

Feb. 25, 2015 (JP) .................. 2015-035830
Mar. 30, 2015 (JP) .................. 2015-068613
Mar. 30, 2015 (JP) .................. 2015-068614

(51) Int. Cl.
*H04N 5/232* (2006.01)
*H04N 5/225* (2006.01)
(Continued)

(52) U.S. Cl.
CPC ........... *H04N 5/232* (2013.01); *G02B 27/017* (2013.01); *G02B 27/0172* (2013.01);
(Continued)

(58) Field of Classification Search
CPC .... H04N 5/232; H04N 5/2258; G02B 27/017; G02B 27/0172; G02B 27/0179;
(Continued)

(56) References Cited

U.S. PATENT DOCUMENTS 9,076,033 B1 * 7/2015 Barron ............... G06K 9/00355
2009/0109178 A1 * 4/2009 Kim ...................... G06F 3/0304
345/166

(Continued)

FOREIGN PATENT DOCUMENTS

JP 2000-138858 A 5/2000
JP 2006-279793 A 10/2006
(Continued)

OTHER PUBLICATIONS

International Search Report in PCT/JP2016/055522, dated Apr. 12, 2016.

*Primary Examiner* — Antoinette T Spinks
(74) *Attorney, Agent, or Firm* — Hauptman Ham, LLP

(57) ABSTRACT

A wearable device mountable on a head, the wearable device comprising: at least one imager configured to capture scenery in front of a user; and at least one controller configured to detect a shield in a captured image by the imager, wherein the at least one controller is further configured to execute acquisition of the captured image upon movement of the shield from an inside to an outside of an imaging range of the imager.

13 Claims, 30 Drawing Sheets

(51) Int. Cl.
*G02B 27/01* (2006.01)
*G02B 27/02* (2006.01)
*G06F 3/01* (2006.01)

(52) U.S. Cl.
CPC ......... *G02B 27/0179* (2013.01); *G02B 27/02* (2013.01); *G06F 3/011* (2013.01); *G06F 3/017* (2013.01); *H04N 5/2258* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ............ G02B 27/02; G02B 2027/0138; G02B 2027/014; G02B 2027/0178; G02B 2027/0187; G06F 3/011; G06F 3/017
See application file for complete search history.

(56) References Cited

U.S. PATENT DOCUMENTS

| 2014/0079285 | A1* | 3/2014 | Yamashita | G06T 7/20 |
| | | | | 382/103 |
| 2015/0277649 | A1* | 10/2015 | Tan | G06F 3/0416 |
| | | | | 345/173 |

FOREIGN PATENT DOCUMENTS

| JP | 2008-17501 | A | | 1/2008 |
| JP | 2010-146481 | A | | 7/2010 |
| JP | 2010-213057 | A | | 9/2010 |
| JP | 2012-235225 | A | | 11/2012 |
| JP | 2013-190925 | A | | 9/2013 |
| JP | 2013190925 | A | * | 9/2013 |
| JP | 2013-210643 | A | | 10/2013 |
| JP | 2014-241099 | A | | 12/2014 |
| JP | 2014241099 | A | * | 12/2014 |
| WO | 2014/128751 | A1 | | 8/2014 |
| WO | 2014/150728 | A1 | | 9/2014 |

\* cited by examiner

FIG.4

| STEP | CONTENTS VIEWED BY USER | STATE OF IMAGERS |
|---|---|---|
| S10 | | NON-ACTIVATED STATE |
| S11 | | IMAGING STANDBY STATE |
| S12 | | IMAGING STATE |

| STEP | CONTENTS VIEWED BY USER | STATE OF IMAGERS |
|---|---|---|
| S20 |  | IMAGING STANDBY STATE  |
| S21 |  | IMAGING STATE  |

| STEP | CONTENTS VIEWED BY USER | STATE OF IMAGERS |
|---|---|---|
| S31 |  | IMAGING STANDBY STATE  |
| S32 |  | MOVING IMAGING STANDBY STATE  |
| S33 |  | IMAGING STATE  |

| STEP | CONTENTS VIEWED BY USER | STATE OF IMAGERS |
|---|---|---|
| S51 |  | NON-ACTIVATED STATE |
| S52 |  | NON-ACTIVATED STATE |
| S53 |  | IMAGING STANDBY STATE |
| S54 |  | IMAGING STATE |

FIG.17

| STEP | CONTENTS VIEWED BY USER | STATE OF IMAGERS |
|---|---|---|
| S130 | | IMAGING STANDBY STATE |
| S131 | | IMAGING STANDBY STATE |

FIG.19

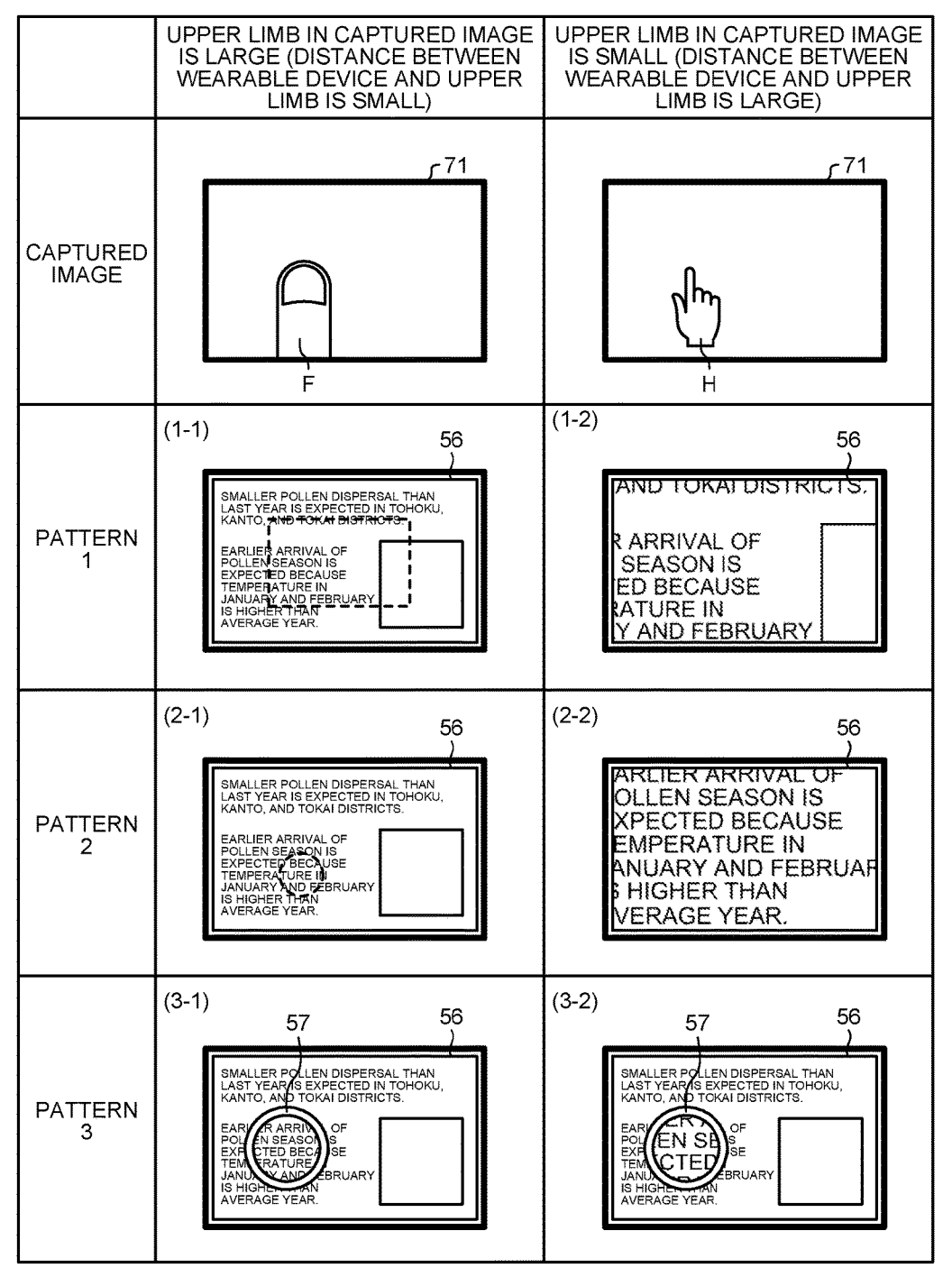

| | UPPER LIMB IN CAPTURED IMAGE IS LARGE (DISTANCE BETWEEN WEARABLE DEVICE AND UPPER LIMB IS SMALL) | UPPER LIMB IN CAPTURED IMAGE IS SMALL (DISTANCE BETWEEN WEARABLE DEVICE AND UPPER LIMB IS LARGE) |
|---|---|---|
| CAPTURED IMAGE | | |
| PATTERN 1 | (1-1) | (1-2) |
| PATTERN 2 | (2-1) | (2-2) |
| PATTERN 3 | (3-1) | (3-2) |

| STEP | CONTENTS VIEWED BY USER | STATE OF IMAGERS |
|---|---|---|
| S150 |  | IMAGING STANDBY STATE |
| S151 |  | IMAGING STANDBY STATE |
| S152 |  | IMAGING STANDBY STATE |
| S153 |  | IMAGING STATE |

FIG.23

| SIZE P OF UPPER LIMB (%)/DISTANCE L BETWEEN UPPER LIMB AND WEARABLE DEVICE (cm) | PATTERN P1 | | PATTERN P2 | |
|---|---|---|---|---|
| | CONVERTED VALUE P'/L' | ENLARGEMENT AND REDUCTION RATE (%) | CONVERTED VALUE P'/L' | ENLARGEMENT AND REDUCTION RATE (%) |
| ... | ... | ... | ... | ... |
| 41-50/10-14 | 110 | 110 | # | # |
| 31-40/15-19 | 120 | 120 | # | # |
| 21-30/20-24 | 130 | 130 | # | # |
| 11-20/25-29 | 140 | 140 | 140 | 140 |
| 1-10/30-34 | 150 | 150 | 150 | 150 |
| ... | ... | ... | ... | ... |

| STEP | DISPLAY CONTENTS |
|---|---|
| S160 |  |
| S161 |  |
| S162 |  |

| STEP | DISPLAY CONTENTS | DISTANCE BETWEEN WEARABLE DEVICE 1 AND UPPER LIMB |
|---|---|---|
| S170 |  |  |
| S171 |  |  |
| S172 |  |  |

| STEP | STEP | STEP |
|---|---|---|
| S180 |  |  |
| S181 |  |  |

FIG.28

| STEP | CONTENTS VIEWED BY USER | STATE OF IMAGERS |
|---|---|---|
| S230 | IMAGING STANDBY STATE | |
| S231 | IMAGING STANDBY STATE | |
| S232 | IMAGING STANDBY STATE | |
| S233 | IMAGING STATE | |

WEARABLE DEVICE, CONTROL METHOD AND NON-TRANSITORY STORAGE MEDIUM

RELATED APPLICATIONS

The present application is a National Phase of International Application Number PCT/JP2016/055522, filed Feb. 24, 2016, which claims priority to JP 2015-035830, filed Feb. 25, 2015, JP 2015-068613, filed Mar. 30, 2015, and JP 2015-068614, filed Mar. 30, 2015.

FIELD

The present application relates to a wearable device mountable on a head of a user, a control method, and a non-transitory storage medium.

BACKGROUND

A wearable device including a head mounted display device with a display arranged in front of eyes and an infrared ray detection unit capable of recognizing a motion of a finger, and being operated by gestures of both hands, is disclosed.

SUMMARY

A wearable device mountable on a head of a user, a control method and a non-transitory storage medium are disclosed.

According to one aspect, there is provided a wearable device mountable on a head, the wearable device comprising: at least one imager configured to capture scenery in front of a user; and at least one controller configured to detect a shield in a captured image by the imager, wherein the at least one controller is further configured to execute acquisition of the captured image upon movement of the shield from an inside to an outside of an imaging range of the imager.

According to one aspect, there is provided a control method executed by a wearable device mountable on a head, the control method comprising: capturing scenery in front of a user by at least one imager; detecting a shield from a captured image by the imager; and executing acquisition of the captured image upon movement of the shield from an inside to an outside of an imaging range of the imager.

According to one aspect, there is provided a non-transitory storage medium that stores a control program for causing a wearable device mountable on a head to execute: capturing scenery in front of a user by at least one imager; detecting a shield from a captured image by the imager; and executing acquisition of the captured image upon movement of the shield from an inside to an outside of an imaging range of the imager.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 4 is a diagram illustrating an example of an imaging function by the wearable device.
FIG. 17 is a diagram for describing an example of control provided by a control program of the wearable device.
FIG. 19 is a diagram illustrating an example of performing various types of change processing.
FIG. 23 is a diagram illustrating an example of a conversion table in which a size of an upper limb in a captured image and a converted value are associated with each other.

FIG. 28 is a diagram for describing another example of the control provided by the control program of the wearable device.

DETAILED DESCRIPTION OF THE PREFERRED EMBODIMENTS

Hereinafter, the present application will be described in detail with reference to drawings. The present application is not limited by descriptions below. Configuration elements in the descriptions below include elements easily conceived by a person skilled in the art, elements substantially the same, and elements within the scope of so-called equivalents.

(Embodiments)

Figure 1:
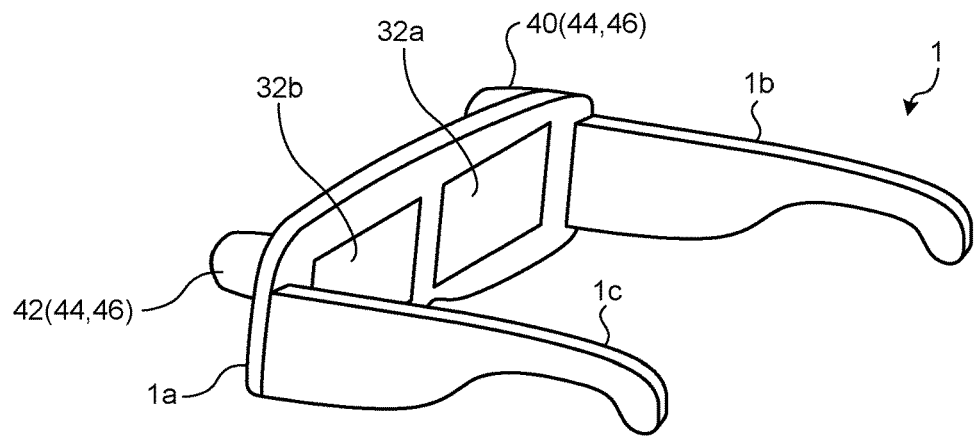
FIG. 1 is a perspective view of a wearable device.
Figure 2:
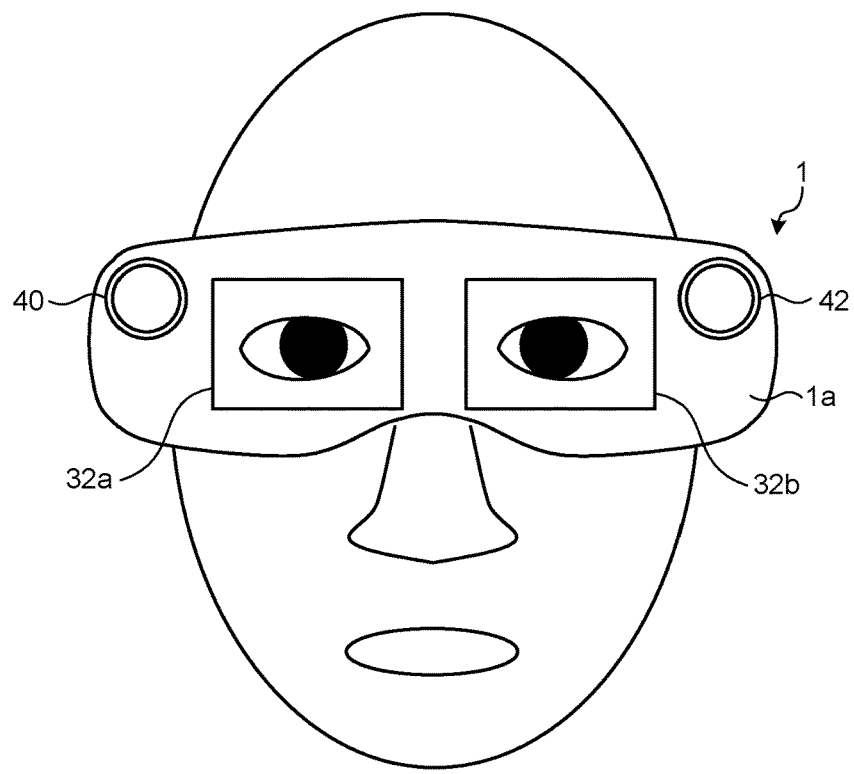
FIG. 2 is a diagram of the wearable device mounted by a user, as viewed from the front.

First of all, an overall configuration of a wearable device 1 will be described with reference to FIGS. 1 and 2. FIG. 1 is a perspective view of the wearable device 1. FIG. 2 is a diagram of the wearable device 1 mounted by a user, as viewed from the front. As illustrated in FIGS. 1 and 2, the wearable device 1 is a head-mount type device mounted on a head of a user.

The wearable device 1 includes a front surface portion 1a, a side surface portion 1b, and a side surface portion 1c. The front surface portion 1a is arranged in the front of the user to cover both eyes of the user when mounted. The side surface portion 1b is connected to one end portion of the front surface portion 1a, and the side surface portion 1c is connected to the other end portion of the front surface portion 1a. The side surface portions 1b and 1c are supported by ears of the user like temples of a pair of glasses when mounted, and stabilizes the wearable device 1. The side surface portions 1b and 1c may be connected on the back of the head of the user when mounted.

The front surface portion 1a includes a display 32a and a display 32b in a surface facing the eyes of the user when mounted. The display 32a is arranged in a position facing the right eye of the user when mounted and the display 32b is arranged in a position facing the left eye of the user when mounted. The display 32a displays an image for the right eye and the display 32b displays an image for the left eye. In this way, the displays 32a and 32b that display images corresponding to the respective eyes of the user when mounted are provided. Therefore, wearable device 1 can realize three-dimensional display using a parallax of both eyes.

The displays 32a and 32b are a pair of semitransparent displays. However, embodiments are not limited thereto. For example, lenses such as spectacle lenses, sunglass lenses, or UV-cut lenses may be provided, and the displays 32a and 32b may be provided separately from the lenses. The displays 32a and 32b may be configured as a single display device if it can independently provide different images to the right eye and the left eye of the user.

The front surface portion 1a includes an imager 40 and an imager 42 on a surface opposite to the surface where the displays 32a and 32b are provided. The imager 40 is arranged near one end portion (a right eye side when mounted) of the front surface portion 1a, and the imager 42 is provided near the other end portion (a left eye side when mounted) of the front surface portion 1a. The imager 40 acquires an image in a range corresponding to a field of view of the right eye of the user. The imager 42 acquires an image in a range corresponding to a field of view of the left eye of the user. The field of view means a field of view of the user facing front, for example.

The wearable device 1 has a function to visually provide various types of information on viewed foreground of the user. The foreground means scenery in front of the user. In a case where the displays 32a and 32b do not perform the displaying, the wearable device 1 visually provides the foreground through the displays 32a and 32b. In a case where the displays 32a and 32b perform the displaying, the wearable device 1 visually provides the foreground through the displays 32a and 32b, and contents for the displays 32a and 32b. The wearable device 1 may display three-dimensional information in the displays 32a and 32b.

FIGS. 1 and 2 illustrate an example in which the wearable device 1 has a shape like a pair of glasses. However, the shape of the wearable device 1 is not limited thereto. For example, the wearable device 1 may have a shape of a pair of goggles. The wearable device 1 may be connected with an external device such as an information processing device or a battery device by wired or wireless means.

Figure 3:
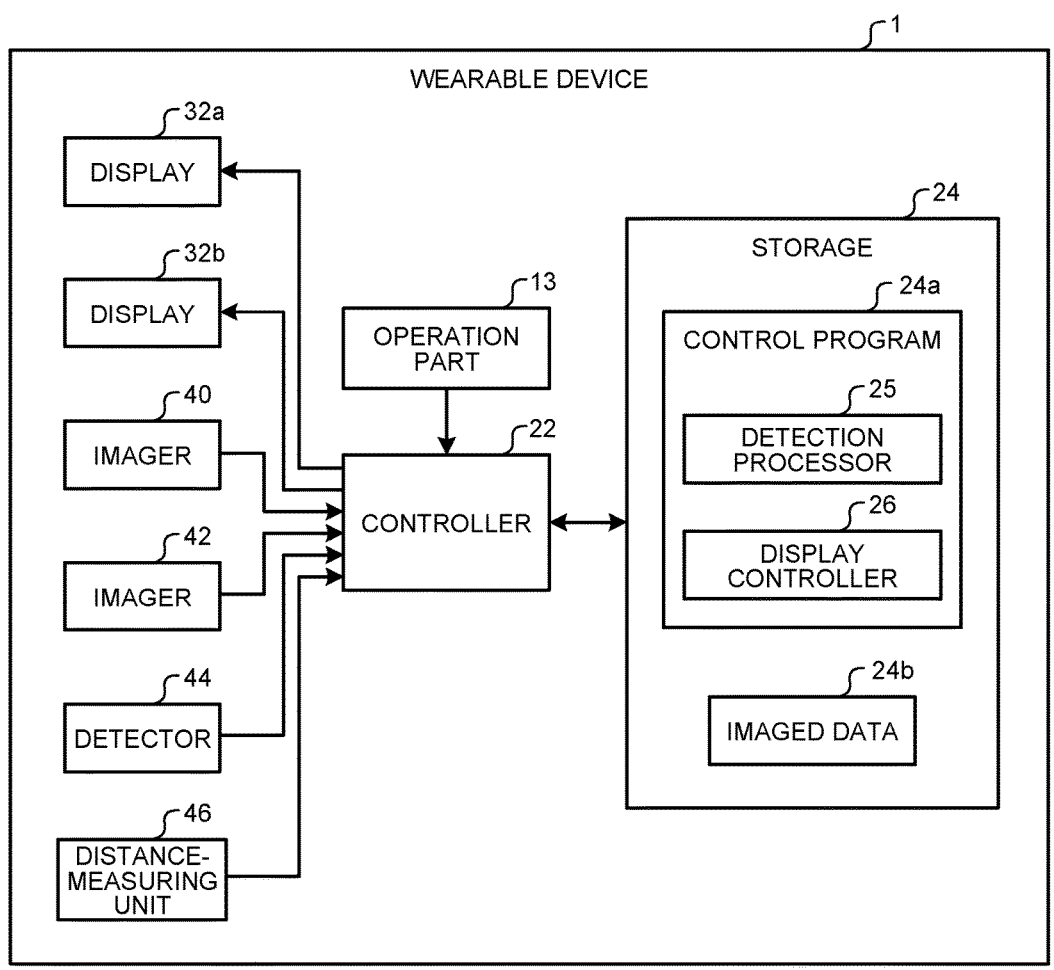
FIG. 3 is a block diagram of the wearable device.

Then, a functional configuration of the wearable device 1 will be described with reference to FIG. 3. FIG. 3 is a block diagram of the wearable device 1. As illustrated in FIG. 3, the wearable device 1 includes an operation part 13, a controller 22, a storage 24, displays 32a and 32b, imagers 40 and 42, a detector 44, and a distance-measuring unit 46. The operation part 13 receives basic operations such as activation, stop, and change of an operation mode, of the wearable device 1.

Each of the displays 32a and 32b includes a semitransparent or transparent display device such as a liquid crystal display or an organic electro-luminescence (EL) panel. The displays 32a and 32b display various types of information according to control signals input from the controller 22. Each of the displays 32a and 32b may be a projector that projects an image on the retina of the user, using a light source such as a laser beam.

Each of the imagers 40 and 42 electronically captures images, using an image sensor such as charge coupled device image sensor (CCD) or complementary metal oxide semiconductor (CMOS). Then, each of the imagers 40 and 42 converts the captured image into a signal and output the signal to the controller 22.

The detector 44 detects a real object (a predetermined object) existing in an imaging range or surrounding neighborhood of the imaging range of the imagers 40 and 42 (or the foreground). The detector 44 detects an object (corresponding to a shield or a predetermined object that shields the foreground) that is matched with a shape (for example, a shape of a hand or each of fingers and thumb of a human) registered in advance, among the real objects existing in the imaging range, for example. The detector 44 may detect a range (a shape and a size) of a real object in an image based on brightness, saturation, an edge of hue, and the like, of pixels, the shape of the real object being not registered in advance.

The detector 44 includes a sensor that detects the real object existing in the imaging range. The sensor is a sensor that detects the real object existing in the imaging range, using at least one of visible light, infrared light, ultraviolet light, an electric wave, a sound wave, magnetism, and capacitance, for example. The detector 44 detects movement of an object from an inside to an outside of the imaging range, for example, based on multiple detection results. The detector 44 may be able to detect the real object existing in a wider range than the imaging range.

The distance-measuring unit 46 measures a distance to the real object. The distance to the real object is measured for each eye, using positions of the respective eyes of the user who mounts the wearable device 1 as references. Therefore, in a case where the reference positions with which the distances are measured by the distance-measuring unit 46 deviate from the respective eyes, measured values of the distance-measuring unit 46 are corrected to indicate the distances to the positions of the eyes according to the deviation.

The distance-measuring unit 46 includes a sensor that detects a distance to the real object. The sensor is a sensor that detects the distance to the real object, using at least one of visible light, infrared light, ultraviolet light, an electric wave, a sound wave, magnetism, and capacitance, for example. The controller 22 described below can calculate a distance between the wearable device 1 and a predetermined object (for example, an upper limb of the user) in a front and back direction of the user based on the detection result of the distance-measuring unit 46.

In the present embodiment, the imagers 40 and 42 also serve as the detector 44 and the distance-measuring unit 46. That is, the imagers 40 and 42 analyze the captured images to detect the object inside the imaging range. The imagers 40 and 42 analyze the captured images to estimate change of a distance between the object inside the imaging range and the wearable device. Alternatively, the imagers 40 and 42 detect whether the object inside the imaging range is moved to a position closer to the wearable device or moved to a position farther from the wearable device. Further, the imagers 40 and 42 as the distance-measuring unit 46 may compare an object included in a captured imaged by the imager 40 and an object included in a captured imaged by the imager 42 to measure (calculate) the distance to the object.

The controller 22 includes a central processing unit (CPU) as calculation means and a memory as storage means, and executes programs, using the hardware resources, to realize various functions. Specifically, the controller 22 reads and loads programs and data stored in the storage 24, and causes the CPU to execute commands included in the programs loaded to the memory. Then, the controller 22 reads and writes data from/to the memory and the storage 24, and controls operations of the displays 32a and 32b, and the like, according to execution results of the commands by the CPU. When the CPU executes the commands, the data loaded into the memory and operations detected through the detector 44 are used as a part of parameters and determination conditions.

The storage 24 includes a storage device with non-volatility such as a flash memory, and stores various programs and data. The programs stored in the storage 24 include a control program 24a. The data stored in the storage 24 include imaged data 24b. The storage 24 may be configured from a combination of a portable storage medium such as a memory card, and a reading and writing device that performs read and write from/to the storage medium. In this case, the control program 24a and the imaged data 24b may be stored in the storage medium. The control program 24a may be acquired from another device such as a server device by wireless or wired communication.

The control program 24a provides functions regarding various types of control for operating the wearable device 1. The functions provided by the control program 24a include a function to control imaging of the imagers 40 and 42, a function to control displaying of the displays 32a and 32b, and the like.

The control program 24a includes a detection processor 25 and a display controller 26. The detection processor 25 provides a function to detect the real object existing in the imaging range of the imagers 40 and 42. The function provided by the detection processor 25 includes a function to measure distances to the respective detected objects. The display controller 26 provides a function to manage correspondence between a display state and the imaging range of the displays 32a and 32b. The control program 24a includes a function to detect existence/non-existence of an operation or a type of the operation of the real object from the captured images by the imagers 40 and 42, the detection result of the detector 44, and the like.

The imaged data 24b is data indicating images of the imaging range imaged by the imagers 40 and 42. The imaged data 24b may be synthesized data of the images imaged by the imagers 40 and 42 or may be data indicating respective images of the imagers 40 and 42. The imaged data 24b includes still image data and moving image data.

Figure 5:
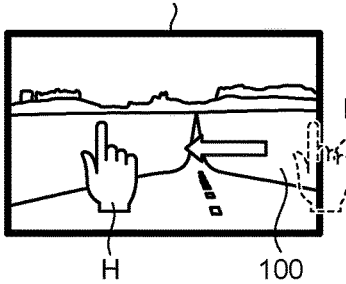
FIG. 5 is a diagram illustrating another example of the imaging function by the wearable device.

Then, an example of control based on an imaging function provided by the control program 24a of the wearable device 1 will be described with reference to FIGS. 4 and 5. FIG. 4 is a diagram illustrating an example of an imaging function by the wearable device 1. FIG. 5 is a diagram illustrating another example of the imaging function by the wearable device 1. In the description below, similar configuration elements are denoted with the same reference sign, and overlapping description may be omitted.

In FIGS. 4 and 5, contents viewed by the user indicate foreground 100 inside an imaging range R viewed by the user through the displays 32a and 32b in a state where the user mounts the wearable device 1 on the head. States of the imagers 40 and 42 indicate states of the imagers 40 and 42 corresponding to the contents viewed by the user. The imagers 40 and 42 have states such as a non-activated state, an imaging standby state, and imaging state, for example. The non-activated state is a state in which the imagers 40 and 42 are not activated. The imaging standby state is a state to wait for acquiring captured images by the imagers 40 and 42. The imaging state is a state to acquire the captured images by the imagers 40 and 42. The imaging range R is a synthesized range of the imaging ranges of the imagers 40 and 42.

At Step S10 illustrated in FIG. 4, the user views the foreground 100 inside the imaging range R of the imagers 40 and 42 through the displays 32a and 32b. In the present embodiment, the foreground 100 outside the imaging range R is omitted. However, the user views the foreground 100 between the front surface portion 1a (frame) of the wearable device 1 and the imaging range R. In the example illustrated in FIG. 4, the wearable device 1 does not display the frame in the imaging range R. Therefore, the user does not view the frame in the imaging range R. At Step S10, the wearable device 1 detects an object by the detector 44 while maintaining the non-activated state of the imagers 40 and 42.

At Step S11, the user moves the right hand H with a raised index finger from a right side to a center in front of the wearable device 1. In this case, the user views the right hand H moving in front of the wearable device 1 and the foreground 100, inside the imaging range R, through the displays 32a and 32b. The viewing inside the imaging range R means the viewing of a space in front of the user, the space corresponding to the imaging range R.

When the right hand H is detected by the detector 44 at Step S11, the wearable device 1 determines whether the right hand H is moved from the outside to the inside of the imaging range R based on change of a position of the detected right hand H. When movement of the right hand H to the inside of the imaging range R is detected, the wearable device 1 activates the imagers 40 and 42 to transfer the imagers 40 and 42 from the non-activated state to the imaging standby state. The wearable device 1 temporarily stores, in the storage 24, video data 70 sequentially transmitted from the imagers 40 and 42 in the imaging standby state.

At Step S12, when the user moves the right hand H to the vicinity of the center in front of the wearable device 1, the user turns the right hand H at the vicinity of the center of the wearable device 1 and moves the right hand H in a reverse direction toward the right side of the wearable device 1. In this case, the user views the right hand H moving toward the outside of the imaging range R in front of the wearable device 1 and the foreground 100 in the imaging range R through the displays 32a and 32b.

At Step S12, the wearable device 1 determines whether the right hand H is moved from the inside to the outside of the imaging range R based on the detection result of the detector 44. When it is determined that the right hand H is moved to the outside of the imaging range R, the wearable device 1 transfers the imagers 40 and 42 to the imaging state to image the foreground 100. The imagers 40 and 42 image the foreground 100 at a preset focal point. The wearable device 1 acquires a captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

In this way, the wearable device 1 acquires the captured image 71 by the imagers 40 and 42 upon the movement of the upper limb of the user from the inside to the outside of the imaging range R of the imagers 40 and 42. Thus, the user can capture an image in front by the imagers 40 and 42 by simply performing a gesture to move the upper limb in front of the wearable device 1. For example, even if a photo opportunity suddenly occurs, the user can perform imaging at the photo opportunity by instantaneously performing the gesture. As a result, the wearable device 1 can improve operability and convenience of the imagers 40 and 42. The "upper limb" in the present specification means an arm or a hand of a person, and is defined to include at least one of an upper arm, a forearm, a hand, fingers and a thumb.

When the upper limb of the user is detected inside the imaging range R by the detector 44, the wearable device 1 activates the imagers 40 and 42. With the configuration, the wearable device 1 activates the imagers 40 and 42 at timing when the user performs imaging, and thus can achieve power saving. For example, the wearable device 1 is effectively applied to a spectacle type device or a head-mount type device having difficulty in mounting a large-capacity battery.

The example illustrated in FIG. 5 is a modification of the example illustrated in FIG. 4, in which the wearable device 1 detects an imaged position to be focused, based on a movement of the upper limb of the user.

At Step S11 illustrated in FIG. 5, the user moves the right hand H with a raised index finger from the right side to the center in front of the wearable device 1. In this case, the user views the right hand H moving in front of the wearable device 1 and the foreground 100, inside the imaging range R, through the displays 32a and 32b.

When the right hand H is detected by the detector 44 at Step S11, the wearable device 1 determines whether the right hand H is moved from the outside to the inside of the imaging range R based on change of the position of the right hand H. When the movement of the right hand H to the inside of the imaging range R is detected, the wearable device 1 activates the imagers 40 and 42 to transfer the imagers 40 and 42 from the non-activated state to the imaging standby state. The wearable device 1 temporarily stores, in the storage 24, the video data 70 sequentially transmitted from the imagers 40 and 42 in the imaging standby state.

At Step S12, when the user moves the right hand H to the position to be focused of the foreground 100 to be imaged, the user turns the right hand H at the position to be focused, and moves the right hand H in a reverse direction toward the right side of the wearable device 1. In this case, the user views the right hand H moving from the position to be focused to the outside of the imaging range R in front of the wearable device 1 and the foreground 100 in the imaging range R through the displays 32a and 32b.

At Step S12, the wearable device 1 determines whether the right hand H is moved from the inside to the outside of the imaging range R based on the detection result of the detector 44. When it is determined that the right hand H is moved to the outside of the imaging range R, the wearable device 1 estimates a movement locus L inside the imaging range R of the right hand H based on the stored video data 70.

For example, the wearable device 1 estimates the movement locus L reaching the outside of the imaging range R, focusing on a fingertip of the right hand H or the like. The wearable device 1 estimates a start position from which the user moves the right hand H to the outside of the imaging range R, based on the estimated movement locus L. A method of estimating the start position includes a method of estimating the start position based on a change point of the movement locus L before the right hand H is moved to the outside of the imaging range R, for example. In the method of estimating the start position, a position where the right hand H resumes the movement after stop for a predetermined time may be considered as the change point of the movement locus L. In the method of estimating the start position, a position where the direction of the locus is first changed, tracing back the movement locus L from a predetermined position of the right hand H moved to the outside of the imaging range R, may be considered as the change point of the movement locus L.

At Step S13, when the wearable device 1 estimates a position Lc to be focused based on the movement locus L of the right hand H, the wearable device 1 sets the focal point of the imagers 40 and 42 at the position Lc to be focused, and causes the imagers 40 and 42 to be the imaging state to image the foreground 100. The imagers 40 and 42 image the foreground 100 with the set focal point. The position Lc to be focused is the above-described change point of the movement locus L, for example. The wearable device 1 acquires the captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

As a method of defining the position Lc to be focused, a method other than the method of estimating the position to be focused based on the change point of the movement locus L may be employed. For example, when the movement of the right hand H to the outside of the imaging range R is detected after the movement of the right hand H in the forward direction (or an opposite direction to the forward direction) in the imaging range R is detected, based on the detection results of the detector 44 and the distance-measuring unit 46, the position where the movement of the right hand H in the forward direction is detected may be considered as the position Lc to be focused.

In this way, the wearable device 1 acquires the captured image 71 by the imagers 40 and 42 at the position to be focused according to the movement locus L of the upper limb, upon the movement of the upper limb of the user from the inside to the outside of the imaging range R of the imagers 40 and 42. With the configuration, the user can image a front image at the specified position to be focused by the imagers 40 and 42, by simply performing a gesture to move the upper limb in front of the wearable device 1. As a result, the wearable device 1 can improve operability and convenience of the imagers 40 and 42.

Figure 6:
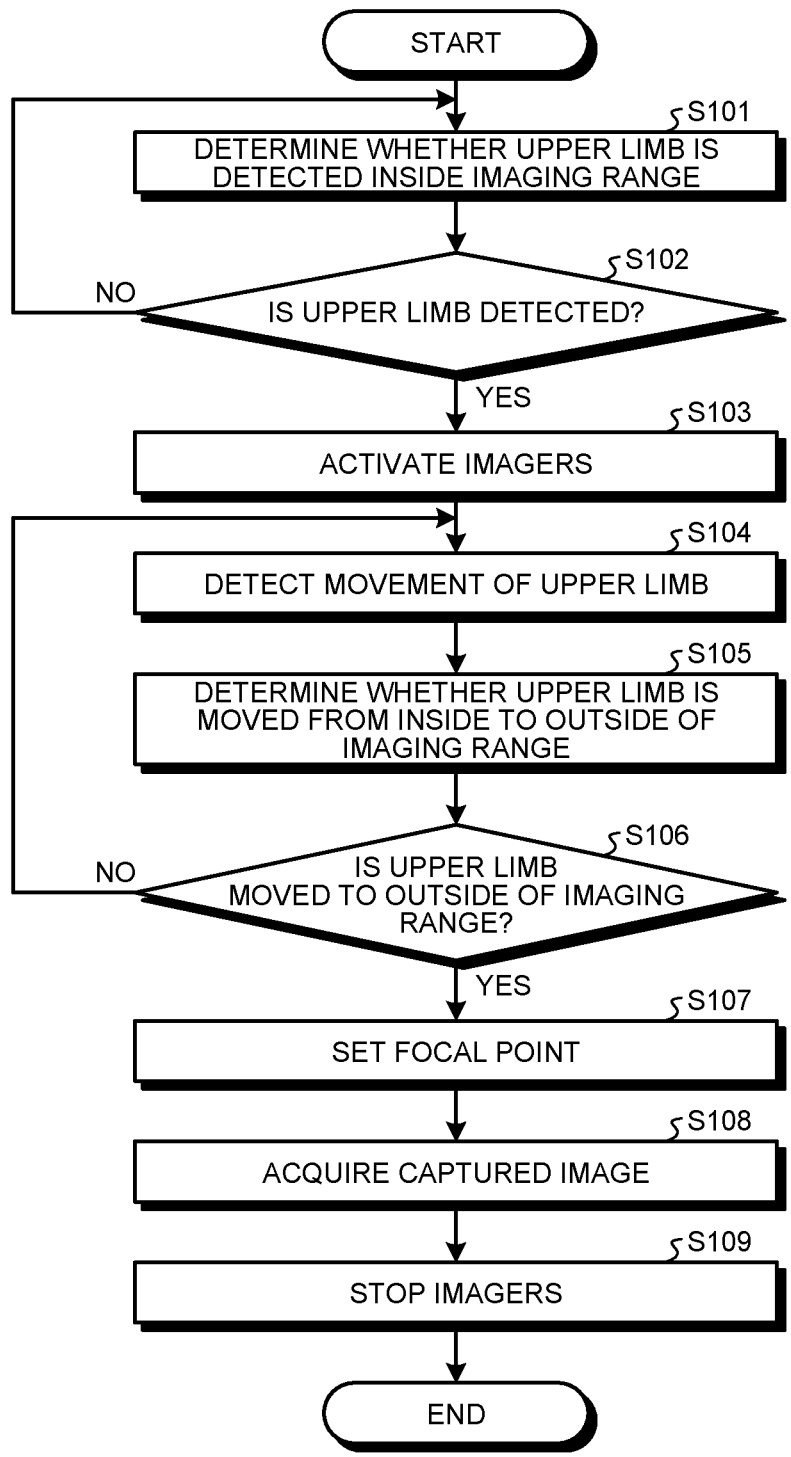
FIG. 6 is a flowchart illustrating a processing procedure according to imaging control by the wearable device.

A processing procedure of control regarding imaging by the wearable device 1 will be described with reference to FIG. 6. FIG. 6 is a flowchart illustrating a processing procedure according to imaging control by the wearable device 1. The processing procedure illustrated in FIG. 6 is realized when the controller 22 executes the control program 24a. The processing procedure illustrated in FIG. 6 is repeatedly executed when the wearable device 1 is mounted on the head or when the wearable device 1 is being operated.

As illustrated in FIG. 6, at Step S101, the controller 22 of the wearable device 1 determines whether the upper limb is detected inside the imaging range R. Specifically, when the detector 44 detects the upper limb, the controller 22 determines that the upper limb is detected. When the detector 44 does not detect the upper limb (Step S102: No), the controller 22 re-executes the processing of Step S101.

When the upper limb is detected (Step S102: Yes), the controller 22 proceeds to Step S103. The controller 22 activates the imagers 40 and 42 at Step S103. At Step S104, the controller 22 detects the movement of the upper limb inside the imaging range R based on the video data 70 of the imagers 40 and 42.

At Step S105, the controller 22 determines whether the upper limb is moved from the inside to the outside of the imaging range R based on the detection result of Step S104. Specifically, when it is detected that the entire upper limb is moved to the outside of the imaging range R so that the upper limb does not appear in the captured image 71, the controller 22 determines that the upper limb is moved to the outside of the imaging range R. When the upper limb is not moved to the outside of the imaging range R (Step S106: No), the controller 22 re-executes the processing of Step S104 and subsequent steps.

When the upper limb is moved to the outside of the imaging range R (Step S106: Yes), the controller 22 proceeds to Step S107. At Step S107, the controller 22 sets a focal point. Specifically, the controller 22 sets a focal point that is a preset initial value. Alternatively, the controller 22 estimates the position Lc to be focused based on the movement locus L of the upper limb, and sets a focal point for the position Lc to be focused.

At Step S108, the controller 22 acquires the captured image 71. Specifically, the controller 22 causes the imagers 40 and 42 to image the foreground 100 at the focal point set at Step S107, acquires the captured image 71, and stores the acquired captured image 71 in the storage 24 as the imaged data 24b. After that, at Step S109, the controller 22 stops the imagers 40 and 42. When the imagers 40 and 42 are stopped, the controller 22 terminates the processing procedure illustrated in FIG. 6.

Figure 7:
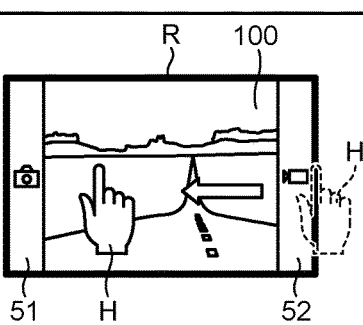
FIG. 7 is a diagram illustrating an example of control according to imaging of a still image by the wearable device.
Figure 7:
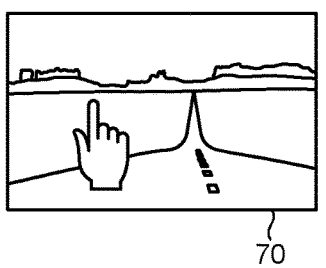
Figure 7:
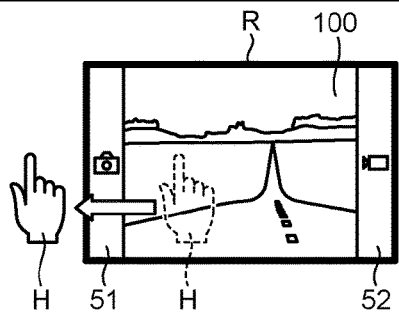
Figure 7:
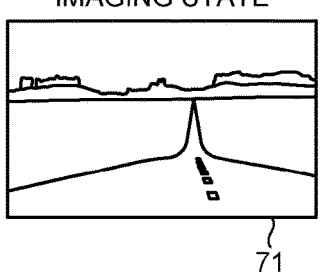

Then, an example of control based on the imaging function provided by the control program 24a will be described with reference to FIGS. 7 and 8. FIG. 7 is a diagram illustrating an example of control according to imaging of a still image by the wearable device 1.

At Step S20 illustrated in FIG. 7, when entry of the right hand H into the imaging range R is detected by the detector 44, the wearable device 1 transfers the imagers 40 and 42 to the imaging standby state. The wearable device 1 causes the displays 32a and 32b to display icons 51 and 52 for prompting the user to select a still image or a moving image in such a manner that the icons 51 and 52 are displayed inside the imaging range R. In the example illustrated in FIG. 7, the wearable device 1 displays the icon 51 on a left side in the imaging range R, the icon 51 indicating a still image, and the icon 52 on a right side in the imaging range R, the icon 52 indicating a moving image. In the present embodiment, a case in which the wearable device 1 displays the icons 51 and 52 inside the imaging range R is described. However, the wearable device 1 may display the icons 51 and 52 outside the imaging range R. The wearable device 1 temporarily stores, in the storage 24, the video data 70 sequentially transmitted from the imagers 40 and 42 in the imaging standby state.

At Step S20, when the user moves the right hand H from the outside to the inside of the imaging range R of the imagers 40 and 42, the user views the icons 51 and 52 on the displays 32a and 32b, and views the foreground 100 and the right hand H through the displays 32a and 32b. The user views the icons 51 and 52, thereby to recognize that the wearable device 1 can perform imaging.

At Step S21, when the user wishes to image a still image, the user moves the right hand H in such a manner that the right hand H inside the imaging range R passes through the icon 51 and goes outside the imaging range R. In this case, the user views the right hand H moving from the icon 51 side to the outside of the imaging range R in front of the wearable device 1 and the foreground 100, inside the imaging range R, through the displays 32a and 32b.

At Step S21, the wearable device 1 determines whether the right hand H is moved from the inside to the outside of the imaging range R based on the detection result of the detector 44. When it is determined that the right hand H is moved to the outside of the imaging range R, and it is detected that the right hand H passes through the icon 51 (or the moving direction of the right hand H is the direction toward the icon 51 for a still image), the wearable device 1 determines that imaging of a still image is selected by the user. The wearable device 1 causes the imagers 40 and 42 to be the imaging state to image the foreground 100 as a still image. The imagers 40 and 42 image the foreground 100 as a still image at a preset focal point. The wearable device 1 acquires the captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

Figure 8:
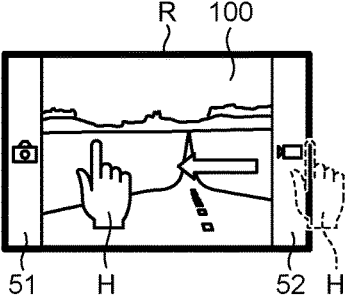
FIG. 8 is a diagram illustrating an example of control according to imaging of moving image by the wearable device.

FIG. 8 is a diagram illustrating an example of control according to imaging of a moving image by the wearable device 1. At Step S20 illustrated in FIG. 8, when entry of the right hand H into the imaging range R is detected by the detector 44, the wearable device 1 transfers the imagers 40 and 42 to the imaging standby state. The wearable device 1 causes the displays 32a and 32b to display the icons 51 and 52 for prompting the user to select a still image or a moving image in such a manner that the icons 51 and 52 are displayed inside the imaging range R. The wearable device 1 temporarily stores, in the storage 24, the video data 70 sequentially transmitted from the imagers 40 and 42 in the imaging standby state.

At Step S20, when the user moves the right hand H from the outside to the inside of the imaging range R of the imagers 40 and 42, the user views the icons 51 and 52 on the displays 32a and 32b, and views the foreground 100 and the right hand H through the displays 32a and 32b. The user views the icons 51 and 52, thereby to recognize that the wearable device 1 can perform imaging.

At Step S22, when the user wishes to image a moving image, the user moves the right hand H in such a manner that the right hand H positioned inside the imaging range R is positioned outside the imaging range R after passing through the icon 52. In this case, the user views the right hand H moving from the side of the icon 52 for moving image to the outside of the imaging range R in front of the wearable device 1 and the foreground 100, inside the imaging range R, through the displays 32a and 32b.

At Step S22, the wearable device 1 determines whether the right hand H is moved from the inside to the outside of the imaging range R based on the detection result of the detector 44. When it is determined that the right hand H is moved to the outside of the imaging range R, and it is detected that the right hand H passes through the icon 52 (or the moving direction of the right hand H is the direction toward the icon 52 of a moving image), the wearable device 1 determines that start of imaging of a moving image is selected by the user. The wearable device 1 causes the imagers 40 and 42 to be a moving image imaging state to start to image the foreground 100 as a moving image. The imagers 40 and 42 start to image the foreground 100 as a moving image at a preset focal point.

At Step S23, when the user wishes to stop the imaging of the moving image, the user moves the right hand H in such a manner that the right hand H outside the imaging range R passes through the icon 52 and comes inside the imaging range R. In this case, the user views the right hand H moving from the outside on the icon 52 side to the inside of the imaging range R in front of the wearable device 1 and the foreground 100, inside the imaging range R, through the displays 32a and 32b. In the present embodiment, a case in which the user moves the right hand H to the inside of the imaging range R through the icon 52 is described. However, embodiments are not limited thereto. For example, the user may move the right hand H to the inside of the imaging range R without passing through the icon 52.

At Step S23, the wearable device 1 determines whether the right hand H is moved from the outside to the inside of the imaging range R based on the detection result of the detector 44. When it is determined that the right hand H is moved to the inside of the imaging range R, the wearable device 1 determines that termination of the imaging of the moving image is selected by the user. The wearable device 1 causes the imagers 40 and 42 to be an imaging termination state to stop the imaging of the moving image. The wearable device 1 acquires a captured image 72 of the moving image by the imagers 40 and 42, and stores the captured image 72 in the storage 24 as the imaged data 24b. After that, the wearable device 1 stops the imagers 40 and 42, and transfers the imagers 40 and 42 to the non-activated state.

In this way, when it is detected that the upper limb of the user is moved from the inside to the outside of the imaging range R of the imagers 40 and 42, the wearable device 1 switches an imaging mode for imaging a moving image or for imaging a still image based on the moving direction of the upper limb. With the configuration, the user can switch a imaging mode of the imagers 40 and 42 by simply switching the moving direction of the upper limb toward the inside of the imaging range R. As a result, the wearable device 1 does not need to have a switch and an interface for switching the imaging mode, and can improve the operability and convenience of the imagers 40 and 42.

During imaging of the moving image, zoom processing may be able to be performed with a predetermined operation. Brightness of the acquired moving image may be changed with a predetermined operation, in addition to the zoom processing. In a case where the wearable device 1 includes a microphone and can collect a voice of the user and the like during acquisition of the moving image, the degree of amplification (sound collection level) of a sound signal may be able to be changed with a predetermined operation during imaging of the moving image. As the predetermined operation, for example, a touch sensor capable of detecting contact of the user is provided on the side surface portion (1b or 1c) with a shape of temples, and an operation to move the finger in an arbitrary direction while keeping the finger in contact with the side surface portion (slide operation) may be performed. In this case, for example, a mode to perform zoom-in processing when the finger is slid from the rear to the front for the user and to perform zoom-out processing when the finger is slid from the front to the rear for the user may be employed.

In addition, a configuration to determine that the predetermined operation is made, based on detection of existence of the upper limb of the user in a predetermined range in a detection range of the detector 44 during imaging of the moving image, may be employed. At this time, when a configuration is employed in which the detection range of the detector 44 and the display region of the display is associated in a predetermined manner, a position in the display region of the display can be specified according to the position of the upper limb in the detection range of the detector 44, it may be determined that the predetermined operation is made based on the specification, by the user, of a predetermined position in the display region of the display. An icon informing an operation for imaging a moving image is displayed in a predetermined region in the display region of the displays 32a and 32b, and the operation based on the icon may be executed when position specification with the upper limb of the user is made inside the display region of the icon.

In present embodiments, a case in which the wearable device 1 displays the icons 51 and 52, which guide switching of the imaging mode, on the displays 32a and 32b is described. However, embodiments are not limited thereto. For example, the wearable device 1 may be configured to switch the imaging mode according to a predetermined moving direction to the outside of the imaging range R, without displaying the icons 51 and 52.

The wearable device 1 may be configured to stop imaging when the upper limb is moved from an upper portion or a lower portion of the imaging range R without no icons 51 and 52 to the outside of the imaging range R, that is, from the inside to the outside of the imaging range R.

In present embodiments, a case in which the wearable device 1 displays the icons 51 and 52, which guide switching of the imaging mode, on the displays 32a and 32b is described. However, embodiments are not limited thereto. For example, the wearable device 1 may be configured to switch the imaging mode in a predetermined moving direction to the outside of the imaging range R, without displaying the icons 51 and 52.

Figure 9:
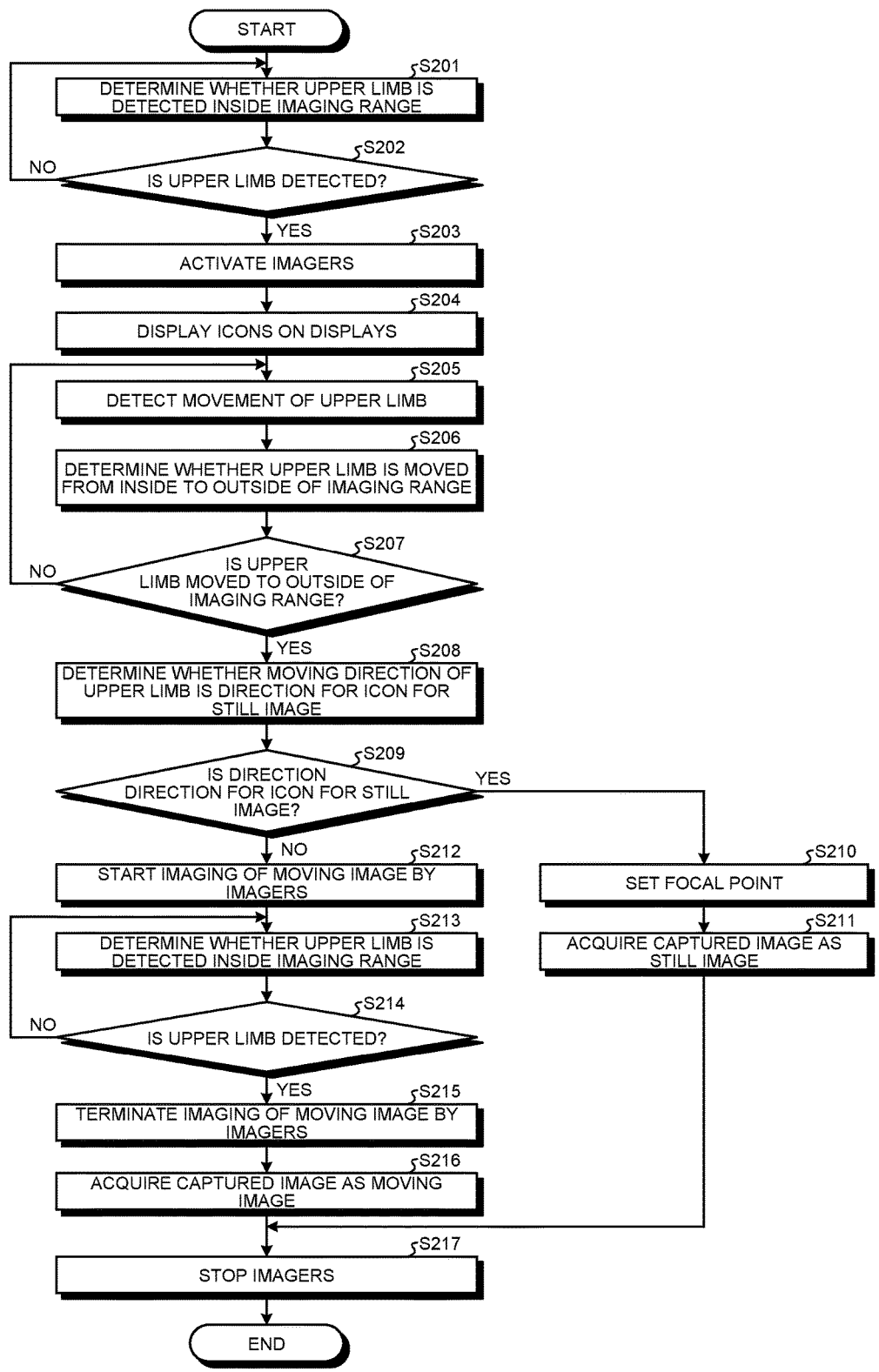
FIG. 9 is a flowchart illustrating a processing procedure according to imaging control of a still image and a moving image by the wearable device.

A processing procedure of control regarding imaging of a still image and a moving image by the wearable device 1 will be described with reference to FIG. 9. FIG. 9 is a flowchart illustrating a processing procedure according to imaging control of a still image and a moving image by the wearable device 1. The processing procedure illustrated in FIG. 9 is realized when the controller 22 executes the control program 24a. The processing procedure illustrated in FIG. 9 is repeatedly executed when the wearable device 1 is mounted on the head or when the wearable device 1 is being operated.

As illustrated in FIG. 9, at Step S201, the controller 22 of the wearable device 1 determines whether the upper limb is detected inside the imaging range R. When the upper limb is not detected (Step S202: No), the controller 22 re-executes the processing of Step S201.

When the upper limb is detected (Step S202: Yes), the controller 22 proceeds to Step S203. At Step S203, the controller 22 activates the imagers 40 and 42. At Step S204, the controller 22 causes the displays 32a and 32b to display the icons 51 and 52.

At Step S205, the controller 22 detects the movement of the upper limb inside the imaging range R based on the video data 70 of the imagers 40 and 42. At Step S206, the controller 22 determines whether the upper limb is moved from the inside to the outside of the imaging range R based on the detection result of Step S205. Specifically, when it is detected that the entire upper limb is moved to the outside of the imaging range R so that the upper limb does not appear in the captured image 71, the controller 22 determines that the upper limb is moved to the outside of the imaging range R. When the upper limb is not moved to the outside of the imaging range R (Step S207: No), the controller 22 re-executes the processing of Step S205 and subsequent steps.

When the upper limb is moved to the outside of the imaging range R (Step S207: Yes), the controller 22 proceeds to Step S208. At Step S208, the controller 22 determines whether the moving direction of the upper limb is the direction for the icon 51 for still image. Specifically, when it is determined that the upper limb passes through the icon 51 and is moved to the outside of the imaging range R based on the video data 70 of the imagers 40 and 42, the controller 22 determines that the direction is the direction for the icon 51 for still image.

When the direction is the direction for the icon 51 for still image (Step S209: Yes), the controller 22 proceeds to Step S210. At Step S210, the controller 22 sets the focal point. Specifically, the controller 22 sets the focal point that is a preset initial value.

At Step S211, the controller 22 acquires the captured image 71 as a still image. Specifically, the controller 22 causes the imagers 40 and 42 to image the foreground 100 as a still image at the focal point set at Step S210, acquires the captured image 71, and stores the captured image 71 in the storage 24 as the imaged data 24b. After that, at Step S217, the controller 22 stops the imagers 40 and 42. When the imagers 40 and 42 are stopped, the controller 22 terminates the processing procedure illustrated in FIG. 9.

When the direction is not the direction for the icon 51 for still image (Step S209: No), the controller 22 proceeds to Step S212. At Step S212, the controller 22 starts imaging of a moving image by the imagers 40 and 42.

At Step S213, the controller 22 determines whether the upper limb is detected inside the imaging range R. When the upper limb is not detected (Step S214: No), the controller 22 re-executes the processing of Step S213.

When the upper limb is detected (Step S214: Yes), the controller 22 proceeds to Step S215. At Step S215, the controller 22 terminates the imaging of the moving image by the imagers 40 and 42. At Step S216, the controller 22 acquires the captured image 72 as the moving image. Specifically, the controller 22 acquires the captured image 72 as the moving image by the imagers 40 and 42, and stores the captured image 72 in the storage 24 as the imaged data 24b. After that, at Step S217, the controller 22 stops the imagers 40 and 42. When the imagers 40 and 42 are stopped, the controller 22 terminates the processing procedure illustrated in FIG. 9.

Figure 10:
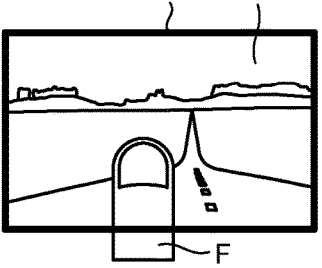
FIG. 10 is a diagram illustrating an example of control according to zoom imaging by the wearable device.
Figure 10:
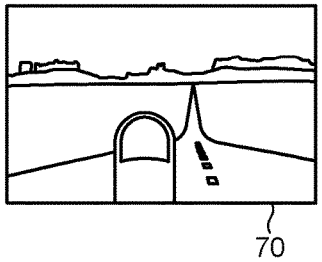
Figure 10:
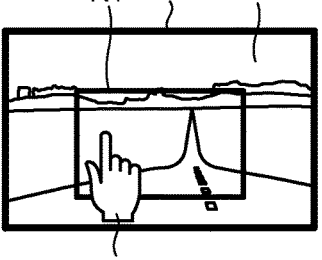
Figure 10:
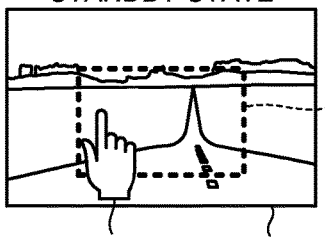
Figure 10:
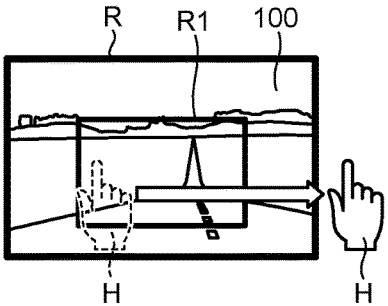
Figure 10:
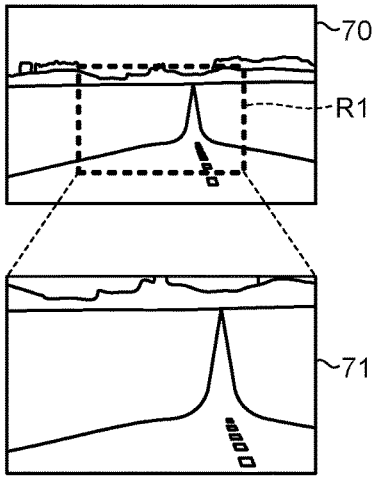

Then, an example of control based on the imaging function provided by the control program 24a will be described with reference to FIGS. 10 and 11. FIG. 10 is a diagram illustrating an example of control according to zoom imaging by the wearable device 1.

At Step S31 illustrated in FIG. 10, when entry of the right hand H into the imaging range R is detected by the detector 44, the wearable device 1 transfers the imagers 40 and 42 to the imaging standby state. The wearable device 1 temporarily stores, in the storage 24, the video data 70 sequentially transmitted from the imagers 40 and 42 in the imaging standby state.

At Step S31, the user moves the right hand H from the outside to the inside of the imaging range R of the imagers 40 and 42 in a state of being close to the wearable device 1. In this case, the user views an index finger F of the right hand H moving from the outside to the inside of the imaging range R in front of the wearable device 1 and the foreground 100, in the imaging range R, through the displays 32a and 32b. After that, the user moves the right hand H to be separated from the vicinity of the wearable device 1 to the forward direction.

At Step S32, when the movement of the right hand H inside the imaging range R in the forward direction is detected based on the detection results of the detector 44 and the distance-measuring unit 46, the wearable device 1 detects the distance to the right hand H, and executes zoom processing based on the detected distance. The zoom processing is processing of identifying a zoom range R1 of zoom-in or zoom-out in the imaging range R based on the detected distance and a conversion table, for example. The wearable device 1 causes the displays 32a and 32b to display the identified zoom range R1 to be positioned inside the imaging range R, when executing the zoom processing.

At Step S32, the user views the right hand H moving in the forward direction inside the imaging range R, in front of the wearable device 1, and the foreground 100, in the imaging range R, through the displays 32a and 32b. In this case, the user views the zoom range R1 displayed on the displays 32a and 32b. After that, the user moves the right hand H moved forward inside the imaging range R toward the outside of the imaging range R.

At Step S33, the wearable device 1 determines whether the right hand H is moved from the inside to the outside of the imaging range R based on the detection result of the detector 44. When it is determined that the right hand H is moved to the outside of the imaging range R, the wearable device 1 causes the imagers 40 and 42 to be the imaging state, sets the focal point to the identified zoom range R1, and causes the imagers 40 and 42 to image the foreground 100. The imagers 40 and 42 image the foreground 100 at the set focal point. The wearable device 1 acquires the captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

At Step S33, the user views the right hand H moving in the forward direction inside the imaging range R, in front of the wearable device 1, and the foreground 100, in the imaging range R, through the displays 32a and 32b. In this case, the user views that the zoom range R1 displayed on the displays 32a and 32b is erased.

In the above embodiments, a case in which the wearable device 1 reduces the imaging range R according to the distance by which the upper limb is away from the wearable device is described. However, embodiments are not limited thereto. For example, the wearable device 1 may reduce the imaging range R according to the distance by which the upper limb approaches the wearable device.

In this way, the wearable device 1 estimates the change of the distance between the wearable device and the upper limb in the imaging range R, changes an enlargement and reduction rate of the imaging range R according to the change of the distance, and acquires the captured image 71 by the imagers 40 and 42 at the changed enlargement and reduction rate upon the movement of the upper limb to the outside of the imaging range R. With the configuration, the user can change the enlargement and reduction rate of the imaging range R by simply changing the distance between the upper limb and the wearable device inside the imaging range R. As a result, the wearable device 1 can improve operability and convenience of the imagers 40 and 42.

Figure 11:
FIG. 11 is a diagram illustrating another example of the control according to zoom imaging by the wearable device.

FIG. 11 is a diagram illustrating another example of the control according to zoom imaging by the wearable device 1. At Step S41 illustrated in FIG. 11, when entry of the left hand H1 into the imaging range R is detected by the detector 44, the wearable device 1 transfers the imagers 40 and 42 to the imaging standby state. The wearable device 1 temporarily stores, in the storage 24, the video data 70 sequentially transmitted from the imagers 40 and 42 in the imaging standby state. In the present embodiment, a case in which the user performs an operation with the left hand H1 is described. However, the user may perform an operation with the right hand H.

In an embodiment to perform zoom processing, the wearable device 1 may be configured to acquire the captured image 71 by the imagers 40 and 42 upon the movement of the upper limb from the inside to the outside of the zoom range R1, considering the zoom range R1 as the imaging range.

At Step S41, the user moves the left hand H1 from the outside to the inside of the imaging range R of the imagers 40 and 42. In this case, the user views the left hand H1 moving from the outside to the inside of the imaging range R in front of the wearable device 1 and the foreground 100, in the imaging range R, through the displays 32a and 32b. After that, the user changes the shape of the left hand H1 to a predetermined shape corresponding to the zoom function inside the imaging range R. In the present embodiment, the predetermined shape is a shape of an opened left hand H1. However, embodiments are not limited thereto.

At Step S42, the wearable device 1 detects an operation to open the left hand H1 based on the detection result of the detector 44. When the operation to open the left hand H1 is detected, the wearable device 1 executes the zoom processing. The wearable device 1 causes the displays 32a and 32b to display the current zoom range R1 to be displayed inside the imaging range R, when executing the zoom processing.

At Step S42, the user views the left hand H1 with being opened and the foreground 100, in the imaging range R, through the displays 32a and 32b. In this case, the user views the zoom range R1 displayed on the displays 32a and 32b. After that, the user performs a predetermined operation of rotating the opened left hand H1 inside the imaging range R.

At Step S43, the wearable device 1 detects the predetermined operation of rotating the left hand H1 based on the detection result of the detector 44. When the predetermined operation of rotating the left hand H1 is detected, the wearable device 1 executes the zoom processing based on a rotation amount of the rotating. The zoom processing is processing of identifying the zoom range R1 to zoom in in the imaging range R, based on the rotation amount of the detected left hand H1 and a conversion table, for example. The wearable device 1 causes the displays 32a and 32b to display the identified zoom range R1 to be positioned inside the imaging range R, when executing the zoom processing.

At Step S43, the user views the left hand H1 that performs the rotation operation and the foreground 100, in the imaging range R, through the displays 32a and 32b. In this case, the user views the zoom range R1 displayed on the displays 32a and 32b and changed according to the rotation amount. After that, when the zoom range R1 is changed to a desired size, the user moves the opened left hand H1 toward the outside of the imaging range R.

At Step S44, the wearable device 1 determines whether the left hand H1 is moved from the inside to the outside of the imaging range R based on the detection result of the detector 44. When it is determined that the left hand H1 is moved to the outside of the imaging range R, the wearable device 1 causes the imagers 40 and 42 to be the imaging state, sets the focal point to the identified zoom range R1, and causes the imagers 40 and 42 to image the foreground 100. The imagers 40 and 42 image the foreground 100 at the set focal point. The wearable device 1 acquires the captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

At Step S44, the user views the left hand H1 moving in the forward direction inside the imaging range R in front of the wearable device 1 and the foreground 100, in the imaging range R, through the displays 32a and 32b. In this case, the user views that the zoom range R1 displayed on the displays 32a and 32b is erased.

In the above described embodiments, a case in which the wearable device 1 reduces the imaging range R based on the rotation amount of the opened left hand H1 is described. However, embodiments are not limited thereto. For example, the wearable device 1 may be configured to switch the enlargement and reduction rate based on a rotating direction of the opened left hand H1. For example, the wearable device 1 may be configured to switch the enlargement and reduction rate based on whether the left hand H1 or the right hand H is detected.

In this way, the wearable device 1 detects a predetermined operation of the upper limb in the imaging range R, changes the enlargement and reduction rate of the imaging range R according to the detected predetermined operation, and acquires the captured image 71 by the imagers 40 and 42 at the changed enlargement and reduction rate upon the movement of the upper limb to the outside of the imaging range R. With the configuration, the user can change the enlargement and reduction rate of the imaging range R by simply changing the upper limb inside the imaging range R. As a result, the wearable device 1 can improve operability and convenience of the imagers 40 and 42.

Figure 12:
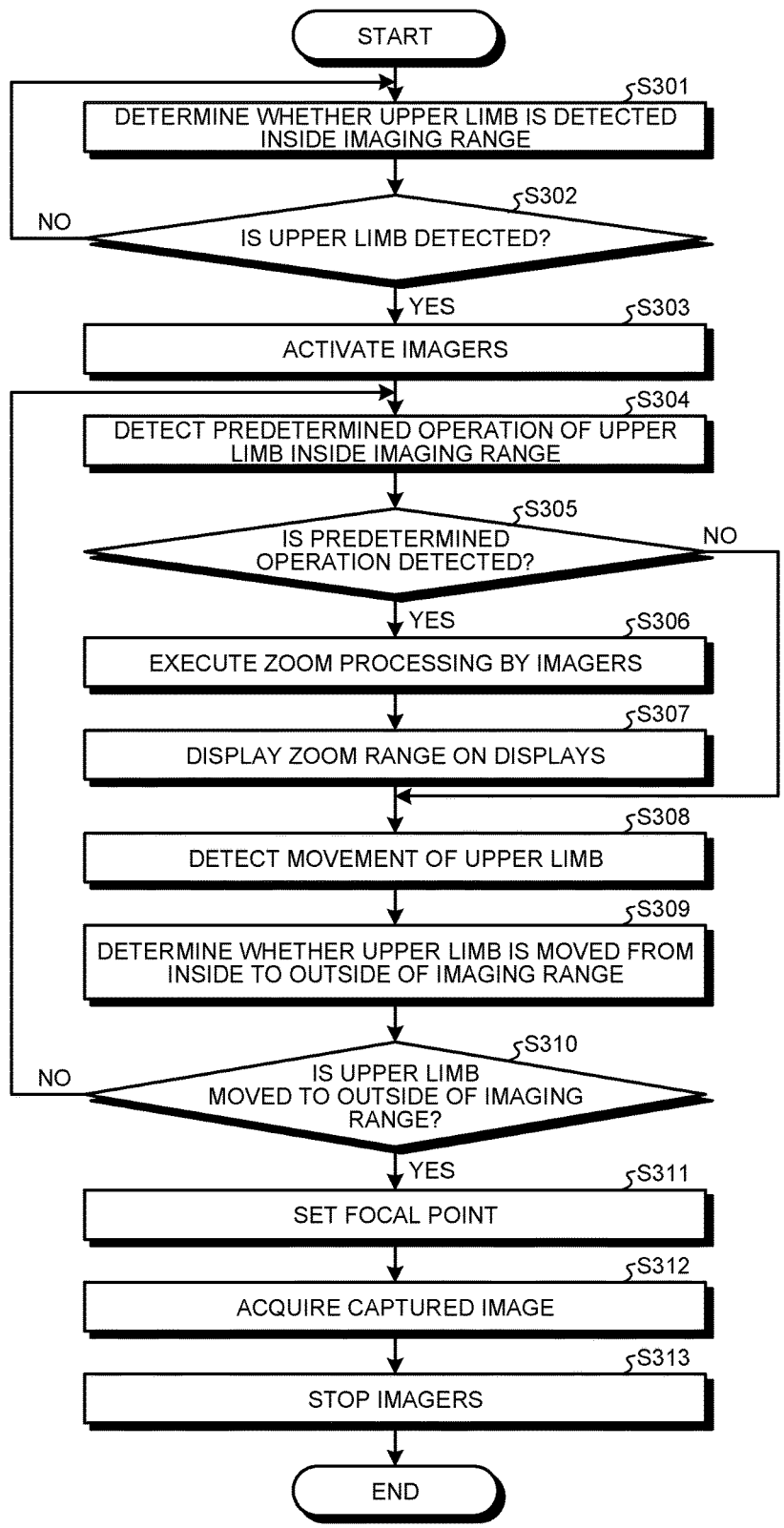
FIG. 12 is a flowchart illustrating a processing procedure according to zoom imaging control by the wearable device.

A processing procedure of control regarding the zoom imaging by the wearable device 1 will be described with reference to FIG. 12. FIG. 12 is a flowchart illustrating a processing procedure according to zoom imaging control by the wearable device 1. The processing procedure illustrated in FIG. 12 is realized when the controller 22 executes the control program 24a. The processing procedure illustrated in FIG. 12 is repeatedly executed when the wearable device 1 is mounted on the head or when the wearable device 1 is being operated.

As illustrated in FIG. 12, at Step S301, the controller 22 of the wearable device 1 determines whether the upper limb is detected inside the imaging range R. When the upper limb is not detected (Step S302: No), the controller 22 re-executes the processing of Step S301.

When the upper limb is detected (Step S302: Yes), the controller 22 proceeds to Step S303. At Step S303, the controller 22 activates the imagers 40 and 42.

At Step S304, the controller 22 detects a predetermined operation of the upper limb inside the imaging range R. Specifically, the controller 22 determines that the predetermined operation is detected, when an operation of moving the upper limb back and forth in the forward direction, an operation of changing the shape of the upper limb, or the like is detected based on the detection result of the detector 44.

When the predetermined operation is detected (Step S305: Yes), the controller 22 proceeds to Step S306. At Step S306, the controller 22 executes the zoom processing by the imagers 40 and 42. Specifically, the controller 22 identifies the zoom range R1 in the imaging range R, in which the imagers 40 and 42 zoom in and zoom out, based on the detected predetermined operation and a conversion table, and stores an identified result in the storage 24. At Step S307, the controller 22 causes the displays 32a and 32b to display the zoom range R1 identified at Step S306.

At Step S308, the controller 22 detects the movement of the upper limb inside the imaging range R based on the video data 70 of the imagers 40 and 42. At Step S309, the controller 22 determines whether the upper limb is moved from the inside to the outside of the imaging range R based on the detection result of Step S308. Specifically, when it is detected that the entire upper limb is moved to the outside of the imaging range R so that the upper limb does not appear in the captured image 71, the controller 22 determines that the upper limb is moved to the outside of the imaging range R. When the upper limb is not moved to the outside of the imaging range R (Step S310: No), the controller 22 re-executes the processing of Step S304 and subsequent steps.

When the upper limb is moved to the outside of the imaging range R (Step S310: Yes), the controller 22 proceeds to Step S311. At Step S311, the controller 22 sets the focal point. Specifically, the controller 22 sets the focal point that is a preset initial value. Alternatively, the controller 22 estimates the position Lc to be focused corresponding to the zoom range R1, and sets a focal point for the position Lc to be focused.

At Step S312, the controller 22 acquires the captured image 71. Specifically, the controller 22 causes the imagers 40 and 42 to image the foreground 100 at the focal point set at Step S311, acquires the captured image 71, and stores the acquired captured image 71 in the storage 24 as the imaged data 24b. After that, at Step S313, the controller 22 stops the imagers 40 and 42. When the imagers 40 and 42 are stopped, the controller 22 terminates the processing procedure illustrated in FIG. 12.

When the predetermined operation is not detected (Step S305: No), the controller 22 executes the already-described processing of Step S308 and subsequent steps. After that, the controller 22 terminates the processing procedure illustrated in FIG. 12.

Figure 13:
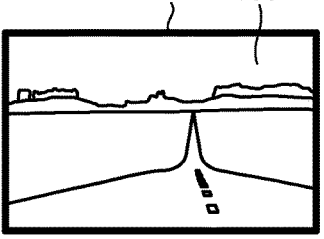
FIG. 13 is a diagram illustrating an example of control according to imaging using a preview image by the wearable device.
Figure 13:
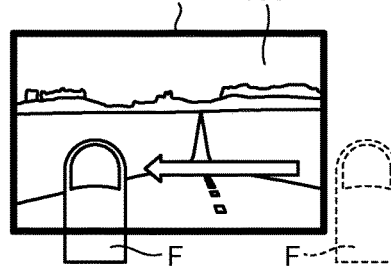
Figure 13:
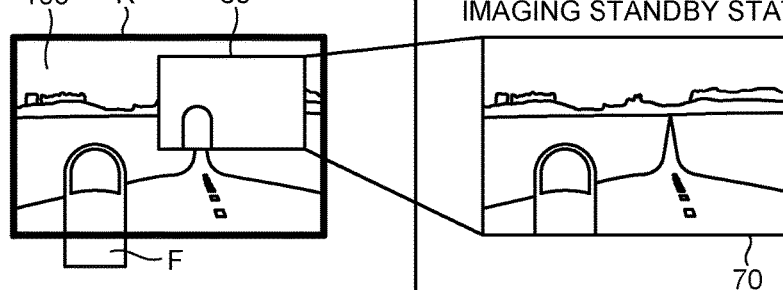
Figure 13:
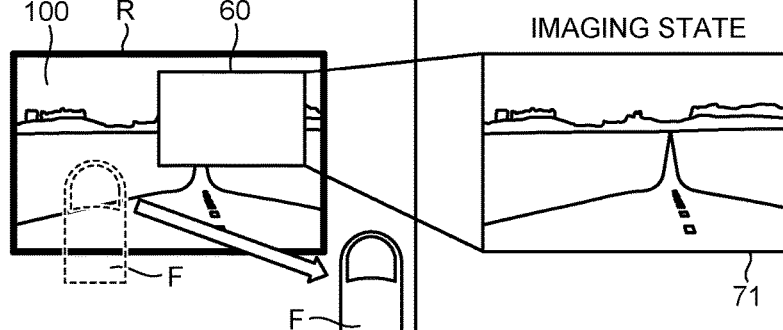

Then, an example of another control based on the imaging function provided by the control program 24a will be described with reference to FIG. 13. FIG. 13 is a diagram illustrating an example of control according to imaging using a preview image by the wearable device 1.

At Step S51 illustrated in FIG. 13, the user views the foreground 100 in the imaging range R of the imagers 40 and 42 through the displays 32a and 32b. The user does not view the frame of the imaging range R. At Step S51, the wearable device 1 detects an object by the detector 44 while maintaining the non-activated state of the imagers 40 and 42.

At Step S52, the user moves the index finger F from the front right side to the center of the wearable device 1 in such a manner that only the index finger F enters the imaging range R. In this case, the user views the index finger F moving in front of the wearable device 1 and the foreground 100, inside the imaging range R, through the displays 32a and 32b.

At Step S52, when the index finger F is detected by the detector 44, the wearable device 1 determines whether the index finger F is moved from the outside to the inside of the imaging range R based on the position of the index finger F. When the movement of the index finger F to the inside of the imaging range R is detected, the wearable device 1 activates the imagers 40 and 42 to transfer the imagers 40 and 42 from the non-activated state to the imaging standby state. The wearable device 1 temporarily stores, in the storage 24, the video data 70 sequentially transmitted from the imagers 40 and 42 in the imaging standby state.

At Step S53, the wearable device 1 causes the displays 32a and 32b to display the video data 70 as a preview image 60 to be positioned inside the imaging range R. A range of the preview image 60 may be the same size as the imaging range R or may be a range narrower than the imaging range R. In the example illustrated in FIG. 13, a case in which the wearable device 1 displays the preview image 60 in the upper right inside the imaging range R is described. However, embodiments are not limited thereto. For example, the preview image 60 may be displayed at a position not overlapped with the index finger F in the foreground 100. Thereby, the wearable device 1 can allow the user to easily recognize the position of the index finger F in the foreground 100 when executing the zoom processing based on an operation of the index finger F by the user.

At Step S53, the user views the index finger F moving in front of the wearable device 1 and the foreground 100, inside the imaging range R, through the displays 32a and 32b. In this case, the user views the preview image 60 displayed on the displays 32a and 32b. The user recognizes that his/her own index finger F is displayed in the preview image 60. After that, at Step S54, the user moves the index finger F toward the outside of the imaging range R so that the index finger F disappears from the preview image 60.

At Step S54, the wearable device 1 determines whether the index finger F is moved from the inside to the outside of the range (imaging range R) of the preview image 60 based on the detection result of the detector 44. When it is determined that the index finger F is moved to the outside of the range, the index finger F disappears from the preview image 60, and thus the wearable device 1 transfers the imagers 40 and 42 to the imaging state to image the foreground 100. The imagers 40 and 42 image the foreground 100 at a preset focal point. The wearable device 1 acquires the captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

In this way, when the preview image 60 is displayed in the imaging range R, and disappearance of the upper limb from the preview image 60 is detected, the wearable device 1 acquires the captured image 71 by the imagers 40 and 42. With the configuration, the user can image a front image by the imagers 40 and 42 by simply moving the upper limb to disappear while viewing the preview image 60. As a result, the wearable device 1 can improve operability and convenience of the imagers 40 and 42.

Figure 14:
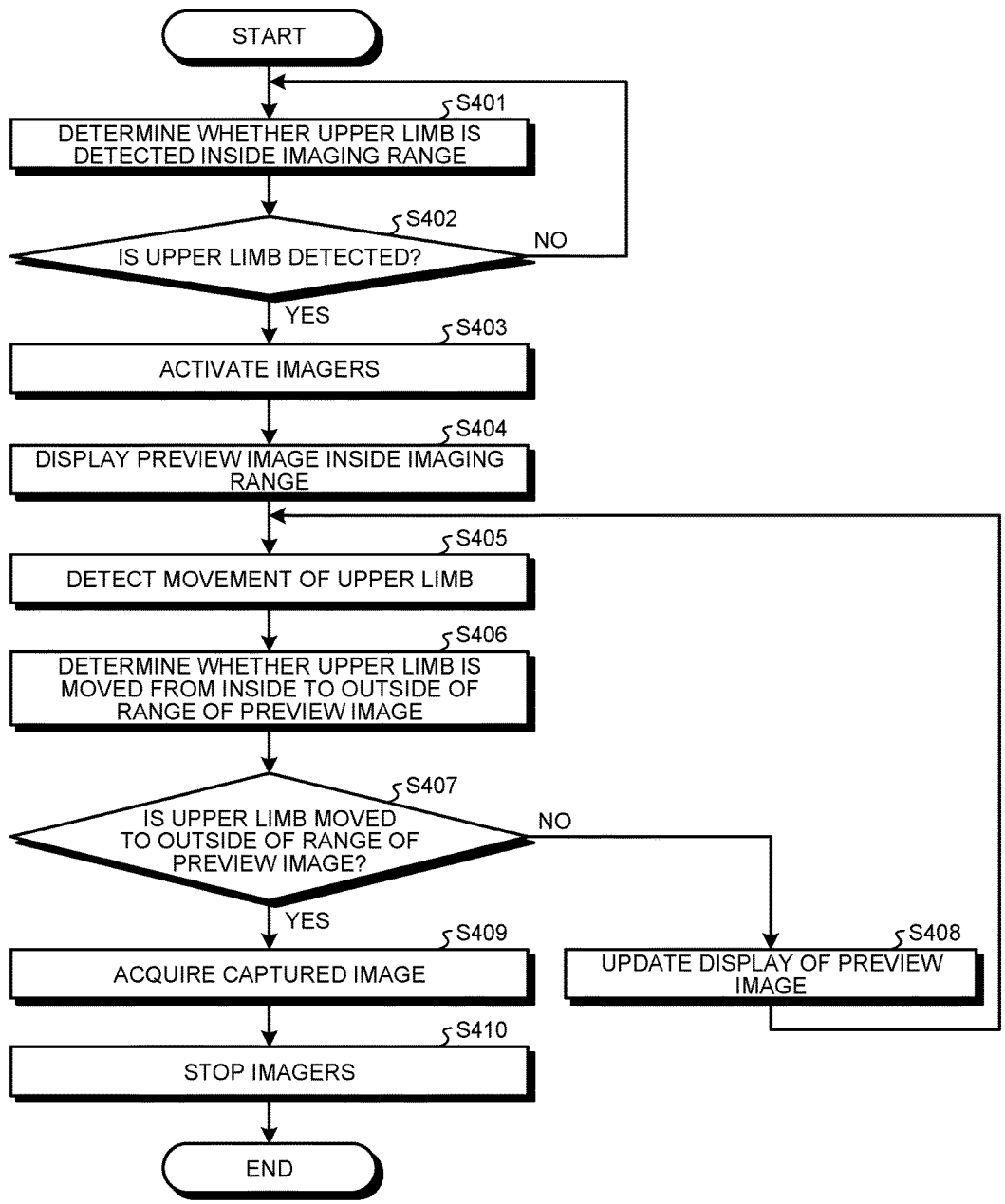
FIG. 14 is a flowchart illustrating a processing procedure of control according to imaging using a preview image by the wearable device.

A processing procedure of control according to imaging using a preview image by the wearable device 1 will be described with reference to FIG. 14. FIG. 14 is a flowchart illustrating a processing procedure of control according to imaging using a preview image by the wearable device 1. The processing procedure illustrated in FIG. 14 is realized when the controller 22 executes the control program 24a. The processing procedure illustrated in FIG. 14 is repeatedly executed when the wearable device 1 is mounted on the head or when the wearable device 1 is being operated.

As illustrated in FIG. 14, at Step S401, the controller 22 of the wearable device 1 determines whether the upper limb is detected inside the imaging range R. When the upper limb is not detected (Step S402: No), the controller 22 re-executes the processing of Step S401.

When the upper limb is detected (Step S402: Yes), the controller 22 proceeds to Step S403. At Step S403, the controller 22 activates the imagers 40 and 42. At Step S404, the controller 22 controls the displays 32a and 32b to display the preview image 60 inside the imaging range R.

At Step S405, the controller 22 detects the movement of the upper limb inside the imaging range R based on the video data 70 of the imagers 40 and 42. At Step S406, the controller 22 determines whether the upper limb is moved from the inside to the outside of the range of the preview image 60 based on a detection result of Step S405. Specifically, the controller 22 determines that the upper limb is moved to the outside of the range of the preview image 60 when it is detected that the entire upper limb is moved to the outside of the range of the preview image 60 so that the upper limb does not appear in the captured image 71.

When the entire upper limb is not moved to the outside of the range of the preview image 60 (Step S407: No), the controller 22 proceeds to Step S408. At Step S408, the controller 22 causes the displays 32a and 32b to update the display of the preview image 60. After that, the controller 22 re-executes the processing of Step S405 and subsequent steps.

When the entire upper limb is moved to the outside of the preview image 60 (Step S407: Yes), the controller 22 proceeds to Step S409. At Step S409, the controller 22 acquires the captured image 71. Specifically, the controller 22 causes the imagers 40 and 42 to image the foreground 100 at a preset focal point, acquires the captured image 71, and stores the acquired captured image 71 in the storage 24 as the imaged data 24b. After that, at Step S410, the controller 22 stops the imagers 40 and 42. When the imagers 40 and 42 are stopped, the controller 22 terminates the processing procedure illustrated in FIG. 14.

Figure 15:
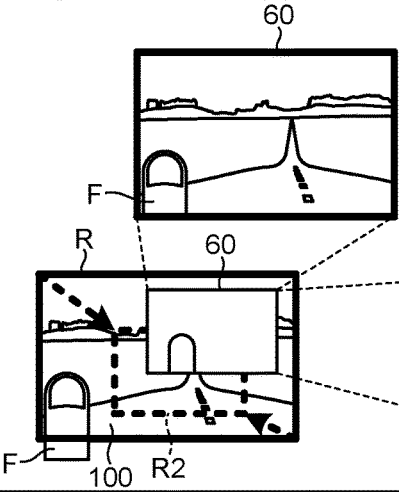
FIG. 15 is a diagram illustrating an example of control according to zoom imaging using a preview image by the wearable device.

Then, an example of another control based on the imaging function provided by the control program 24a will be described with reference to FIG. 15. FIG. 15 is a diagram illustrating an example of zoom imaging using a preview image by the wearable device 1.

At Step S61 illustrated in FIG. 15, when entry of the index finger F into the imaging range R is detected by the detector 44, the wearable device 1 transfers the imagers 40 and 42 to the imaging standby state. The wearable device 1 temporarily stores, in the storage 24, the video data 70 sequentially transmitted from the imagers 40 and 42 in the imaging standby state. The wearable device 1 causes the displays 32a and 32b to display the video data 70 as the preview image 60 positioned inside the imaging range R.

At Step S61, the user views the foreground 100 inside the imaging range R of the imagers 40 and 42 through the displays 32a and 32b. The user views the preview image 60 displayed on the displays 32a and 32b. At Step S61, the user moves the index finger F in the forward direction inside the imaging range R up to a position corresponding to a zoom range R2 where zoom is scheduled.

At Step S62, the user moves the index finger F to the position corresponding to the zoom-scheduled range R2, and thus the index finger F is positioned inside the imaging range R and is out of the scheduled zoom range R2.

At Step S62, when the movement of the index finger F in the forward direction is detected based on the detection results of the detector 44 and the distance-measuring unit 46, the wearable device 1 detects the distance to the index finger F, and executes the zoom processing based on the detected distance. The zoom processing is processing of identifying the zoom range R2 to zoom in in the imaging range R based on the detected distance and a conversion table, for example. When the zoom processing is executed, the wearable device 1 changes the focal point of the imagers 40 and 42. The wearable device 1 causes the displays 32a and 32b to display the zoomed video data 70 as the preview image 60. At Step S62, the index finger F disappears from the preview screen 60 by the zoom processing. The wearable device 1 does not execute acquisition of the captured image 71 by the imagers 40 and 42 due to disappearance of the index finger F of this time. This will be described later.

At Step S63, the user moves the index finger F, which has disappeared from the preview image 60, to display the index finger F again on the preview screen 60, when the preview screen 60 is at desired zoom. After that, when the index finger F is displayed on the preview image 60, the user causes the index finger F to disappear again from the preview image 60.

At Step S63, the wearable device 1 detects that the index finger F is moved from the outside to the inside of the zoom range R2, and then is moved to the outside of the zoom range R2 based on the detection results of the detector 44 and the distance-measuring unit 46. When the movement of the index finger F to the outside of the zoom range R2 is detected, the wearable device 1 causes the imagers 40 and 42 to be the imaging state to image the foreground 100. The imagers 40 and 42 image the foreground 100 at a preset focal point. The wearable device 1 acquires the captured image 71 by the imagers 40 and 42, and stores the captured image 71 to the storage 24 as the imaged data 24b. After that, the wearable device 1 stops the imagers 40 and 42, and transfers the imagers 40 and 42 to the non-activated state.

In this way, when the index finger F disappears from the preview screen 60 (zoom range) by the zoom processing, in the imaging range R, the wearable device 1 does not acquire the captured image 71. After that, the wearable device 1 acquires the captured image 71 by the imagers 40 and 42 at the changed enlargement and reduction rate, upon the movement of the upper limb from the inside to the outside of the preview image 60. With the configuration, the wearable device 1 does not acquire the captured image 71 of the imaging range R even if the distance between the upper limb and the wearable device is changed inside the imaging range R by the user and is changed in such a manner that the upper limb disappears from the imaging range R. As a result, the wearable device 1 can improve detection accuracy of a timing to acquire the captured image 71.

Figure 16:
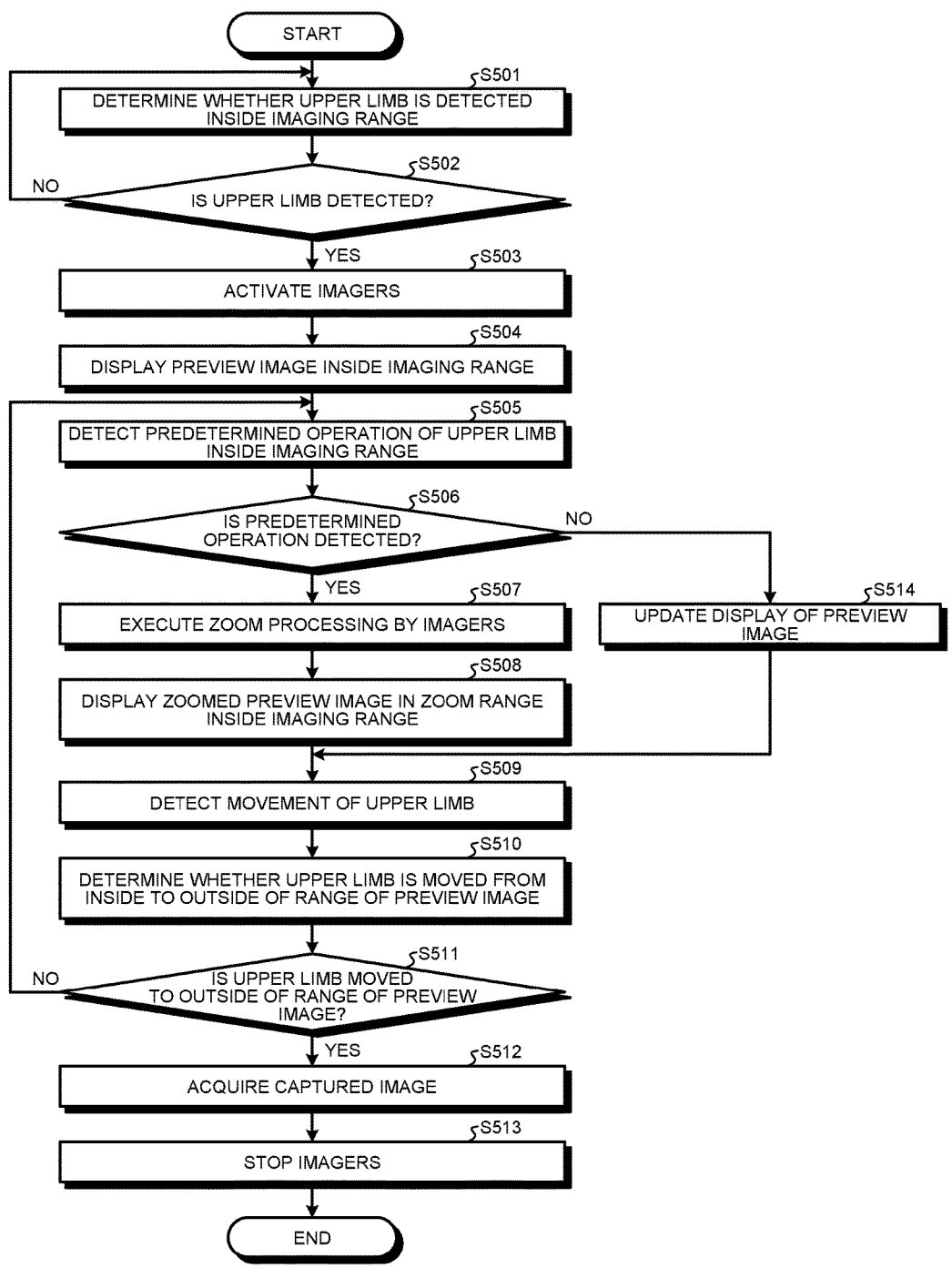
FIG. 16 is a flowchart illustrating a processing procedure of control according to zoom imaging using a preview image by the wearable device.

A processing procedure of control according to zoom imaging using a preview image by the wearable device 1 will be described with reference to FIG. 16. FIG. 16 is a flowchart illustrating a processing procedure of control according to zoom imaging using a preview image by the wearable device 1. The processing procedure illustrated in FIG. 16 is realized when the controller 22 executes the control program 24a. The processing procedure illustrated in FIG. 16 is repeatedly executed when the wearable device 1 is mounted on the head or when the wearable device 1 is being operated.

As illustrated in FIG. 16, at Step S501, the controller 22 of the wearable device 1 determines whether the upper limb is detected inside the imaging range R. When the upper limb is not detected (Step S502: No), the controller 22 re-executes the processing of Step S501.

When the upper limb is detected (Step S502: Yes), the controller 22 proceeds to Step S503. At Step S503, the controller 22 activates the imagers 40 and 42. At Step S504, the controller 22 causes the displays 32a and 32b to display the preview screen 60 inside the imaging range R.

At Step S505, the controller 22 detects a predetermined operation of the upper limb inside the imaging range R. Specifically, when an operation to move the upper limb back and forth in the forward direction is detected based on the detection result of the detector 44, for example, the controller 22 determines that the predetermined operation is detected.

When the predetermined operation is detected (Step S506: Yes), the controller 22 proceeds to Step S507. At Step S507, the controller 22 executes the zoom processing by the imagers 40 and 42. Specifically, the controller 22 identifies the zoom range R2 in the imaging range R where the imagers 40 and 42 zoom in and zoom out, based on the detected predetermined operation and a conversion table, and stores an identified result in the storage 24. At Step S508, the controller 22 displays the zoomed preview image 60 in the zoom range R2 inside the imaging range R. Specifically, the controller 22 causes the displays 32a and 32b to display the preview screen 60 in such a manner that the video data 70 of the zoomed imagers 40 and 42 is displayed inside the imaging range R.

At Step S509, the controller 22 detects the movement of the upper limb inside the imaging range R based on the video data 70 of the imagers 40 and 42. At Step S510, the controller 22 determines whether the upper limb is moved from the inside to the outside of the range of the preview image 60 based on a detection result of Step S509. Specifically, the controller 22 determines that the upper limb is moved to the outside of the range of the preview image 60 when it is detected that the entire upper limb is moved to the outside of the range of the preview image 60 so that the upper limb does not appear in the captured image 71.

When the entire upper limb is not moved to the outside of the range of the preview image 60 (Step S511: No), the controller 22 re-executes the processing of Step S505 and subsequent steps. When the entire upper limb is moved to the outside of the range of the preview image 60 (Step S511: Yes), the controller 22 proceeds to Step S512. At Step S512, the controller 22 acquires the captured image 71. Specifically, the controller 22 causes the imagers 40 and 42 to image the foreground 100 at a preset focal point, acquires the captured image 71, and stores the acquired captured image 71 in the storage 24 as the imaged data 24b. After that, at Step S513, the controller 22 stops the imagers 40 and 42. When the imagers 40 and 42 are stopped, the controller 22 terminates the processing procedure illustrated in FIG. 16.

When the predetermined operation is not detected (Step S506: No), the controller 22 proceeds to Step S514. At Step S514, the controller 22 causes the displays 32a and 32b to update the display of the preview image 60. After that, the controller 22 re-executes the processing of Step S509 and subsequent steps that have already been described.

Embodiments disclosed in the present application can be altered without departing from the gist and the scope of the application. Further, embodiments and its modifications disclosed in the present application can be appropriately combined. For example, embodiments may be modified as follows.

For example, the programs illustrated in FIG. 3 may be divided into a plurality of units or may be united with another program.

In some embodiments, a case in which the wearable device 1 stops the imagers 40 and 42 when acquiring the captured image 71 of the imagers 40 and 42 is described. However, embodiments are not limited thereto. For example, the wearable device 1 may be configured to stop the imagers 40 and 42 when stop of the imagers 40 and 42 is requested from the user. The wearable device 1 may be configured to notify the user of acquiring the captured image 71 when acquiring the captured image 71 of the imagers 40 and 42.

The wearable device 1 may be configured to activate the imagers 40 and 42 when causing the displays 32a and 32b to display activation icons of the imagers 40 and 42, and detecting a predetermined gesture to the activation icons. The wearable device 1 may be configured to set the imagers 40 and 42 to be an activation standby state on a steady basis. The wearable device 1 may be configured to include the operation part 13 on the side surface portion 1b or the side surface portion 1c and to control activation and stop of the imagers 40 and 42 according to a predetermined operation to the operation part 13.

In the example of control according to imaging using the preview image 60 by the wearable device 1, a configuration is described, in which the wearable device 1 does not acquire the captured image 71 when the index finger F disappears from the preview screen 60 (zoom range R1) by the zoom processing, in the imaging range R, and then acquires the captured image 71 upon the movement of the upper limb from the inside to the outside of the preview image 60. However, embodiments are not limited thereto. For example, the wearable device 1 may be configured to perform the zoom processing around the index finger F. With such a configuration, the wearable device 1 does not have a case in which the index finger F disappears from the preview image 60 (zoom range R1) by the zoom processing.

In the above described embodiments, description is given such that the shield existing in the imaging range R is the upper limb of the user. However, as described above, the shield is not limited to the upper limb. For example, the shield may be a predetermined object held by the user. The predetermined object held by the user is a rod-like object such as a pen. The predetermined object held by the user may be a mobile electronic device such as a mobile phone held by the user or may be an electronic device such as a wristwatch-type terminal mounted on the upper limb of the user. With such a configuration, for example, in a case where the mobile phone can perform communication with the wearable device 1, imaging contents (brightness and the like) by the imagers 40 and 42 of the wearable device 1 are changed by a predetermined operation to the mobile phone, and when the upper limb that holds the mobile phone is moved from the inside to the outside of the imaging range R of the imagers 40 and 42, the captured image is acquired in a state where the imaging contents are changed.

Figure 17:
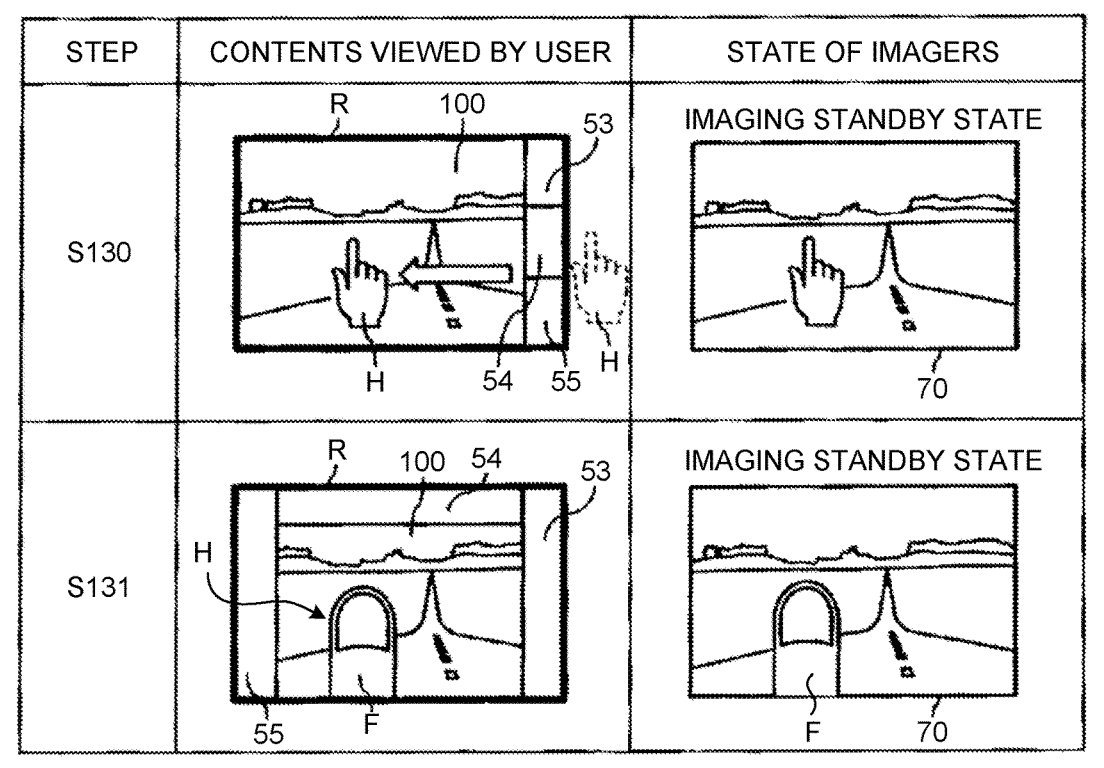

Then, a third example of the control provided by the control program 24a of the wearable device 1 will be described with reference to FIG. 17. FIG. 17 is a diagram for describing an example of the control provided by the control program 24a of the wearable device 1.

At Step S130 illustrated in FIG. 17, when entry of the right hand H into the imaging range R is detected by the detector 44, the wearable device 1 transfers the imagers 40 and 42 to the imaging standby state. The wearable device 1 causes the displays 32a and 32b to display icons 53 to 55 to be positioned inside the imaging range R. The icon 53 is an image for execution of imaging of a still image by the imagers 40 and 42, for example. The icon 54 is an image for execution of imaging of a moving image by the imagers 40 and 42, for example. The icon 55 is an image for cancellation of the imaging standby state of the imagers 40 and 42 (stop imaging), for example. The icons 53 to 55 are arranged and displayed in parallel in a region along a right side of the imaging range R. In the present embodiment, a case in which the wearable device 1 displays the icons 53 to 55 inside the imaging range R is described. However, the icons 53 to 55 may be displayed outside the imaging range R. The wearable device 1 temporarily stores, in the storage 24, the video data 70 sequentially transmitted from the imagers 40 and 42 in the imaging standby state.

At Step S130, when the user moves the right hand H from the outside to the inside of the imaging range R of the imagers 40 and 42, the user views the icons 53 to 55 on the displays 32a and 32b, and views the foreground 100 and the right hand H through the displays 32a and 32b. The user views the icons 53 and 55, thereby to recognize that the wearable device 1 can perform imaging.

When the user wishes to image a still image, the user may just move the right hand H in such a manner that a preset portion (or also referred to as a predetermined region in the upper limb) of the right hand H inside the imaging range R passes through the icon 53 and is positioned outside the imaging range R. The preset portion of the right hand H may be, for example, a portion closer to the fingertip than to a first joint in the index finger of the right hand H, a nail of the index finger of the right hand H, or the entire right hand H. At this time, the wearable device 1 determines that the preset portion of the right hand H passes through the icon 53 and is moved to the outside of the imaging range R based on the detection result of the detector 44. The wearable device 1 then transfers the imagers 40 and 42 to the imaging state to image the foreground 100 as a still image.

When the user wishes to image a moving image, the user may just move the right hand H in such a manner that the preset portion of the right hand H passes through the icon 54 and is positioned outside the imaging range R. At this time, the wearable device 1 determines that the preset portion of the right hand H passes through the icon 54 and is moved to the outside of the imaging range R based on the detection result of the detector 44. The wearable device 1 then transfers the imagers 40 and 42 to the imaging state to start to image the moving image.

When the user wishes to cancel the imaging standby state without executing imaging, the user may just move the right hand H in such a manner that the preset portion of the right hand H passes through the icon 55 and is positioned the outside the imaging range R. At this time, the wearable device 1 determines that the preset portion of the right hand H passes through the icon 55 and is moved to the outside of the imaging range R based on the detection result of the detector 44. The wearable device 1 then cancels the imaging standby state of the imagers 40 and 42.

Each of the icons 53 to 55 is displayed on the displays 32a and 32b as an image larger than the preset portion of the right hand H, as illustrated in Step S130. The preset portion of the right hand H includes a portion closer to the fingertip than to the first joint in the index finger of the right hand H, for example. With such a configuration, the portion registered in advance, of the right hand H hardly passes through a plurality of the icons, of the icons 53 to 55, and the wearable device 1 can easily execute the function based on one icon desired by the user.

The preset portion of the right hand H may be a portion from a root (third joint) to the fingertip of the finger, for example, other than the above example. The preset portion of the right hand H may be determined such that any two of the fingertip, the first joint, a second joint, and the third joint of the finger are selected, and a portion between the selected two portions is employed as the preset portion. A circular region (or an oval region or a square region) with a predetermined size based on the size of the finger or the hand may be employed as the preset portion. Then, the preset portion may be displayed on the displays 32a and 32b as a predetermined image so that the user can view the predetermined image.

Subsequently, as illustrated in Step S131, when the user moves the right hand H to a position closer to the wearable device 1, only the index finger F of the right hand H is viewed inside the imaging range R. At this time, the index finger F of the right hand H is viewed in a state of being larger than the index finger F at Step S130. That is, the size of the index finger F in the captured image (the video data 70 temporarily stored in the storage 24) sequentially transmitted from the imagers 40 and 42 in the imaging standby state becomes larger than the index finger in the case of Step S130. At this time, as illustrated in Step S131, the wearable device 1 causes the displays 32a and 32b to display the images of the icons 53 to 55 as larger images than the icons 53 to 55 displayed in the case of Step S130. At Step S131, the wearable device 1 changes the display positions of the icons 53 to 55 from the display positions at Step S130 in order to display the icons 53 to 55 as larger images than the sizes of the images of the icons 53 to 55 at Step S130. As illustrated in Step S131, the icon 53 is displayed in the region along the right side of the imaging range R, the icon 54 is displayed in a region along an upper side of the imaging range R, and the icon 55 is displayed in a region along a left side of the imaging range R, respectively. The icons 53 to 55 at Step S131 are displayed on the displays 32a and 32b as larger images than the preset portion of the right hand H (for example, the portion closer to the fingertip than to the first joint in the index finger F). With such a configuration, the wearable device 1 can suppress selection of a plurality of the icons due to passage of the preset portion of the right hand H over a plurality of the icons, of the icons 53 to 55. That is, the wearable device 1 enables the user to easily select desired one icon. In the present embodiment, the processing of changing the sizes of the icons 53 to 55 is referred to as change processing.

As described at Step S131, when the upper limb (predetermined object) is detected in the captured image by the imagers 40 and 42, and the change of the size of a predetermined region of the upper limb in the captured image is detected, the wearable device 1 performs predetermined change processing according to the change of the size. With the configuration, the wearable device 1 can change the size of the icon to enable the user to easily select desired one icon with the upper limb (or a predetermined region in the upper limb) in the configuration to select the icon by the movement of the upper limb (or a predetermined region in the upper limb) of the user, and therefore the wearable device 1 is easy to use.

As described above, the wearable device 1 may display the icon on the displays 32*a* and 32*b* in such a manner that the size of the icon becomes larger than the size of the upper limb (or a predetermined region in the upper limb). That is, the controller 22 changes the size of the icon in such a manner that the icon (the predetermined image displayed by the display) viewed by the user on the displays 32*a* and 32*b* becomes larger than the upper limb (or a predetermined region in the upper limb) viewed by the user through the displays 32*a* and 32*b*.

With the configuration, the wearable device 1 can suppress, in a configuration to execute a function based on the icon by superposing the upper limb (or a predetermined region in the upper limb) on the icon (the predetermined image displayed by the display), selection of a plurality of icons due to superposing a predetermined region in the upper limb on a plurality of images.

At this time, the controller 22 may be configured to estimate the size of the upper limb (or a predetermined region in the upper limb) viewed by the user through the displays 32*a* and 32*b*, based on the imaging range R set in advance, of the imagers 40 and 42, and the size of the upper limb (or a predetermined region in the upper limb) in the captured image.

The "size of the icon (image) viewed by the user on the displays 32*a* and 32*b*" in the above configuration may be virtually defined as a ratio of a display region of the icon (image) to the entire region of a display region (the entire region of the imaging range R). Meanwhile, the "size of the upper limb (or a predetermined region in the upper limb) viewed by the user through the displays 32*a* and 32*b*" may be virtually defined as a ratio of a region of the upper limb (or a predetermined region in the upper limb) in the captured image to the entire region of the captured image (the entire region of the imaging range R). Then, the size of the icon (image) may be changed based on "the size of the icon (image) viewed by the user on the displays 32*a* and 32*b*" and "the size of the upper limb (or a predetermined region in the upper limb) viewed by the user through the displays 32*a* and 32*b*", which are obtained based on the definition.

As described above, the wearable device 1 may display the icon on the displays 32*a* and 32*b* in such a manner that the size of the icon becomes larger than the size of the upper limb (or a predetermined region in the upper limb) in the captured image. At this time, the "size of the icon is larger than the size of the upper limb (or a predetermined region in the upper limb)" may mean that the icon is larger than the upper limb (or a predetermined region in the upper limb) in both the two directions perpendicular to each other (for example, both the height direction and the width direction). Alternatively, the "size of the icon is larger than the size of the upper limb (or a predetermined region in the upper limb)" may mean that the icon is larger than the upper limb (or a predetermined region in the upper limb) in one of the two directions perpendicular to each other (for example, the height direction and the width direction). In this case, for example, in a case where the icons are displayed in end regions in the width direction of the imaging range R (in the case of the icons 53 and 55), like Step S131 of FIG. 17, the sizes of the icons in the height direction may be made larger than the size of the upper limb (or a predetermined region in the upper limb). In the case where the icons are displayed in end regions in the width direction of the imaging range R, the upper limb is moved in the width direction to be moved to the outside of the imaging range R while passing through the icon. Therefore, if the size of the icon in the direction (the height direction) perpendicular to the moving direction of the upper limb is made larger than the upper limb (or a predetermined region in the upper limb), the wearable device 1 can suppress the selection of a plurality of icons due to superposing the upper limb (or a predetermined region in the upper limb) on a plurality of images. Similarly, in a case where the icon is displayed in an end region in the height direction of the imaging range R (in the case of the icon 54), the size of the icon in the width direction may be made larger than the upper limb, in the wearable device 1.

As described at Step S131, the wearable device 1 may have a configuration in which the controller 22 changes the display positions of the icons 53 to 55 (display images) with changing the sizes of the icons 53 to 55 (display images).

Figure 18:
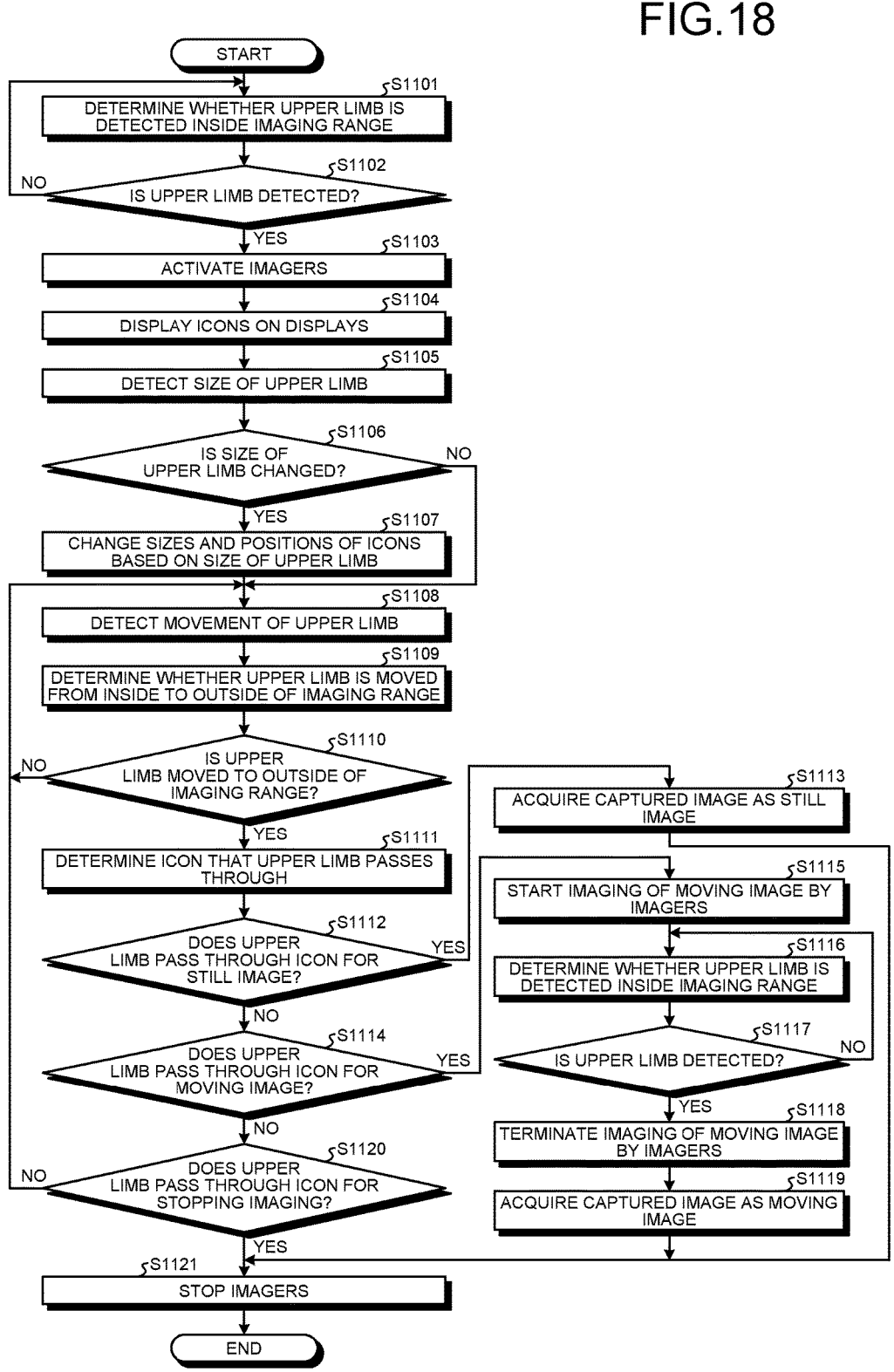
FIG. 18 is a flowchart illustrating a processing procedure according to imaging control by the wearable device.

A processing procedure of control by the wearable device 1 will be described with reference to FIG. 18. FIG. 18 is a flowchart illustrating a processing procedure according to imaging control by the wearable device 1. The processing procedure illustrated in FIG. 18 is realized when the controller 22 executes the control program 24*a*. The processing procedure illustrated in FIG. 18 is repeatedly executed when the wearable device 1 is mounted on the head or when the wearable device 1 is being operated.

As illustrated in FIG. 18, at Step S1101, the controller 22 of the wearable device 1 determines whether the upper limb is detected inside the imaging range R. Specifically, when the detector 44 detects the upper limb, the controller 22 determines that the upper limb is detected. When the upper limb is not detected (Step S1102: No), the controller 22 re-executes the processing of Step S1101.

When the upper limb is detected (Step S1102: Yes), the controller 22 proceeds to Step S1103. At Step S1103, the controller 22 activates the imagers 40 and 42. At Step S1104, the controller 22 causes the displays 32*a* and 32*b* to display the icons 53 to 55.

At Step S1105, the controller 22 detects the size of the upper limb (or a predetermined region in the upper limb) in the captured image sequentially transmitted from the video data 70 of the imagers 40 and 42 (the video data 70 temporarily stored in the storage 24). The size of the upper limb (or a predetermined region in the upper limb) may be a ratio of the upper limb (or a predetermined region in the upper limb) to the entire region of the captured image.

At Step S1106, the controller 22 determines whether the size of the upper limb (or a predetermined region in the upper limb) is changed based on a detection result of Step S1105. When it is determined that the size of the upper limb (or a predetermined region in the upper limb) is not changed (Step S1106: No), the controller 22 proceeds to Step S1108.

When it is determined that the size of the upper limb (or a predetermined region in the upper limb) is changed at Step S1106 (Step S1106: Yes), then at Step S1107, the controller 22 changes the sizes and positions of the icons 53 to 55 based on the changed size of the upper limb (or a predetermined region in the upper limb). The controller 22 proceeds to Step S1108 after terminating the processing at Step S1107.

At Step S1108, the controller 22 detects the movement of the upper limb inside the imaging range R based on the video data 70 of the imagers 40 and 42. At Step S1109, the controller 22 determines whether the upper limb is moved from the inside to the outside of the imaging range R based on a detection result of Step S1108. Specifically, when it is determined that the entire upper limb is moved to the outside of the imaging range R so that the upper limb does not appear in the captured image, the controller 22 determines that the upper limb is moved to the outside of the imaging range R. When the upper limb is not moved to the outside of the imaging range R (Step S1110: No), the controller 22 re-executes the processing of Step S1108 and subsequent steps. Alternatively, when the upper limb is not moved to the outside of the imaging range R (Step S1110: No), the controller 22 may re-execute the processing of Step S1105 and subsequent steps instead pf re-executing the processing of Step S1108 and subsequent steps.

When the upper limb is moved to the outside of the imaging range R (Step S1110: Yes), the controller 22 proceeds to Step S1111. At Step S1111, the controller 22 determines a type of an icon that the upper limb (or a predetermined portion of the upper limb) passes through. At Step S1112, when it is determined that the upper limb (or a predetermined region in the upper limb) passes through the icon 53 for still image (the image for execution of imaging of a still image by the imagers 40 and 42) (Step S1112: Yes), the controller 22 proceeds to Step S1113. At Step S1113, the controller 22 acquires the captured image as a still image. At this time, for example, the controller 22 causes the imagers 40 and 42 to image the foreground 100 at a preset focal point, acquires the captured image, and stores the captured image in the storage 24 as the imaged data 24b. After that, at Step S1121, the controller 22 stops the imagers 40 and 42. When the imagers 40 and 42 are stopped, the controller 22 terminates the processing procedure illustrated in FIG. 18.

Meanwhile, at Step S1112, when it is determined that the upper limb (or a predetermined region in the upper limb) does not pass through the icon 53 for still image (Step S1112: No), the controller 22 proceeds to Step S1114. At Step S1114, when it is determined that the upper limb (or a predetermined region in the upper limb) passes through the icon 54 for moving image (the image for execution of imaging of a moving image by the imagers 40 and 42) (Step S1114: Yes), the controller 22 proceeds to Step S1115. At Step S1115, the controller 22 starts imaging of the moving image by the imagers 40 and 42. At Step S1116, the controller 22 determines whether the upper limb is detected inside the imaging range R. When it is determined that the upper limb is not detected (Step S1117: No), the controller 22 re-executes the processing of Step S1116.

When it is determined that the upper limb is detected (Step S1117: Yes), the controller 22 proceeds to Step S1118. At Step S1118, the controller 22 terminates the imaging of the moving image by the imagers 40 and 42. At Step S1119, the controller 22 acquires the captured image as the moving image. Specifically, the controller 22 acquires the captured image as the moving image captured by the imagers 40 and 42, and stores the captured image in the storage 24 as the imaged data 24b. After that, at Step S1121, the controller 22 stops the imagers 40 and 42. When the imagers 40 and 42 are stopped, the controller 22 terminates the processing procedure illustrated in FIG. 18.

Meanwhile, at Step S1114, when it is determined that the upper limb does not pass through the icon 54 for moving image (Step S1114: No) the controller 22 proceeds to Step S1120. At Step S1120, when it is determined that the upper limb passes through the icon 55 for stopping imaging (the image for cancellation of the imaging standby state of the imagers 40 and 42) (Step S1120: Yes), the controller 22 proceeds to Step S1121. At Step S1121, the controller 22 stops the imagers 40 and 42. When the imagers 40 and 42 are stopped, the controller 22 terminates the processing procedure illustrated in FIG. 18.

At Step S1120, when it is determined that the upper limb does not pass through the icon 55 for stopping imaging (Step S1120: No), the controller 22 re-executes the processing of Step S1108. That is, when the upper limb does not pass through any of the icons 53 to 55 when the upper limb is moved to the outside of the imaging range R, the controller 22 does not acquire the captured image, and maintains the imaging standby state. With the configuration, the wearable device 1 can omit the processing of activating the imagers 40 and 42 again when the upper limb which has moved to the outside of the imaging range R is moved to the inside of the imaging range R.

In the example illustrated in FIGS. 17 and 18, a configuration to display the icon 55 for stopping imaging (the image for cancellation of the imaging standby state of the imagers 40 and 42) in the wearable device 1 is described. However, embodiments are not limited thereto. Another configuration not to display the icon 55 for stopping imaging may be employed. For example, in a case where the upper limb does not pass through a predetermined icon (the icon 53, 54, of the like) when the upper limb is moved to the outside of the imaging range R, the wearable device 1 may be configured to stop the imagers 40 and 42.

In the example of FIGS. 17 and 18, a configuration to perform the change processing (processing of changing the size of the display image) based on the size of the upper limb in the captured image is described. However, embodiments are not limited thereto. As another example according to the present embodiment, the wearable device 1 may be configured to detect a distance between the wearable device 1 (the wearable device) and the upper limb (predetermined object) in the front and back direction of the user by the distance-measuring unit 46, and to perform, when change of the distance is detected, the change processing according to the change of the distance. For example, the size of the upper limb (or the size of the upper limb included in the captured image to the entire region of the captured image) viewed inside the captured image range R becomes larger as the distance between the wearable device 1 and the upper limb becomes smaller. Therefore, if the image of the registered predetermined region in the upper limb (right hand H) becomes larger, the selection operation by the registered predetermined region in the upper limb can be more easily performed.

In the above described embodiments, when the size of a predetermined region of a predetermined object (upper limb) in the captured image is a first size or more, the controller 22 of the wearable device 1 may not perform the processing of changing the size of the display image according to the size of the predetermined region. For example, when the upper limb is detected in the captured image with an unreasonably large size by an action different from an operation, such as by the user touching the wearable device 1, for example, the wearable device 1 does not change the size of the display image, and thus does not bother the user.

When the distance between the wearable device and a predetermined object (upper limb) existing in a real space in the front and back direction of the user is a second distance or less, the controller 22 of the wearable device 1 may be configured not to perform the processing of changing the size of the display image according to the distance.

When the size of a predetermined region of a predetermined object (upper limb) in the captured image is a second size or less, the controller 22 of the wearable device 1 may not perform the processing of changing the size of the display image according to the size of the predetermined region. For example, when the upper limb is detected in the captured image with an unreasonably small size, that is, when the upper limb of another person in front of the user is detected, the wearable device 1 does not perform the processing of changing the size of the display image and thus does not bother the user.

When the distance between the wearable device and a predetermined object (upper limb) existing in a real space in the front and back direction of the user is a first distance or more, the controller 22 of the wearable device 1 may be configured not to perform the processing of changing the size of the display image according to the distance.

Various modifications are described below. In the above described embodiments, a configuration to change the display positions of the plurality of icons 53 to 55 with changing the sizes of the icons 53 to 55 is exemplified. However, embodiments are not limited thereto. For example, the controller 22 may determine whether the upper limb detected in the captured image is a right upper limb or a left upper limb, and may change display positions of a plurality of icons (images) according to a determination result.

For example, when it is determined that the upper limb is the right upper limb, the controller 22 displays the plurality of icons in parallel along the right end side in a display region of the displays 32a and 32b (or the imaging range R). In this display state, when it is determined that the upper limb is the left upper limb, the controller 22 may display the icons 53 to 55 in parallel along the left end side in the display region of the displays 32a and 32b (or the imaging range R). When it is determined that the upper limb is the right upper limb and the size of the upper limb in the captured image is a predetermined size or more, the controller 22 may divide and display the plurality of icons into a region along the right end side and a region along the lower end side in the display region of the displays 32a and 32b. Meanwhile, when it is determined that the upper limb is the left upper limb and the size of the upper limb in the captured image is a predetermined size or more, the controller 22 may divide and display the plurality of icons into a region along the left end side and a region along the lower end side in the display region of the displays 32a and 32b.

As described above, the wearable device 1 may display the icons 53 to 55 in appropriate positions regardless of existence or non-existence of the change of the sizes of the icons 53 to 55, and regardless of whether the upper lib detected in the captured image is the right upper limb or the left upper limb. For example, the controller 22 of the wearable device 1 may display the icons 53 to 55 on the lower side in the display region (or the imaging range R). The wearable device 1 according to the present embodiment is mounted on the head, and thus the upper limb of the user is usually positioned on the lower side in the imaging range R of the wearable device 1. In this case, while the user needs to raise the upper limb upward in order to position the upper limb inside the imaging range R, an operation to lower the upper limb downward to move the upper limb to the outside of the imaging range R is easy for the user. Therefore, the configuration to display the icons 53 to 55 (display images) on the lower side in the display region (or the imaging range R) is easy to use.

When the controller 22 detects entry of the upper limb into the imaging range R, the wearable device 1 may determine the end side from which the upper limb enters in the imaging range R, and display the icons 53 to 55 (images) on the determined end side in the display region of the displays 32a and 32b (or the imaging range R). For example, when the upper limb enters the imaging range R from the right side, the controller 22 displays the icons 53 to 55 on the right side in the display region of the displays 32a and 32b (or the imaging range R).

The icon may be displayed at an appropriate position according to content of the icon. For example, when an icon to be displayed is the icon 55 (icon for stopping imaging), the icon 55 may be displayed in a relatively small region such as an upper right corner portion (or an upper left corner portion) in the imaging range R. Thereby, the upper limb hardly passes through the icon 55 unless the user intentionally moves the upper limb. In this regard, the wearable device 1 may be applied to a case in which work procedure in farm work or the like is recorded as a moving image. For example, work may be acquired as a moving image by the wearable device 1 mounted on the user while the user who mounts the wearable device 1 performs actual work. In such a case, during the work (during acquisition of a moving image), even if the upper limb is moved from the inside to the outside of the imaging range R by the work, the upper limb hardly passes through the icon 55 (icon for stopping imaging), and thus the work recording is not terminated at a wrong timing.

In a case where a work procedure is recorded as a moving image, it is not always true that all the users who perform actual work can efficiently record the moving image. For example, for certain people, the work may be more redundant than usual due to involvement of the recording of the moving image, and contents of the recorded moving image may be redundant. In such a case, as exemplified in FIGS. 17 and 18, the wearable device 1 suspends the acquisition of the moving image when the upper limb does not pass through any of the icons when the upper limb is moved to the outside of the imaging range R, and resumes the acquisition when the upper limb enters the imaging range R. As a result, the wearable device 1 can omit the recording of the moving image in a period of time irrelevant to the work to be recorded, and does not need to create a redundant moving image. The wearable device 1 may be provided with a new icon (suspension icon) for suspending a moving image. In this case, the wearable device 1 may be configured to suspend the recording of the moving image when the upper limb is moved from the inside to the outside of the imaging range R while passing through the suspension icon, and to resume the recording of the moving image when the upper limb is moved from the outside to the inside of the imaging range R while passing through the suspension icon.

In the above described embodiments, a configuration in which the controller 22 of the wearable device 1 performs the function based on the icon that the upper limb (or a predetermined region in the upper limb) passes through, among the plurality of icons 53 to 55, is exemplified. However, embodiments are not limited thereto. For example, the controller 22 of the wearable device 1 may be configured to consider the icon on which the upper limb (or a predetermined region in the upper limb) is superposed for a predetermined time or more as a selected icon among the plurality of icons 53 to 55, and execute the function based on the selected icon. When such a configuration is employed, if the icon is displayed outside the imaging range R, as described above, the upper limb does not need to enter the captured image for acquisition of the captured image.

In the above described embodiments, a case in which the function based on the icon is a function (acquisition of a still image, acquisition of a moving image, cancellation of the imaging standby state, or the like) regarding the acquisition processing method of the captured image (the video data 70 sequentially transmitted from the imagers 40 and 42 in the imaging standby state) is exemplified. However, embodiments are not limited thereto. For example, the function based on the icon may be a function according to a processing method for the captured image 71 acquired by the imagers 40 and 42. Examples of the icons include an icon indicating a function to store the acquired captured image to a predetermined folder (an icon mimicking a folder), an icon indicating a function to be transferred to an electronic mail composing screen (a function to convert the captured image into data attached to an electronic mail), and an icon indicating a function to be transferred to a screen of an electronic bulletin board, a blog, a social networking service (SNS), or the like (a function to use the captured image in an electronic bulletin board, a blog, an SNS, or the like).

The wearable device 1 in the present embodiment changes the size of the display image (icon), as the predetermined change processing according to the change of the size of the upper limb in the captured image or the change of the distance between the wearable device and the upper limb. In the above examples, a configuration to change the size of the display region of the display image (icon) is described, as the change of the size of the display image (icon). However, embodiments are not limited thereto. An example of other change processing is illustrated in FIG. 19.

FIG. 19 is a diagram illustrating an example of performing various types of the change processing. FIG. 19 illustrates an example of performing various types of the change processing according to the change of the size of the upper limb in the captured image or the change of the distance between the wearable device and the upper limb. FIG. 19 illustrates three patterns as the change processing in a table. The upper row in the table in FIG. 19 illustrates contents of the captured image 71 by the imagers 40 and 42. The left side in FIG. 19 illustrates a case in which the upper limb in the captured image 71 is large (the distance between the wearable device and the upper limb is small). The right side in FIG. 19 illustrates a case in which the upper limb in the captured image 71 is small (the distance between the wearable device and the upper limb is large). The lower rows in the table in FIG. 19 illustrate display images 56 displayed by the displays 32a and 32b. The display image 56 is an image including, for example, text information and a photograph (or illustration or the like).

A pattern 1 illustrates an example of enlarging and reducing the display image 56 without depending on the position of the upper limb, as the change processing. When the size of the upper limb in the captured image 71 becomes smaller (or the distance between the wearable device and the upper limb becomes larger), the display image 56 is transitioned from the state (1-1) to the state (1-2), and enlarged display using the center of the display image 56 as the center of enlargement and reduction is performed. The display image 56 is enlarged and displayed at an enlargement rate proportional to an amount of the change of the size of the upper limb in the captured image 71. In the example illustrated in FIG. 19, a configuration to enlarge the display image 56 when the size of the upper limb in the captured image 71 becomes smaller (or the distance between the wearable device and the upper limb becomes larger) is exemplified. However, embodiments are not limited thereto. For example, the example illustrated in FIG. 19 may be configured to reduce the display image 56 when the size of the upper limb in the captured image 71 becomes smaller (or the distance between the wearable device and the upper limb becomes larger). In FIG. 19, a portion of the display image 56, which is enlarged and displayed in the state (1-2), is illustrated by a virtual broken line in the state (1-1).

A pattern 2 illustrates an example of enlarging and reducing the display image 56 according to the position of the upper limb, as the change processing. When the size of the upper limb in the captured image 71 becomes smaller (or the distance between the wearable device and the upper limb becomes larger), the display image 56 is transitioned from the state (2-1) to the state (2-2), and enlarged display using a predetermined region (for example, a fingertip position) of the upper limb in the display image 56 as the center of enlargement and reduction is performed. In the state (2-1), a position specified with the predetermined region (for example, the fingertip position) of the upper limb in the display image 56 is illustrated by a virtual broken line. That is, the position is not actually displayed to be visually recognized. However, embodiments are not limited thereto. In the present embodiment, a configuration to display the position as a visually recognizable image (cursor) may be employed. In the example illustrated in FIG. 19, a configuration to enlarge the display image 56 when the size of the upper limb in the captured image 71 becomes smaller (or the distance between the wearable device and the upper limb becomes larger) is exemplified. However, embodiments are not limited thereto. For example, the example illustrated in FIG. 19 may be configured to reduce the display image 56 when the size of the upper limb in the captured image 71 becomes smaller (or the distance between the wearable device and the upper limb becomes larger).

A pattern 3 illustrates an example of enlarging and reducing only text included in a predetermined region 57 determined according to the position of the upper limb, as the change processing. When the size of the upper limb in the captured image 71 becomes smaller (or the distance between the wearable device and the upper limb becomes larger), the display image 56 is transitioned from the state (3-1) to the state (3-2), and enlarged display of the text included in a region 57 is performed. In the example illustrated in FIG. 19, a configuration to enlarge the text included in the region 57 when the size of the upper limb in the captured image 71 becomes smaller (or the distance between the wearable device and the upper limb becomes larger) is exemplified. However, embodiments are not limited thereto. For example, the example illustrated in FIG. 19 may be configured to reduce the text included in the region 57 when the size of the upper limb in the captured image 71 becomes smaller (or the distance between the wearable device and the upper limb becomes larger).

Various modes may be employed as the change processing, in addition to the patterns 1 to 3. For example, when the display image is an image including text information and a photograph (or illustration or the like), a configuration to enlarge only the text information without enlarging the photograph or a configuration to enlarge only the photograph without enlarging the text information may be employed as the change processing.

As the change processing, a slider (for example, a knob-like operation part) to be displayed may be enlarged and reduced at the time of activation of an application, in addition to the change of the display mode of the display image. For example, the slider includes a change bar for changing the sound volume in playback of music during activation of a music playback application. For example, the slider includes a seek bar for displaying a playback portion of data and for changing the playback portion with a predetermined operation during activation of a moving image playback application. In such a case, for example, the change processing may associate a coordinate position in the imaging range R of the imagers 40 and 42 or in the detection range of the detector 44 with a coordinate position in the display region of the displays 32a and 32b. In the change processing, the slider may be selected based on existence of the upper limb in a predetermined position in the imaging range R (detection range) corresponding to the coordinate position where the slider is displayed in the display region. Then, the change processing moves the display position of the slider in the display region based on the movement of the coordinate of the upper limb in the imaging range R (detection range) when the upper limb is moved in the selected state of the slider. Then, the change processing changes the sound volume or the playback portion based on the movement of the display position of the slider.

For example, the change processing enlarges the slider, that is, enlarges a region of coordinates considered as the display position of the slider, when the size of the upper limb in the captured image becomes larger. Therefore, in the wearable device 1, a range in which the slider is selectable with the upper limb in the imaging range R (detection range) is enlarged.

In the above described embodiments, an example of performing the enlargement and the reduction of the display image is described as the change processing. However, the change processing is not limited thereto. For example, when music playback is performed in the wearable device 1, a playback sound volume, a playback speed, a sound tone, or the like of the music may be able to be changed to any of a plurality of patterns, as the predetermined change processing according to the change of the size of the upper limb in the captured image, or the change of the distance between the wearable device and the upper limb. Further, for example, as the change processing, ISO sensitivity, white balance, shutter speed, aperture, depth of field, focal length, or the like of the imagers 40 and 42 of the wearable device 1 on acquiring the captured image may be able to be changed.

The wearable device 1 may be configured to execute processing of enlarging and reducing a predetermined image by a predetermined operation of the upper limb in the captured image by the imagers 40 and 42. In the present embodiment, points described below are different from the above-described embodiment.

Figure 20:
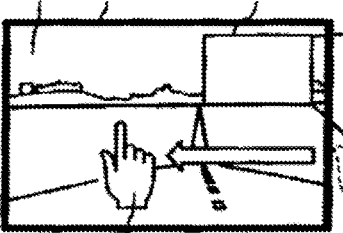
FIG. 20 is a diagram for describing an example of control provided by the control program of the wearable device.

An example of control provided by the control program 24a of the wearable device 1 will be described with reference to FIG. 20. FIG. 20 is a diagram for describing an example of control provided by the control program 24a of the wearable device 1. The example illustrated in FIG. 20 is an example of control according to imaging using a preview image by the wearable device 1.

At Step S140 illustrated in FIG. 20, when entry of the right hand H into the imaging range R is detected by the detector 44, the wearable device 1 transfers the imagers 40 and 42 to the imaging standby state. The wearable device 1 temporarily stores, in the storage 24, the video data 70 sequentially transmitted from the imagers 40 and 42 in the imaging standby state.

At Step S140, the wearable device 1 causes the displays 32a and 32b to display the video data 70 as the preview image 60 positioned inside the imaging range R. The range of the preview image 60 may be the same size as the imaging range R, or may be narrower than the imaging range R. In the example illustrated in FIG. 20, a case in which the wearable device 1 displays the preview image 60 in the upper right inside the imaging range R will be described. At Step S140, the user views the foreground 100 and the preview image 60 in the imaging range R of the imagers 40 and 42 through the displays 32a and 32b.

At Step S141, the user moves the right hand H to a position superposed on the preview image 60 as viewed from the user, in the imaging range R viewed through the displays 32a and 32b. At this time, the right hand H of the user is in a state in which the ball of the index finger and the ball of the thumb are in contact with each other (or they pinch with each other).

At Step S142, the user performs an operation to separate the index finger and the thumb in a state in which the right hand H is superposed on the preview image 60. The wearable device 1 then enlarges the preview image 60 upon detection of the operation to separate the index finger and the thumb. That is, the operation to separate the index finger and the thumb is an operation for executing processing of enlarging the preview image 60. The wearable device 1 enlarges the image at an enlargement rate based on the distance by which the index finger and the thumb are separated. Not only the operation to separate the index finger and the thumb from the state in which the index finger and the thumb are in contact with each other, but also an operation to further separate the index finger and the thumb from a state in which the index finger and the thumb are originally separated may be employed as the operation for executing the processing of enlarging the preview image 60.

The wearable device 1 may execute processing of reducing the preview image 60 when an operation to bring the index finger and the thumb close to each other is detected.

As described at Step S142, the wearable device 1 detects the upper limb or a predetermined region in the upper limb (the right hand H or a portion registered in advance, of the right hand H) in the captured image by the imagers 40 and 42, and can execute the processing (change processing) of enlarging and reducing an image displayed by the displays 32a and 32b with the upper limb or a predetermined operation of the upper limb in the captured image. With the configuration, the wearable device 1 can change the size of the image to a size desired by the user, and thus becomes easy to use.

Referring back to Step S142, the user views the right hand H moving in front of the wearable device 1 and the foreground 100, inside the imaging range R, through the displays 32a and 32b. In this case, the user views the preview image 60 displayed on the displays 32a and 32b. The user recognizes that his/her own right hand H is displayed in the preview image 60. After that, at Step S143, the user moves the right hand H toward the outside of the imaging range R to allow the right hand H to disappear from the preview image 60.

At Step S143, the wearable device 1 determines whether the right hand H is moved from the inside to the outside of the range (imaging range R) of the preview image 60 based on a detection result of the detector 44. When it is determined that the right hand H is moved to the outside of the range, the right hand H disappears from the preview image 60, and thus the wearable device 1 transfers the imagers 40 and 42 to the imaging state to image the foreground 100. The imagers 40 and 42 image the foreground 100 at a preset focal point. The wearable device 1 acquires the captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

The upper limb disappears from the preview image 60 when the right hand H is moved from the inside to the outside of the range (imaging range R) of the preview image 60. Therefore, the user can image a front image by the imagers 40 and 42 by simply moving the upper limb to disappear while viewing the preview image 60. As a result, the wearable device 1 can improve operability and convenience of the imagers 40 and 42.

Figure 21A:
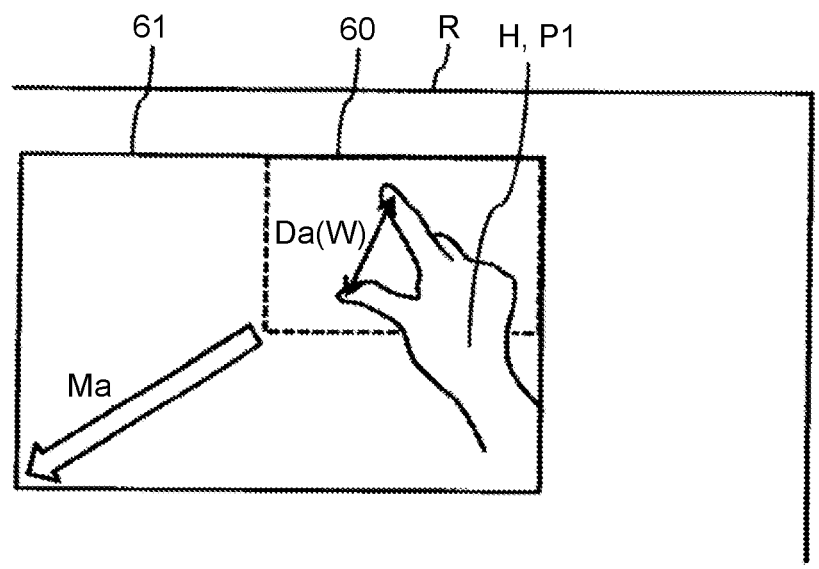
FIG. 21A is a diagram for describing an example of changing a size of a display image based on an operation of an upper limb.
Figure 21B:
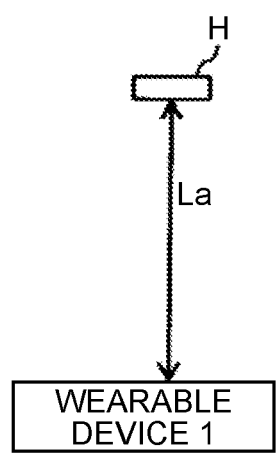
FIG. 21B is a diagram for describing an example of changing a size of a display image based on an operation of an upper limb.
Figure 21C:
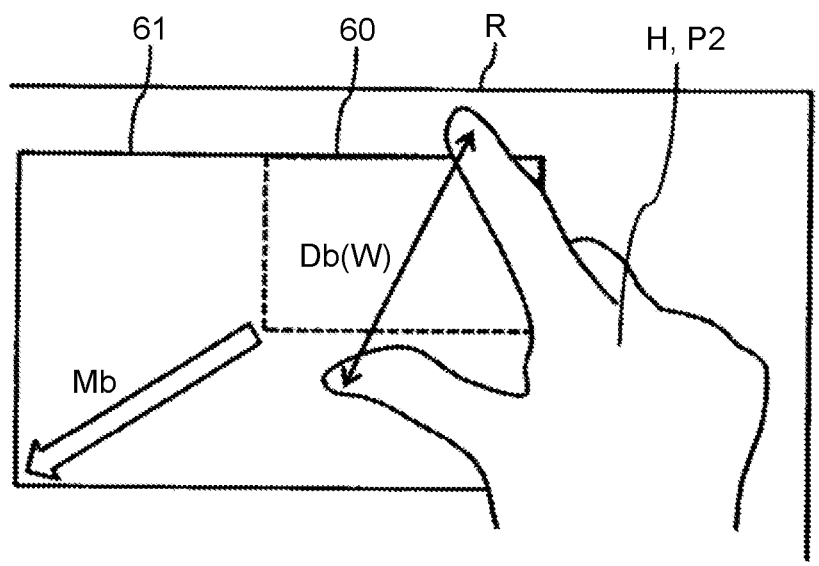
FIG. 21C is a diagram for describing an example of changing a size of a display image based on an operation of an upper limb.
Figure 21D:
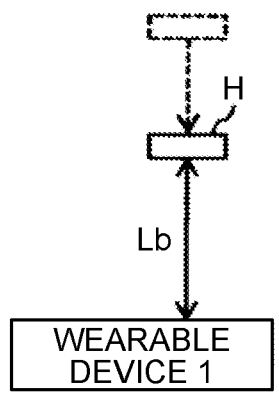
FIG. 21D is a diagram for describing an example of changing a size of a display image based on an operation of an upper limb.

Then, an example of a configuration to change the size of a display image (to enlarge and reduce an image) based on operations of the upper limb will be described in detail with reference to FIGS. 21A to 21D. FIGS. 21A to 21D are diagrams for describing an example of changing the size of a display image based on operations of the upper limb. Between FIGS. 21A and 21B and FIGS. 21C and 21D, the length between the wearable device 1 and the upper limb (hand) may be different from each other. FIGS. 21A and 21C illustrate a state in which the preview image 60 is enlarged with a predetermined operation of the upper limb. FIGS. 21A and 21C illustrate the preview image 60 before enlargement by the broken line, and a preview image 61 after enlargement by the solid line. FIGS. 21B and 21D are schematic diagrams illustrating a distance L between the wearable device 1 and the upper limb (right hand H) in the front and back direction of the user.

In FIGS. 21A to 21D, similarly to the contents described in FIG. 20, the wearable device 1 detects the upper limb (predetermined object) from the captured image by the imagers 40 and 42, and detects a predetermined operation of the upper limb (the operation to separate the index finger and the thumb). The wearable device 1 then executes the processing of enlarging and reducing the preview image 60 based on the operation to separate the index finger and the thumb. The enlargement and reduction processing is referred to as change processing because the processing changes the size of the image at a predetermined enlargement and reduction rate. Then, an enlargement and reduction rate M in the enlargement and reduction processing (change processing) is referred to as change rate. The enlargement and reduction rate M in the enlargement and reduction processing is changed according to a distance D by which the index finger and the thumb are separated from each other. That is, the enlargement and reduction rate M is defined by the formula 1 (the formula 1: the enlargement and reduction rate $M=aD\times100$ (a is a constant)). The distance D is a direct distance between a predetermined position of a tip end portion of the index finger and a predetermined position of a tip end portion of the thumb in the captured image by the imagers 40 and 42, for example. Therefore, when the user separates the index finger and the thumb by a larger distance, the preview image 60 is enlarged at a larger enlargement rate.

The wearable device 1 according to the present embodiment may further have, in the above configuration, a configuration to change the enlargement and reduction rate M (change rate) of the enlargement and reduction processing (change processing) according to a size P of the upper limb (or a predetermined region in the upper limb) in the captured image. That is, the enlargement and reduction rate M is defined by the formula 2 (the formula 2: the enlargement and reduction rate $M=aD\times P'\times100$ (a is a constant)), where P' is a converted value based on the size P of the upper limb (or a predetermined region in the upper limb). The converted value P' is defined to become a smaller value as the size P of the upper limb (or a predetermined region in the upper limb) becomes a larger value. The wearable device 1 stores a conversion table of the size P of the upper limb (or a predetermined region in the upper limb) and the converted value P' in the storage 24, and acquires the converted value P' by reference to the conversion table based on the detected size P.

The upper limb (right hand H) in the case of FIGS. 21C and 21D exists in a position closer to the wearable device 1 than the upper limb (right hand H) in the case of FIGS. 21A and 21B (see FIG. 21D and the like). Then, the upper limb (right hand H) is viewed in a larger state than the upper limb (right hand H) in the case of FIGS. 21A and 21B (see FIG. 21C). The wearable device 1 acquires a converted value Pa' in the case of FIGS. 21A and 21B and a converted value Pb' in the case of FIGS. 21C and 21D by reference to the conversion table according to the size P of the upper limb (right hand H) in the captured image. The converted value Pb' is a smaller value than the converted value Pa' in the case of FIGS. 21A and 21B.

For example, in the case of FIGS. 21A and 21B, and in the case of FIGS. 21C and 21D, when the user separates the thumb and the index finger by the same distance W (a distance in a real space) (that is, when the user performs the same operation), a distance Da by which the index finger and the thumb are separated is detected in the captured image by the controller 22 in the case of FIGS. 21A and 21B. Meanwhile, a distance Db, which is larger than the distance Da, is detected by the controller 22 in the case of FIGS. 21C and 21D. According to calculation means of the formula 1 (a calculation formula without depending on the converted value P'), the preview image 60 is enlarged at an enlargement rate Mb in the case of FIGS. 21C and 21D, which is larger than an enlargement rate Ma in the case of FIGS. 21A and 21B.

However, according to the wearable device 1 of the present embodiment, the formula 2 (calculation means depending on the converted value P') may be applied. When the formula 2 is applied, the preview image 60 is enlarged at the enlargement rate Mb multiplied by the converted value Pb' in the case of FIGS. 21C and 21D, the converted value Pb' being smaller than the converted value Pa' in the case of FIGS. 21A and 21B. Therefore, the size of a preview image 61 after enlargement can be made closer to the preview image 61 after enlargement in the case of FIGS. 21A and 21B. FIGS. 21A to 21D illustrate cases in which the converted values Pa' and Pb' are set so that the enlargement rates Ma and Mb become the same.

As described above, the wearable device 1 according to the present embodiment is a wearable device 1 including the controller 22 that performs a predetermined change processing (processing of enlarging and reducing an image) according to a displacement (the distance D) of a predetermined object by a predetermined operation, when the predetermined object (the upper limb (or a predetermined region in the upper limb) is detected in the captured image by the imagers 40 and 42, and the predetermined operation (the operation to separate the index finger and the thumb) of the predetermined object is detected. The wearable device 1 changes a change rate (enlargement and reduction rate M) per unit displacement of the predetermined object in the change processing according to the size of the predetermined object in the captured image. With the configuration, for example, in a case in which the upper limb exists in a position distant from the wearable device 1, and in a case in which the upper limb exists in a position close to the wearable device 1, the display control based on the predetermined operation (gesture) of the upper limb can be made approximately the same, and thus the wearable device 1 becomes easy to use.

In the example, a configuration to change the change rate (enlargement and reduction rate) in the change processing based on the size of the upper limb in the captured image is described. However, embodiments are not limited thereto. For example, the wearable device 1 may be configured to change the change rate (enlargement and reduction rate) based on the distance L between the wearable device 1 (the wearable device) and the upper limb (predetermined object) in the front and back direction of the user, the distance L being detected by the distance-measuring unit 46.

In this case, in the wearable device 1, the enlargement and reduction rate M is defined by the formula 3 (the formula 3: the enlargement and reduction rate M=aD×L'×100 (a is a constant)), where L' is a converted value based on the distance L between the wearable device 1 (the wearable device) and the upper limb (predetermined object) (a conversion table for acquiring a converted value L' from the distance L is stored in the storage). The converted value L' is defined to be a larger value as the distance L between the wearable device 1 (the wearable device) and the upper limb (predetermined object) becomes s larger value.

The upper limb (right hand H) in the case of FIGS. 21C and 21D exists in a position closer to the wearable device 1 than the upper limb (right hand H) in the case of FIGS. 21A and 21B (see FIG. 21D). Then, the upper limb (right hand H) is viewed in a larger state than the upper limb (right hand H) in the case of FIGS. 21A and 21B (see FIG. 21C). The wearable device 1 acquires a converted value La' in the case of FIGS. 21A and 21B and a converted value Lb' in the case of FIGS. 21C and 21D by reference to the conversion table according to the distance L between the wearable device and the upper limb (right hand H). The converted value Lb' is a smaller value than the converted value La' in the case of FIGS. 21A and 21B.

Then, when the formula 3 is applied, the preview image 60 is enlarged at the enlargement rate Mb multiplied by the converted value Lb' in the case of FIGS. 21C and 21D, the converted value Lb' being smaller than the converted value La' in the case of FIGS. 21A and 21B. As a result, the wearable device 1 can make the size of the preview image 61 after enlargement close to the size of the preview image 61 after enlargement in the case of FIGS. 21A and 21B.

Figure 22:
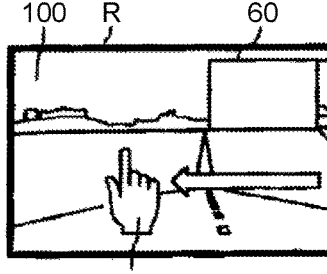
FIG. 22 is a diagram for describing another example of the control provided by the control program of the wearable device.
Figure 22:
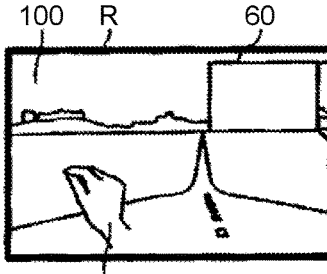
Figure 22:
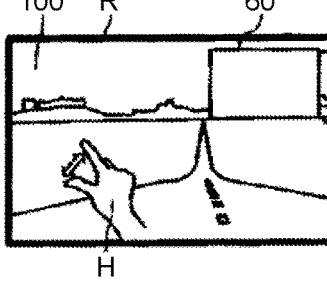
Figure 22:
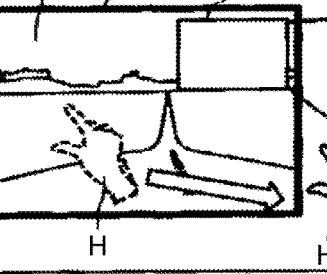

Another example of the control provided by the control program 24a of the wearable device 1 will be described with reference to FIG. 22. FIG. 22 is another example of the control provided by the control program 24a of the wearable device 1. In the example illustrated in FIG. 20, processing of enlarging and reducing a preview image with a predetermined operation of the upper limb is described. However, in the example illustrated in FIG. 22, an example of performing zoom processing with a predetermined operation of the upper limb will be described.

At Step S150 illustrated in FIG. 22, when entry of the right hand H into the imaging range R is detected by the detector 44, the wearable device 1 transfers the imagers 40 and 42 to the imaging standby state. The wearable device 1 temporarily stores, in the storage 24, the video data 70 sequentially transmitted from the imagers 40 and 42 in the imaging standby state.

At Step S150, the wearable device 1 causes the displays 32a and 32b to display the preview image 60 as the video data 70 positioned inside the imaging range R. In the example illustrated in FIG. 22, the wearable device 1 displays the preview image 60 in the upper right inside the imaging range R.

At Step S151, the user is in a state in which the ball of the index finger and the ball of the thumb of the right hand H are in contact with each other (or they pinch with each other).

At Step S152, the user performs the operation to separate the index finger and the thumb at a position where the right hand H is not superposed on the preview image 60 inside the imaging range R. Then, at Step S152, the wearable device 1 executes the zoom processing (change processing) upon detection of the operation to separate the index finger and the thumb. The wearable device 1 detects the distance by which the index finger and the thumb are separated from each other, and performs the zoom processing based on the detected distance. The zoom processing is processing of identifying a zoom-in or zoom-out zoom range in the imaging range R based on the detected distance and a conversion table, for example. The wearable device 1 may causes the displays 32a and 32b to display the identified zoom range to be positioned inside the imaging range R, when the zoom processing is executed. Not only the operation to separate the index finger and the thumb from the state in which the index finger and the thumb are in contact with each other, but also an operation to further separate the index finger and the thumb from a state in which the index finger and the thumb are separated from each other may be the operation for executing the zoom processing.

The wearable device 1 may execute processing of reducing the preview image 60 when an operation to bring the index finger and the thumb close to each other is detected.

As described at Step S152, the wearable device 1 detects the upper limb or a predetermined portion in the upper limb (the right hand H or a portion registered in advance, of the right hand H) in the captured image by the imagers 40 and 42, and can execute the zoom processing with a predetermined operation of the upper limb or a predetermined region in the upper limb in the captured image. With the configuration, the wearable device 1 can acquire the video data 70 with a size desired by the user, and thus becomes easy to use.

Referring back to Step S152, the user views the right hand H moving in front of the wearable device 1 and the foreground 100, inside the imaging range R, through the displays 32a and 32b. In this case, the user views the preview image 60 displayed on the displays 32a and 32b. The user recognizes that his/her own right hand H is displayed in the preview image 60. After that, at Step S153, the user moves the right hand H to disappear from the preview image 60 toward the outside of the imaging range R.

At Step S153, the wearable device 1 determines whether the right hand H is moved from the inside to the outside of the range (imaging range R) of the preview image 60 based on the detection result of the detector 44. When it is determined that the right hand H is moved to the outside of the range (or it is determined that the right hand H disappears from the preview image 60), the wearable device 1 transfers the imagers 40 and 42 to the imaging state to image the foreground 100. The imagers 40 and 42 image the foreground 100 at a preset focal point. The wearable device 1 acquires the captured image 71 by the imagers 40 and 42, and stores the captured image 71 in the storage 24 as the imaged data 24*b*. After that, the wearable device 1 stops the imagers 40 and 42, and transfers the imagers 40 and 42 to the non-activated state.

In this way, the wearable device 1 displays the preview image 60 in the imaging range R, and acquires the captured image 71 by the imagers 40 and 42 when it is determined that the right hand H (upper limb) disappears from the preview image 60. With the configuration, the user can image a front image by the imagers 40 and 42 by simply moving the upper limb to disappear while viewing the preview image 60. As a result, the wearable device 1 can improve operability and convenience of the imagers 40 and 42.

In the example illustrated in FIG. 22, similarly to the example illustrated in FIG. 20, the wearable device 1 is a wearable device 1 including the controller 22 that detects the predetermined object (upper limb (or a predetermined region in the upper limb)) in the captured image by the imagers 40 and 42 and detects the predetermined operation of the predetermined object (the operation to separate the index finger and the thumb), and executes the change processing (zoom processing) based on the predetermined operation. The wearable device 1 may have the change rate (zoom rate) in the change processing that is changed depending on the size of the predetermined object in the captured image. With the configuration, for example, in a case in which the upper limb exists in a position distant from the wearable device 1, and in a case in which the upper limb exists in a position close to the wearable device 1, the imaging control (zoom processing) based on the predetermined operation (gesture) of the upper limb can be made approximately the same, and thus the wearable device 1 becomes easy to use.

Similarly to the above description, the wearable device 1 may be configured to change the change rate (zoom rate) based on the distance L between the wearable device 1 (the wearable device) and the upper limb (predetermined object) in the front and back direction of the user, the distance L being detected by the distance-measuring unit 46, as another example.

FIG. 23 is a diagram illustrating an example of a conversion table in which the size P (or the distance L between the upper limb and the wearable device) of the upper limb in the captured image and the converted value P' (or L') are associated with each other. Hereinafter, an example regarding the change processing based on the size P of the upper limb in the captured image will be described.

FIG. 23 illustrates two patterns. A pattern P1 illustrates an example in which the converted value is changed in stages as the size P of the upper limb in the captured image is changed in stages, and the enlargement and reduction rate (change rate) of the image in a unit movement distance (for example, when the index finger and the thumb are separated by 1 cm) of the upper limb is changed in stages. That is, the pattern P1 is a pattern in which the change processing is performed at a change rate to which the converted value is applied. However, in the present embodiment, the pattern is not limited to the pattern P1. A pattern P2 is an example in which the change processing based on the change rate is not executed while the size P of the upper limb in the captured d image falls within a predetermined range. For example, when the size P of the upper limb in the captured image is 21% or more, the converted value is not applied, that is, the change processing based on the change rate is not executed, and another change processing is performed. As another change processing, processing of changing the size of the display image in such a manner that two corners facing each other, of a predetermined image, are matched with (are disposed along) a position of the fingertip of the index finger and a position of the fingertip of the thumb. The pattern P2 executes the change processing based on the change rate, similarly to the pattern P1, when the size P of the upper limb in the captured image is 20% or less.

Figure 24:
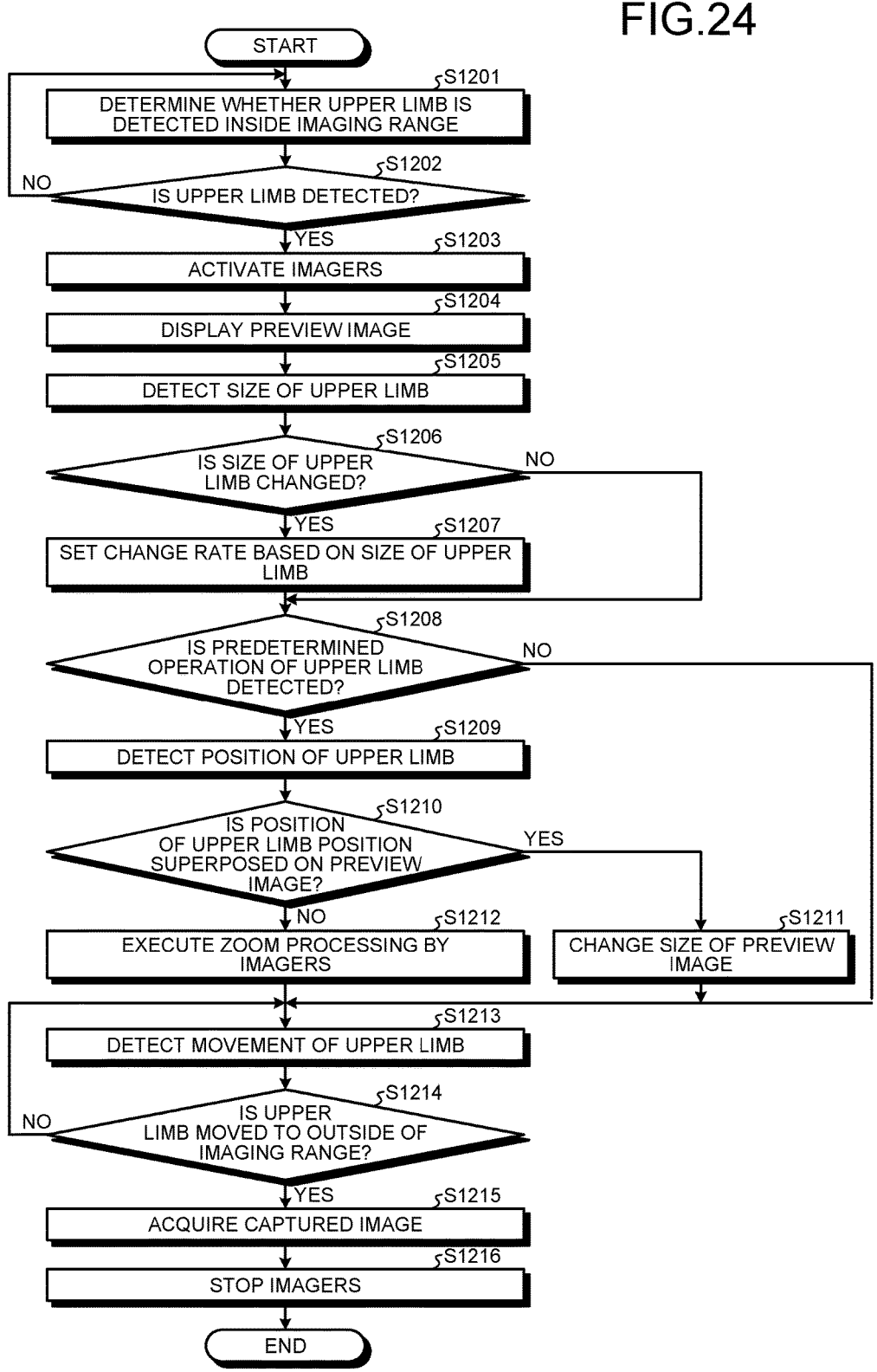
FIG. 24 is a flowchart illustrating a processing procedure according to imaging control by the wearable device.

A processing procedure of control by the wearable device 1 will be described with reference to FIG. 24. FIG. 24 is a flowchart illustrating a processing procedure according to imaging control by the wearable device 1. The processing procedure illustrated in FIG. 24 is realized when the controller 22 executes the control program 24*a*. The processing procedure illustrated in FIG. 24 is repeatedly executed when the wearable device 1 is mounted on the head or when the wearable device 1 is being operated.

As illustrated in FIG. 24, at Step S1201, the controller 22 of the wearable device 1 determines whether the upper limb is detected inside the imaging range R. Specifically, when the detector 44 detects the upper limb, the controller 22 determines that the upper limb is detected. When the upper limb is not detected (Step S1202: No), the controller 22 re-executes the processing of Step S1201.

When the upper limb is detected (Step S1202: Yes), the controller 22 proceeds to Step S1203. At Step S1203, the controller 22 activates the imagers 40 and 42. At Step S1204, the controller 22 causes the displays 32*a* and 32*b* to display the preview image 60.

At Step S1205, the controller 22 detects the size of the upper limb (or a predetermined region in the upper limb) in the captured image sequentially transmitted from the video data 70 of the imagers 40 and 42 (the video data 70 temporarily stored in the storage 24). The size of the upper limb (or a predetermined region in the upper limb) may be a ratio of the upper limb (or a predetermined region in the upper limb) to the entire region of the captured image.

At Step S1206, the controller 22 determines whether the size of the upper limb is changed based on a detection result of Step S1205. When it is determined that the size of the upper limb is not changed (Step S1206: No), the controller 22 proceeds to Step S1208 described later.

At Step S1206, when it is determined that the size of the upper limb is changed (Step S1206: Yes), then at Step S1207, the controller 22 sets the change rate based on the changed size of the upper limb. The controller 22 proceeds to Step S1208 after terminating the processing at Step S1207.

At Step S1208, the controller 22 determines whether a predetermined operation of the upper limb in the imaging range R is detected based on the video data 70 of the imagers 40 and 42. The predetermined operation is, for example, operation to bring the index finger and the thumb separated from each other (or close to each other), and operation to move the upper limb, which is determined at Step S1213 described later, does not correspond to the predetermined operation. When it is determined that the predetermined operation of the upper limb is not detected (Step S1208: No), the controller 22 proceeds to Step S1213 described later.

At Step S1208, when it is determined that the predetermined operation of the upper limb is detected (Step S1208: Yes), then at Step S1209, the controller 22 detects the position of the upper limb in the imaging range R based on the video data 70 of the imagers 40 and 42.

At Step S1210, the controller 22 determines whether the position of the upper limb detected at Step S1209 is a position superposed on the preview image 60 inside the imaging range R. When it is determined that the position of the upper limb is a position superposed on the preview image 60 (Step S1210: Yes), the controller 22 proceeds to Step S1211. At Step S1211, the controller 22 changes the size of the preview image 60 (performs the enlargement and reduction processing). The enlargement and reduction processing of the preview image 60 is executed based on the change rate (enlargement and reduction rate) set at Step S1207. The controller 22 proceeds to Step S1213 described later after terminating the processing at Step S1211.

Meanwhile, at Step S1210, when it is determined that the position of the upper limb is not a position superposed on the preview image 60 (Step S1210: No), the controller 22 proceeds to Step S1212. At Step S1212, the controller 22 executes the zoom processing by the imagers 40 and 42. The zoom processing is executed based on the change rate (zoom rate) set at Step S1207. The controller 22 proceeds to Step S1213 after terminating the processing at Step S1212.

At Step S1213, the controller 22 detects the movement of the upper limb inside the imaging range R based on the video data 70 of the imagers 40 and 42. At Step S1214, the controller 22 determines whether the upper limb is moved from the inside to the outside of the imaging range R based on a detection result of Step S1213. Specifically, the controller 22 determines that the upper limb is moved to the outside of the imaging range R when it is detected that the entire upper limb is moved to the outside of the imaging range R so that the upper limb does not appear in the captured image. When it is determined that the upper limb is not moved to the outside of the imaging range R (Step S1214: No), the controller 22 re-executes the processing of Step S1213 and subsequent steps.

When it is determined that the upper limb is moved to the outside of the imaging range R (Step S1214: Yes), the controller 22 proceeds to Step S1215. At Step S1215, the controller 22 acquires the captured image. Specifically, the controller 22 causes the imagers 40 and 42 to image the foreground 100 at a preset focal point, acquires the captured image 71, and stores the acquired captured image 71 in the storage 24 as the imaged data 24b. After that, at Step S1216, the controller 22 stops the imagers 40 and 42. When the imagers 40 and 42 are stopped, the controller 22 terminates the processing procedure illustrated in FIG. 24.

Figure 25:
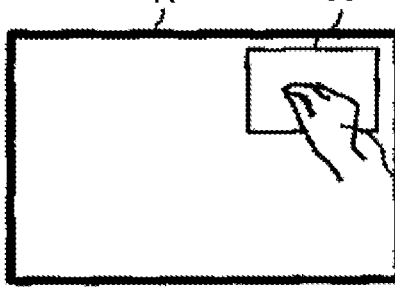
FIG. 25 is a diagram for describing another example of the control provided by the control program of the wearable device.
Figure 25:
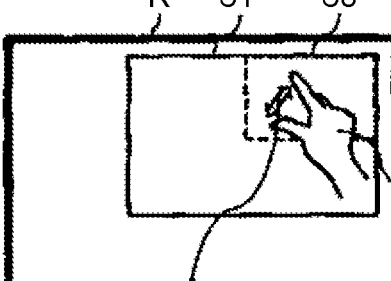
Figure 25:
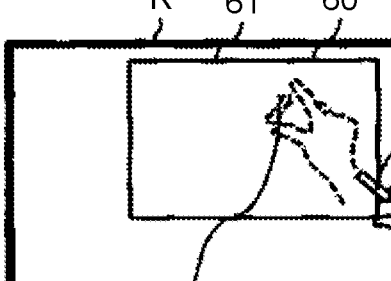

Another example of the control provided by the control program 24a will be described with reference to FIG. 25. FIG. 25 is another example of the control provided by the control program 24a of the wearable device 1. FIG. 25 is an example of the control to perform the enlargement and reduction processing of the preview image by the wearable device 1, similar to the case of FIG. 20.

At Step S160 illustrated in FIG. 25, the user moves the right hand H to the position superposed on the preview image 60 as viewed from the user, in the imaging range R viewed through the displays 32a and 32b. At this time, the right hand H of the user is in a state in which the ball of the index finger and the ball of the thumb are in contact with each other (or they pinch with each other). At Step S160, entry of the right hand H into the imaging range R is detected by the detector 44, and the imagers 40 and 42 are the imaging standby state. At this time, the wearable device 1 temporarily stores, in the storage 24, the video data 70 sequentially transmitted from the imagers 40 and 42 in the imaging standby state.

At Step S161, the user performs the operation to separate the index finger and the thumb in the state in which the right hand H is superposed on the preview image 60. Then, the wearable device 1 enlarges the preview image 60 upon detection of the operation to separate the index finger and the thumb. At this time, the wearable device 1 detects a direction (first direction T1) in which the index finger and the thumb are separated, and temporarily stores the direction T1. The first direction T1 may be a direction in which the index finger is separated from the thumb, or may be a direction in which the thumb is separated from the index finger.

Subsequently, at Step S262, the user moves the upper limb in a second direction T2 intersecting with the first direction T1 by a predetermined angle or more (the second direction T2 is a direction approximately perpendicular to the first direction T1 at Step S62). At this time, the wearable device 1 detects that the upper limb is moved in the second direction T2. The wearable device 1 then determines that the operation to separate the index finger and the thumb is completed upon detection of the movement of the upper limb in the second direction T2.

With such a configuration, the wearable device 1 can complete the enlargement and reduction operation based on the operation (the movement of the upper limb in the second direction) that is less likely to interact with the operation (the operation to separate the index finger and the thumb in the first direction) involved in the enlargement and reduction operation of an image. Therefore, the operation is not burdensome and the wearable device 1 becomes easy to use.

Various modifications are described below.

In the above described embodiments, the operation to perform the enlargement and reduction of the image and the operation to complete the enlargement and reduction of the image are distinguished by the operations for different directions from each other. However, embodiments are not limited thereto.

Figure 26:
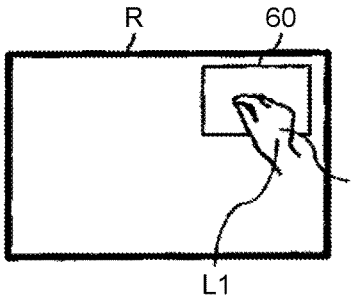
FIG. 26 is a diagram for describing another example of the control provided by the control program of the wearable device.
Figure 26:
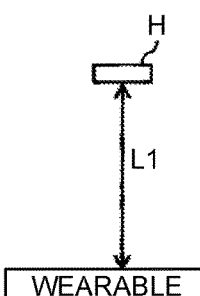
Figure 26:
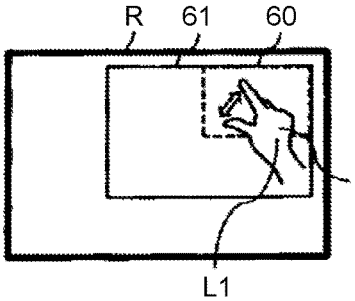
Figure 26:
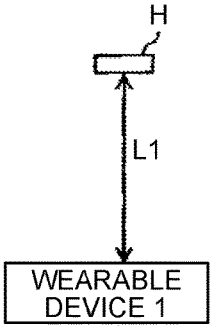
Figure 26:
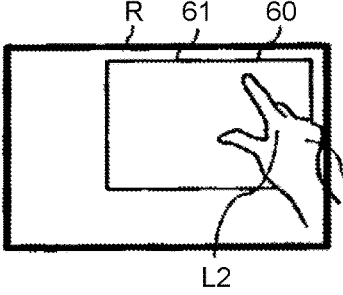
Figure 26:
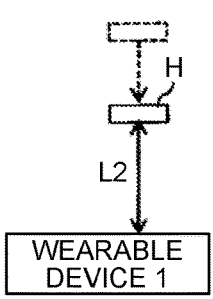

Another example of the control provided by the control program 24a will be described with reference to FIG. 26. FIG. 26 is another example of the control provided by the control program 24a of the wearable device 1. FIG. 26 is an example of control to perform the enlargement and reduction processing of the preview image by the wearable device 1, similar to the case of FIG. 20. In the example illustrated in FIG. 26, display contents (display contents in a region superposed on the imaging range R in the display region) of the displays 32a and 32b, and the distance L between the wearable device 1 and the upper limb are illustrated for each step. The distance L between the wearable device 1 and the upper limb in the front and back direction of the user is detected by the distance-measuring unit 46.

At Step S170, the user moves the right hand H to the position superposed on the preview image 60 as viewed from the user, in the imaging range R viewed through the displays 32a and 32b. At this time, the right hand H of the user is in a state in which the ball of the index finger and the ball of the thumb are in contact with each other (or they pinch with each other). At Step S170, the wearable device 1 detects entry of the right hand H into the imaging range R by the detector 44, and transfers the imagers 40 and 42 to the imaging standby state. At this time, the wearable device 1 temporarily stores, in the storage 24, the video data 70 sequentially transmitted from the imagers 40 and 42 in the imaging standby state. At Step S170, the distance between the wearable device 1 and the upper limb (right hand H) is a distance L1.

At Step S171, the user performs the operation to separate the index finger and the thumb in the state where the right hand H is superposed on the preview image 60. At Step S171, the wearable device 1 enlarges the preview image 60 to the preview image 61 upon detection of the operation to separate the index finger and the thumb. At Step S171, the distance between the wearable device 1 and the upper limb (right hand H) is the distance L1, similarly to Step S170.

At Step S172, the user moves the right hand H closer to the user compared with the case of Step S171. The distance between the wearable device 1 and the upper limb (right hand H) is a distance L2 smaller than the distance L1. In this state, the wearable device 1 does not execute the enlargement and reduction processing of the preview image 60 even if the predetermined operation (the operation to separate the index finger and the thumb) is performed.

In this way, according to the configuration of the example illustrated in FIG. 26 and the like, the wearable device 1 distinctively detects the first state and the second state having the different distances L between the wearable device and the upper limb (predetermined object) in the front and back direction of the user. In the first state (state with the distance L1), the wearable device 1 enables the execution of predetermined processing (processing of enlarging and reducing the preview image 60 by the operation to bring the index finger and the thumb separated from each other (or close to each other)) for the preview image 60 (object). Meanwhile, the wearable device 1 disables the execution of this processing in the second state (state with the distance L2).

With such a configuration, the wearable device 1 can complete the enlargement and reduction operation by another operation (the operation to move the upper limb in the direction approaching the wearable device 1 or the direction departing from the wearable device 1) which is distinguished from the operation of the finger involved in the enlargement and reduction operation of an image. Therefore, the operation is not burdensome, and the wearable device becomes easy to use.

In the example illustrated in FIG. 26 and the like, a configuration to estimate the distance between the wearable device and the upper limb (predetermined object) based on the size of the upper limb in the captured image by the imagers 40 and 42 may be employed, in place of the detection of the distance L by the distance-measuring unit 46, for distinguishing the first state and the second state having different distances L between the wearable device and the upper limb (predetermined object).

Then, in the example illustrated in FIG. 26 and the like, the enlargement and reduction processing of the image is exemplified as the predetermined processing. However, embodiments are not limited thereto, and another processing may be applied. For example, the predetermined processing for an object may be processing of performing a drag operation of an object. An example of this case will be described with reference to the schematic diagram of the distance between the wearable device 1 and the upper limb in FIG. 26. Assume that the wearable device 1 is in a non-executable state of the drag operation, in the state where the distance L between the wearable device 1 and the upper limb is the predetermined distance L2. When the user performs the operation to move the upper limb in the direction away from the wearable device 1 (an operation to push the upper limb in depth), the distance L becomes the distance L1 larger than the distance L2, thereby the wearable device 1 may be in an executable state of the drag operation. Thereby, when the user performs the operation to push the upper limb in depth, the drag operation can be performed, and the object can be dropped (the selection state can be canceled) by performing an operation to pull the upper limb at a position desired by the user. In the drag operation, the object is considered to be selected when the upper limb is superposed on the display position of the object for a predetermined time or more, and the drug operation includes an operation to move the display position of the object according to the movement of the position of the upper limb in a state in which the object is selected.

In the above described embodiments, a configuration in which the wearable device 1 changes the enlargement and reduction rate (change rate) in the enlargement and reduction processing (change processing) of an image or the size of an icon to be displayed, based on the size of the upper limb (or the distance between the wearable device 1 and the upper limb) in the captured image is described. However, embodiments are not limited thereto.

Figure 27:
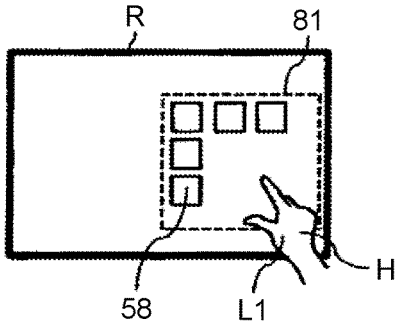
FIG. 27 is a diagram for describing another example of the control provided by the control program of the wearable device.
Figure 27:
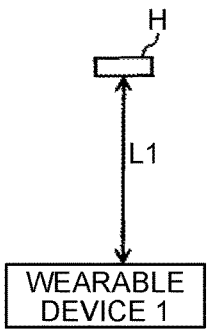
Figure 27:
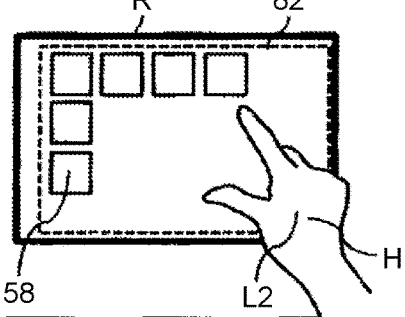
Figure 27:
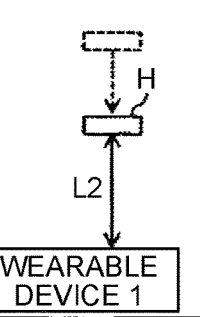

Another example of the control provided by the control program 24a will be described with reference to FIG. 27. FIG. 27 is another example of the control provided by the control program 24a of the wearable device 1. FIG. 27 is an example of control to change a display region of the wearable device 1. In the example illustrated in FIG. 27, display contents (display contents in a region superposed on the imaging range R in the display region) of the displays 32a and 32b, and the distance L between the wearable device 1 and the upper limb are illustrated for each step. The distance L between the wearable device 1 and the upper limb in the front and back direction of the user is detected by the distance-measuring unit 46.

At Step S180, the upper limb (right hand H) exists in the position of the distance L1 in front of the wearable device 1. At this time, in the wearable device 1, an applied display region of the displays 32a and 32b is a region 81, according to the distance L1 between the wearable device 1 and the upper limb. The applied display region is a region including the position of the upper limb inside the imaging range R based on the position of the upper limb. An icon group 58 for executing predetermined processing by superposing the upper limb (right hand H) thereon is displayed inside the region 81.

At Step S181, the user moves the upper limb (right hand H) close to the user compared to the case of Step S180. The distance between the wearable device 1 and the upper limb (right hand H) becomes the distance L2 smaller than the distance L1. At this time, the size of the upper limb (right hand H) viewed by the user through the displays 32a and 32b is larger than that of the case of Step S180. In the wearable device 1, an applied display region of the displays 32a and 32b becomes a region 82 larger than the region 81, depending on the distance L2 between the wearable device 1 and the upper limb (depending on viewing the larger upper limb (right hand H)). An icon group 58 for executing the predetermined processing by superposing the upper limb (right hand H) thereon is displayed inside the region 82.

In this way, the wearable device 1 estimates the change of the size of the upper limb (right hand H) viewed by the user through the displays 32a and 32b based on the change of the distance L between the wearable device 1 and the upper limb, and changes the size of the applied display region based on the estimated size. With such a configuration, an appropriate range can be set to the operation region depending on the size of the upper limb (right hand H), for performing an operation by superposing the upper limb (right hand H) on a predetermined position in the display region of the displays 32a and 32b. Therefore, the operation can be performed without moving the upper limb (right hand H) widely.

In the example illustrated in FIG. 27, the wearable device 1 may be configured to change the size of the applied display region based on the size of the upper limb in the captured image by the imagers 40 and 42, in place of the detection of the distance L by the distance-measuring unit 46.

In the above described embodiments, a case in which the change processing is the enlargement and reduction processing or the zoom processing of the display image is exemplified. However, embodiments are not limited thereto. For example, the change processing may be processing using a change bar having a rod-like operation region. For example, the change bar includes a change bar for changing the sound volume in playback of music during activation of a music playback application, and a seek bar for displaying a playback portion of data and changing the playback portion with a predetermined operation during activation of a moving image playback application, and the like. For example, the change processing may display a change bar having a first length on the displays 32a and 32b when the size of the upper limb detected in the captured image (the ratio of the region of the upper limb to the entire captured image) is a predetermined value or more, and display a change bar having a second length smaller than the first length on the displays 32a and 32b when the size of the upper limb detected in the captured image is less than the predetermined value. With such a configuration, in sliding a slider (for example, a knob-like operation part) displayed on the change bar, based on the movement of the position of the upper limb, the slider can be slid in a range suitable for a movable range of the upper limb. For example, when the size of the upper limb (right hand H) viewed by the user through the displays 32a and 32b is unreasonably large, the slider is moved by an unreasonably large distance by a slight operation of the upper limb (slight movement of the position of the upper limb). However, in the wearable device 1 according to the present embodiment, such a situation is hardly to occur.

The "change processing" in the above described embodiments is processing of changing a physical amount, a set value, a parameter, or a sensory amount felt by the user, which is changed in a continuous or stepwise manner, in execution of a predetermined function. For example, objects of the change processing include a correction value in exposure compensation, ISO sensitivity, white balance, shutter speed, aperture, depth of field, focal length and zoom rate for an imaging function, sound volume in playback of music, a playback portion in playback of moving image or the like, sound collection level of a microphone or the like, size of a display image, a display position, and enlargement and reduction rate in enlargement and reduction operation of a display image.

Then, another example of the control provided by the control program 24a will be described with reference to FIG. 28. FIG. 28 is a diagram for describing another example of the control provided by the control program 24a of the wearable device 1.

At Step S230 illustrated in FIG. 28, when entry of the right hand H into the imaging range R is detected by the detector 44, the wearable device 1 transfers the imagers 40 and 42 to the imaging standby state. The wearable device 1 causes the displays 32a and 32b to display icons 65 and 66 to be positioned inside the imaging range R. The icon 65 is one of imaging functions, for example. The icon 65 is a display image indicating a function to change ISO sensitivity. The icon 66 is one of the imaging functions, for example. The icon 66 is a display image indicating a function to change a correction value in exposure compensation. In the present embodiment, a case in which the wearable device 1 displays the icons 65 and 66 inside the imaging range R is described. However, the icons 65 and 66 may be displayed outside the imaging range R. The wearable device 1 temporarily stores, in the storage 24, the video data 70 sequentially transmitted from the imagers 40 and 42 in the imaging standby state.

At Step S230, when the user moves the right hand H from the outside to the inside of the imaging range R of the imagers 40 and 42, the user views the icons 65 and 66 on the displays 32a and 32b, and views the foreground 100 and the right hand H through the displays 32a and 32b. The user views the icons 65 and 66, thereby to recognize that the wearable device 1 can perform imaging.

At Step S230, the user stretches the index finger of the right hand H. The stretching of the finger means that the finger is in a predetermined state. Then, for example, when only the index finger is stretched as illustrated in Step S230, a predetermined region of the index finger may be caused to function as a pointer capable of specifying a predetermined position of the display region of the displays 32a and 32b. The predetermined region of the index finger may be defined as a portion closer to the fingertip than to the first joint in the index finger, or as a nail of the index finger of the right hand H, for example.

At Step S230, the user superposes the predetermined region of the index finger on the icon 65 in the display region of the displays 32a and 32b. The user views that the predetermined region of the index finger is superposed on the icon 65 inside the imaging range R. At this time, the wearable device 1 has the imaging range R and the display region of the displays 32a and 32b approximately matched. Therefore, the wearable device 1 recognizes that the user views the superposition of the predetermined region of the index finger and the icon 65. The wearable device 1 causes the icon 65 to be a selected state based on the superposition of the predetermined region of the index finger and the icon 65. The wearable device 1 may be configured to select the icon 65 based on the superposition of the predetermined region of the index finger and the icon 65 for a predetermined time or more. When the icon 65 is in the selected state, the wearable device 1 proceeds to Step S231.

At Step S231, the wearable device 1 displays a list 67 as a new display image based on the selection of the icon 65. The list 67 is a list of set values based on display content of the icon 65 (for a function of changing ISO sensitivity). Although described later, types of the set values are defined to five or less types so that each of the types can be selected according to the number of stretched fingers. In the example of Step S231, the set values are defined to be four types. Each of the set values is numbered. The list 67 is not necessarily configured to number each of the set values. At Step S231, similarly to Step S232, the first set value (400) (in the top row), among the four types of the set values, is set based on the fact that the number of fingers in a predetermined state (stretched state) is 1 (only the index finger). At Step S231, the list 67 is displayed on a position superposed on the icon 66 at Step S230. However, the list 67 may be displayed on another position.

Subsequently, as illustrated in Step S232, assume that the user stretches the middle finger and the ring finger, in addition to the index finger. Then, the third set value (1600), of the four types of the set values, is set based on the fact that the number of fingers in a predetermined state (stretched state) is changed to three.

Subsequently, as illustrated in Step S233, the user moves the right hand H from the inside to the outside of the imaging range R. At this time, the user moves the right hand H without changing the number of the stretched fingers. When the wearable device 1 determines that the right hand H is moved from the inside to the outside of the imaging range R based on the detection result of the detector 44, the wearable device 1 transfers the imagers 40 and 42 to the imaging state to image the foreground 100. The imagers 40 and 42 image the foreground 100 at the ISO sensitivity (1600) set at Step S32. The wearable device 1 acquires the captured image 71 by the imagers 40 and 42, and stores the captured image 71 in the storage 24 as the imaged data 24b. After that, the wearable device 1 stops the imagers 40 and 42, and transfers the imagers 40 and 42 to the non-activated state.

As described above, the controller 22 of the wearable device 1 detects the number of fingers (stretched fingers) in a predetermined state in the upper limb from the detection result of the imagers 40 and 42 as the detector 44, and executes the change processing for a predetermined function (change processing of the ISO sensitivity for the imaging function in the above example) based on the number of fingers. With the configuration, the wearable device 1 can perform an operation with a simple and intuitive operation. The change processing may be any processing capable of changing a predetermined set value for execution contents of a predetermined function, in place of the ISO sensitivity.

In the above described embodiments, a configuration to specify a predetermined position of a display region based on a position of a predetermined region of the index finger inside the imaging range R is described. However, embodiments are not limited thereto. For example, a configuration to specify a predetermined position of a display region based on a position of a predetermined region of the index finger inside the detection range of the detector 44, other than the imagers 40 and 42 (a configuration to cause a position of a predetermined region of the index finger to function as a pointer) may be employed.

Figure 29:
FIG. 29 is a diagram for describing another example of the control provided by the control program of the wearable device.

Then, another example of the control provided by the control program 24a will be described with reference to FIG. 29. FIG. 29 is a diagram for describing another example of the control provided by the control program 24a of the wearable device 1.

At Step S240 illustrated in FIG. 29, when entry of the right hand H into the imaging range R is detected by the detector 44, the wearable device 1 transfers the imagers 40 and 42 to the imaging standby state. The wearable device 1 causes the displays 32a and 32b to display the icons 65 and 66, similarly to the example illustrated in FIG. 28. The wearable device 1 temporarily stores, in the storage 24, the video data 70 sequentially transmitted from the imagers 40 and 42 in the imaging standby state. The user views the icons 65 and 66 on the displays 32a and 32b, and views the foreground 100 and the right hand H through the displays 32a and 32b.

At Step S240, the user stretches the index finger of the right hand H. Then, assume that a predetermined region of the index finger (a portion closer to the fingertip than to the first joint in the index finger) is caused to function as a pointer capable of specifying a predetermined position of the display region of the displays 32a and 32b.

At Step S240, the user superposes the predetermined region of the index finger on the display region of the icon 65 on the displays 32a and 32b. The wearable device 1 recognizes that the user views the superposition of the predetermined region of the index finger and the icon 65, and causes the change processing for a function based on the icon 65 to be an executable state upon the recognition.

At Step S241, the wearable device 1 displays a list 67 of set values based on display content of the icon 65 (for a function of changing ISO sensitivity), similarly to the example illustrated in FIG. 28. The list 67 is defined to include five or less types so that each of the types can be selected according to the number of stretched fingers. The user stretches the middle finger and the ring finger, in addition to the index finger in the state where the predetermined region of the index finger is superposed on the display region of the icon 65 on the displays 32a and 32b (the state in which the change processing based on the icon 65 is executable). Then, the wearable device 1 selects the third set value (1600), among the four types of the set values, based on the fact that the number of fingers in a predetermined state (stretched state) is changed to three.

At Steps S240 and S241, the controller 22 of the wearable device 1 determines whether the predetermined region of the index finger is included in a real first predetermined space, by the captured image by the imagers 40 and 42. The first predetermined space is a space viewed by the user through the displays 32a and 32b, on which the icon 65 being superposed. In other words, the controller 22 of the wearable device 1 determines whether the user views superposition of the predetermined region of the index finger and the display region of the icon 65. When the wearable device 1 determines that the predetermined region of the index finger is included in the first predetermined space, that is, when the wearable device 1 determines that the user views the superposition of the predetermined region of the index finger and the display region of the icon 65, the wearable device 1 causes the change processing to be executable, similarly to the example illustrated in FIG. 28.

Subsequently, at Step S242, the user superposes the predetermined region of the index finger on a display region of the icon 66. At this time, the controller 22 of the wearable device 1 determines that the predetermined region of the index finger exists in the space (first predetermined space) viewed by the user through the displays 32a and 32b with the icon 66 superposed thereon. The controller 22 then causes the change processing to be executable. At Step S242, the wearable device 1 displays a list 68 of set values based on display contents of the icon 66 (exposure compensation function). In the example illustrated in Step S242, the controller 22 sets the fourth set value (+1), among five types of the set values for the exposure compensation in the list 68, based on the fact that the number of fingers in a predetermined state (stretched state) is four.

As described above, the controller 22 of the wearable device 1 determines whether the predetermined portion of the upper limb is included in the real first predetermined space, and allows execution of the change processing when it is determined that the predetermined portion of the upper limb is included in the real first predetermined space. With the configuration, the change processing is not performed unless the user intentionally positions the predetermined portion of the upper limb in the first predetermined space, and thus erroneous operations can be reduced.

In the example, a configuration in which the wearable device 1 detects the position of the upper limb (or a predetermined region of the upper limb) in the real space from the captured image by the imagers 40 and 42 is described. However, embodiments are not limited thereto. For example, in the wearable device 1, the position of the upper limb in the real space may be detected by the detector 44 other than the imagers 40 and 42. At this time, for example, a space in front of the user is defined by a three-dimensional coordinate system, using the forward direction as a z axis, and the position (x, y) of the upper limb in the space is detected and is associated with a predetermined position in the display region, so that the predetermined position in the display region of the displays 32*a* and 32*b* can be specified according to the position of the upper limb.

Figure 30:
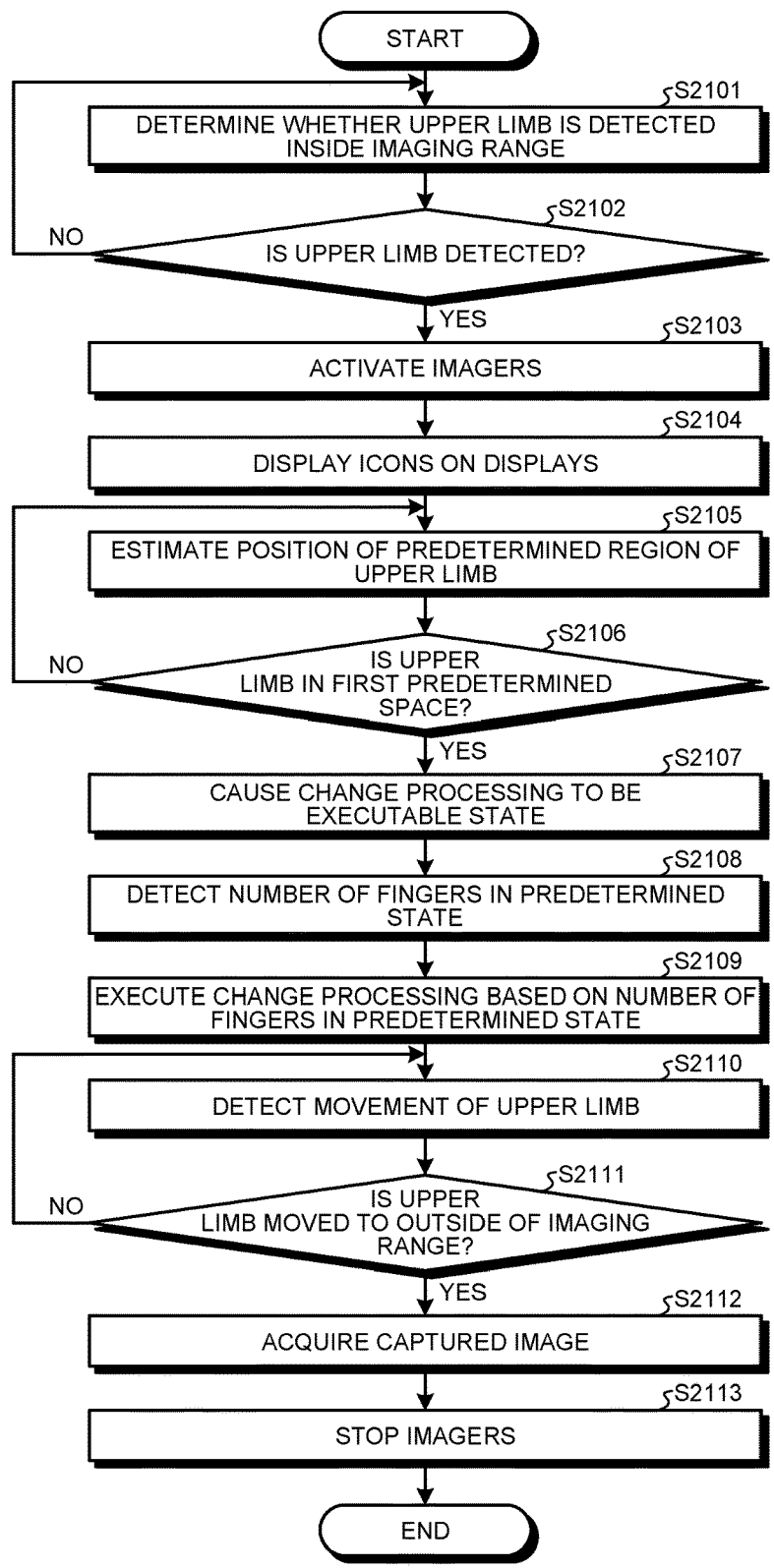
FIG. 30 is a flowchart illustrating a processing procedure according to imaging control by the wearable device.

An example of a processing procedure of control by the wearable device 1 will be described with reference to FIG. 30. FIG. 30 is a flowchart illustrating a processing procedure according to imaging control by the wearable device 1. The processing procedure illustrated in FIG. 30 is realized when the controller 22 executes the control program 24*a*. The processing procedure illustrated in FIG. 30 is repeatedly executed when the wearable device 1 is mounted on the head or when the wearable device 1 is being operated.

As illustrated in FIG. 30, at Step S2101, the controller 22 of the wearable device 1 determines whether the upper limb is detected inside the imaging range R. Specifically, when the detector 44 detects the upper limb, the controller 22 determines that the upper limb is detected. When it is determined that the upper limb is not detected (Step S2102: No), the controller 22 re-executes the processing of Step S2101.

When it is determined that the upper limb is detected (Step S2102: Yes), the controller 22 proceeds to Step S2103. At Step S2103, the controller 22 activates the imagers 40 and 42. At Step S2104, the controller 22 causes the displays 32*a* and 32*b* to display the icons 65 and 66.

At Step S2105, the controller 22 estimates the position of the predetermined region of the upper limb in the real space from the captured image sequentially transmitted from the video data 70 of the imagers 40 and 42. Subsequently, at Step S2106, the controller 22 determines whether the predetermined region of the upper limb is included in the real first predetermined space based on the position of the upper limb estimated at Step S2105. In other words, the controller 22 determines whether the user views superposition of the predetermined region of the index finger and the display region of the icon 65.

When it is determined that the upper limb is included in the first predetermined space (Step S2106: Yes), the controller 22 proceeds to Step S2107. On the other hand, when it is determined that the upper limb is not included in the first predetermined space (Step S2106: No), the controller 22 re-executes the processing of Step S2105.

At Step S2107, the controller 22 causes the change processing to be an executable state. In this case, the controller 22 causes the displays 32*a* and 32*b* to display the list 67 of set values.

At Step S2108, the controller 22 detects the number of fingers in a predetermined state. At Step S2109, the controller 22 executes the change processing based on the number of fingers in a predetermined state. Specifically, the controller 22 changes the set value for the imaging function to a set value based on the number of fingers in a predetermined state.

At Step S2110, the controller 22 detects the movement of the upper limb inside the imaging range R based on the video data 70 of the imagers 40 and 42. At Step S2111, the controller 22 determines whether the upper limb is moved from the inside to the outside of the imaging range R based on a detection result of Step S2110. Specifically, the controller 22 determines that the upper limb is moved to the outside of the imaging range R when it is determined that the entire upper limb is moved to the outside of the imaging range R so that the upper limb does not appear in the captured image. When it is determined that the upper limb is not moved to the outside of the imaging range R (Step S2111: No), the controller 22 re-executes the processing of Step S2110 and subsequent steps.

When it is determined that the upper limb is move to the outside of the imaging range R (Step S2111: Yes), the controller 22 proceeds to Step S2112. At Step S2112, the controller 22 acquires the captured image. Specifically, the controller 22 causes the imagers 40 and 42 to image the foreground 100 at the set value set at Step S2109, acquires the captured image 71, and stores the acquired captured image 71 in the storage 24 as the imaged data 24*b*. After that, at Step S2113, the controller 22 stops the imagers 40 and 42. When the imagers 40 and 42 are stopped, the controller 22 terminates the processing procedure illustrated in FIG. 30.

In the example illustrated in FIGS. 28 and 29, a configuration in which the wearable device 1 causes the change processing to be executable upon the superposition of the predetermined portion of the upper limb and the icon 65 for the imaging function (or the icon 66) is described. However, embodiments are not limited thereto. For example, the wearable device 1 may execute the change processing based on the number of fingers in a predetermined state at entry upon the entry of the predetermined portion of the upper limb into the imaging range R (or into the detection range of the detector 44). With the configuration, when a function to be changed is determined in advance and known by the user, the user can perform the operation without the need to confirm the display image and the like. The change processing is not limited to the processing for the imaging function. For example, when the wearable device 1 displays a predetermined display image, the display image may be enlarged and reduced based on the number of fingers in a predetermined state, as the change processing. In a case where the display image includes text information and a photograph (or an image diagram), a configuration to enlarge only the text information based on the number of fingers in a predetermined state or a configuration to enlarge only the photograph based on the number of fingers in a predetermined state may be employed. In a case where the stretched finger is caused to function as a pointer, and the predetermined position of the display region of the displays 32*a* and 32*b* is specifiable according to the position of the predetermined region of the stretched finger in the real space (or the position of the predetermined region of the stretched finger in the captured image), only a predetermined display region including the specified position may be able to be enlarged and reduced.

The change processing may be processing of changing sound volume in playback of music based on the number of stretched fingers, during activation of a playback application for music.

The change processing may be processing of changing a playback portion of data based on the number of stretched fingers, during activation of a playback application for a moving image.

In the above described embodiments, a configuration to detect the number of stretched fingers, as the finger in a predetermined state, is described. However, embodiments are not limited thereto. For example, a bent state of a finger may be employed as the predetermined state. The bent finger may be a finger with a joint (any joint of the first to third joints) thereof being bent by a predetermined angle or more (on the other hand, when the joint of the finger is bent only by less than the predetermined angle, the finger may be considered to be stretched). The finger may be considered to be in a predetermined state when the bent state of the finger continues for a predetermined time or more, or the finger may be considered to be in a predetermined state upon a transition from the stretched state of the finger to the bent state of the finger.

When the entry of the predetermined portion of the upper limb into the imaging range R (or into the detection range of the detectors 44) is detected, the wearable device 1 may not execute the change processing based on the number of fingers in a predetermined state at the time of the detection (at the time of the entry of the upper limb). For example, the wearable device 1 may have a configuration in which the controller 22 determines whether the predetermined portion of the upper limb enters the real second predetermined space (imaging range R), and when it is determined that the predetermined portion of the upper limb enters the real second predetermined space, the wearable device 1 does not execute the change processing based on the number of fingers in a predetermined state at a time of the entry. In this case, unexpected change processing at a time of the entry of the upper limb into the imaging range R by the user can be avoided.

When the stretched fingers are a plurality of fingers, of five fingers, the wearable device 1 determines whether the combination of the plurality of fingers is a predetermined combination, and may execute another processing in place of the change processing based on the number of fingers in a predetermined state, when the combination is the predetermined combination.

When the stretched fingers are a plurality of fingers of five fingers, the wearable device 1 determines whether the combination of the plurality of fingers is a predetermined combination. And when the combination is the predetermined combination, the wearable device 1 determines whether the stretched fingers perform a predetermined operation within a first predetermined time. And when the stretched fingers perform the predetermined operation, the wearable device 1 may execute processing based on the predetermined operation in place of the change processing based on the number of fingers in a predetermined state.

For example, when the stretched fingers/thumb are the index finger and the thumb, enlargement and reduction processing of the display image or the like may be performed by the user by performing an operation to bring the index finger and the thumb separated from or close to each other, as another processing, instead of performing the change processing based on the fact that the number of stretched fingers is two.

For example, when it is detected that the stretched fingers/thumb are the index finger and the thumb, whether operation to bring a predetermined portion of the index finger and a predetermined portion of the thumb separated from each other or close to each other is performed as the predetermined operation of the index finger and the thumb within a first predetermined time from the time of the detection is determined. And when it is determined that the operation is performed, another processing based on the operation (enlargement and reduction processing of the display image, or the like) may be performed. When the operation to bring a predetermined portion of the index finger and a predetermined portion of the thumb separated from each other or close to each other is not performed within the first predetermined time from the time of the detection that the stretched fingers are the index finger and the thumb, the change processing based on the number of the stretched fingers may be executed.

When the number of stretched fingers and the position of the upper limb in the real space are not changed for a predetermined time or more, the controller 22 of the wearable device 1 may execute the change processing. With the configuration, the change processing is not performed in a case where the user unintentionally performs a stretch operation of the finger, in a case the user unintentionally stops the position of the upper limb. Therefore, a possibility of erroneous operation can be decreased.

The controller 22 of the wearable device 1 may cause the change processing to be executable upon the stretch operation of the finger in the upper limb, and may execute the change processing upon further stretch operation of the finger in the upper limb when the change processing is in the executable state. With the configuration, for example, even if the user performs the stretch operation of the finger (the first stretch operation) as an operation for causing the wearable device 1 to execute the change processing, the change processing is not performed with the operation, and the change processing is performed with the next stretch operation. Therefore, unexpected change processing with the first stretch operation can be avoided.

In the above described embodiments, a configuration to execute the processing of acquiring the captured image upon the movement of the upper limb from the inside to the outside of the imaging range R is described. When the number of stretched fingers is changed due to the movement of the upper limb from the inside to the outside of the imaging range R, the controller 22 may not execute the change processing based on the changed number of fingers. Specifically, when a part of the upper limb (the right hand H or the like) exists outside the imaging range R due to the movement of the upper limb from the inside to the outside of the imaging range R and the number of the stretched fingers is changed, the change processing based on the change is not executed. That is, the number of the stretched fingers in a state where the upper limb (right hand H or the like) exists inside the imaging range R is stored, and the change processing is executed based on the stored number, after the upper limb (right hand H or the like) is moved to the outside of the imaging range R.

In the above described embodiments, a configuration to divide the set values into five stages (five types) according to the fact that the number of fingers that can take a predetermined state is 1 to 5 in one hand (right hand H) is described. However, embodiments are not limited thereto. For example, the set values may be divided into ten stages (or six to nine stages), and the change processing may be performed based on the number of fingers in a predetermined state in both hands.

In the above described embodiments, a configuration to divide the set values into five stages according to the fact that the number of fingers that can take the predetermined state is 1 to 5 in one hand (right hand H) is described. However, embodiments are not limited thereto. For example, the set values may be divided into four states, and when the number of fingers in a predetermined state is any of 2 to 5, the set value may be changed to any of the four stages based on the number. In this case, when the number of fingers in a predetermined state is 1, the finger may be caused to function as a pointer for specifying a predetermined position of the display region of the displays 32a and 32b based on the movement of the finger.

In the above described embodiments, an example in which a larger set value is set as the number of fingers in a predetermined state becomes larger, that is, magnitude of the number of fingers in a predetermined state and magnitude of the set value are associated with each other, is described. However, embodiments are not limited thereto. A configuration to set a smaller set value as the number of fingers in a predetermined state becomes larger may be employed. The magnitude of the number of fingers in a predetermined state and the magnitude of the set value are not associated, and the set value and the number of fingers may be randomly associated with each other.

In the above described embodiments, the wearable device 1 may cause the change processing based on the number of fingers in a predetermined state to be inexecutable, when the size of the predetermined region of the predetermined object (upper limb) in the captured image is a predetermined size or more. For example, when the upper limb is detected in the captured image with an unreasonably large size by an action different from an operation, such as by touching the wearable device 1 by the user, for example, the wearable device 1 does not perform the change processing and thus does not bother the user.

When the distance between the wearable device and a predetermined object (upper limb) existing in a real space in the front and back direction of the user, the distance being calculated from the detection result of the distance-measuring unit 46, is a predetermined distance or less, the wearable device 1 may cause the change processing based on the number of fingers in a predetermined state to be inexecutable.

When the size of the predetermined region of the predetermined object (upper limb) in the captured image is less than a predetermined size, the controller 22 of the wearable device 1 may cause the change processing based on the number of fingers in a predetermined state to be inexecutable. For example, when the upper limb is detected in the captured image with an unreasonably small size, such as the upper limb being an upper limb of another person in front of the user, the wearable device 1 does not perform the change processing and thus does not bother the user.

When the distance between the wearable device and a predetermined object (upper limb) existing in a real space in the front and back direction of the user, the distance being calculated from the detection result of the distance-measuring unit 46, is a predetermined distance or more, the wearable device 1 may cause the change processing based on the number of fingers in a predetermined state to be inexecutable.

In the above described embodiments, an example in which the wearable device 1 has a glass shape is described. However, the shape of the wearable device 1 is not limited thereto. For example, the wearable device 1 may have a helmet-type shape that substantially covers the upper half of the head of the user. Alternatively, the wearable device 1 may have a mask-type shape that substantially covers the entire face of the user.

In the above described embodiments, a configuration in which the display includes a pair of the displays 32a and 32b provided in front of the right and left eyes of the user is exemplified. However, embodiments are not limited thereto, and the display may have a configuration including one display provide in front of one of the right and left eyes of the user.

In the above described embodiments, a configuration in which the edge portion of the front portion surrounds the entire periphery of the edge of the display region of the displays 32a and 32b is exemplified. However, embodiments are not limited thereto, and a configuration to surround only a part of the edge of the display region of the displays 32a and 32b may be employed.

In the above described embodiments, a configuration to detect the hand or the finger/thumb by the imagers (or the detector) as the upper limb of the user is described. However, the hand or the finger/thumb is similarly detectable even if a glove or the like is mounted on the hand or the finger.

Although the technology according to the appended claims has been described with respect to specific embodiments for a complete and clear disclosure, the appended claims are not to be limited but are to be construed as embodying all modifications and alternative constructions that may occur to one skilled in the art that fairly fall within the basic teaching set forth in the present specification.

The invention claimed is:

1. A wearable device mountable on a head, the wearable device comprising:
    at least one imager configured to capture scenery in front of a user;
    at least one controller configured to detect a shield in a captured image by the imager; and
    at least one display configured to be arranged in front of an eye or both eyes of the user, and configured to display the captured image,
    wherein
    the at least one controller is further configured to determine that the shield is moved from an inside to an outside of an imaging range of the imager and to execute acquisition of the captured image upon movement of the shield from the inside to the outside of the imaging range of the imager, and
    disappearance of the shield from the captured image, and
    the at least one controller is further configured to cause the imager
        to execute zoom processing based on a predetermined operation of the shield inside the imaging range, and
        not to execute the acquisition of the captured image when the shield disappears from the captured image by the zoom processing,
    the at least one controller is further configured to:
        estimate a locus of the movement of the shield in which the shield moves from the outside to the inside of the imaging range, then stops for a predetermined time and then moves from the inside to the outside of the imaging range, and
        set a starting point of the locus, at which the shield starts moving from the inside to the outside of the imaging range after stopping for the predetermined time, to a position to be focused in the acquisition of the captured image.

2. The wearable device according to claim 1, wherein
    the locus of the movement of the shield is a locus of the movement of an end portion of the shield, and
    the at least one controller is configured to estimate a change point of the locus of the end portion of the shield as the starting point of the locus before the shield moves to the outside of the imaging range.

3. The wearable device according to claim 1, further comprising:
    a detector configured to detect the shield which exists in front of the user, wherein
    the imager is further configured to enter an imaging standby state in which the imager waits for the acquisition of captured images, and to start capturing operation of the scenery upon detection of the shield which exists in front of the user.

4. The wearable device according to claim 1, wherein
    the at least one controller is further configured to change acquired contents of the captured image or processing contents for the acquired captured image based on a moving direction of the shield.

5. The wearable device according to claim 4, wherein, when the at least one controller starts acquisition of a moving image based on the moving direction of the shield, the at least one controller is further configured to stop or suspend the acquisition of the moving image upon the movement of the shield from the outside to the inside of the imaging range.

6. The wearable device according to claim 1, wherein the at least one controller is further configured to cause the imager to execute zoom processing based on a predetermined operation of the shield inside the imaging range.

7. The wearable device according to claim 6, wherein the at least one controller is further configured
to estimate a change of a distance between the wearable device and the shield, and
to change an enlargement and reduction rate of the imaging range depending on the change of the distance.

8. The wearable device according to claim 6, wherein the shield is an upper limb of the user, and
the at least one controller is further configured to cause the zoom processing to be an executable state upon formation of a predetermined shape of the upper limb.

9. The wearable device according to claim 8, wherein, when the at least one controller detects that a predetermined gesture is made while the upper limb forms the predetermined shape to cause the zoom processing to be the executable state, the at least one controller is further configured to change the enlargement and reduction rate of the imaging range depending on the gesture.

10. The wearable device according to claim 1, wherein the shield is either an upper limb of the user or a predetermined object held by the user.

11. The wearable device according to claim 1, wherein the shield is another electronic device mounted on an upper limb of the user.

12. A control method executed by a wearable device mountable on a head, the control method comprising:
capturing scenery in front of a user by at least one imager;
detecting a shield from a captured image by the imager;
displaying the captured image in at least one display arranged in front of an eye or both eyes of the user;
determining that the shield is moved from an inside to an outside of an imaging range of the imager and executing acquisition of the captured image upon
movement of the shield from the inside to the outside of the imaging range of the imager, and
disappearance of the shield from the captured image;
causing the imager
to execute zoom processing based on a predetermined operation of the shield inside the imaging range, and
not to execute the acquisition of the captured image when the shield disappears from the captured image by the zoom processing;
estimating a locus of the movement of the shield in which the shield moves from the outside to the inside of the imaging range, then stops for a predetermined time and moves from the inside to the outside of the imaging range; and
setting a starting point of the locus at which the shield starts moving from the inside to the outside of the imaging range after stopping for the predetermined time to a position to be focused in the acquisition of the captured image.

13. A wearable device mountable on a head, the wearable device comprising:
at least one imager configured to capture scenery in front of a user; and
at least one controller configured to detect a shield in a captured image by the imager, wherein
the at least one controller is further configured to execute acquisition of the captured image upon movement of the shield from an inside to an outside of an imaging range of the imager,
the at least one controller is further configured to:
estimate a locus of the movement of the shield in which the shield moves from the outside to the inside of the imaging range, then stops for a predetermined time and moves from the inside to the outside of the imaging range, and
set a starting point of the locus at which the shield starts moving from the inside to the outside of the imaging range after stopping for the predetermined time to a position to be focused in the acquisition of the captured image,
the locus of the movement of the shield is a locus of the movement of an end portion of the shield, and
the at least one controller is configured to estimate a change point of the locus of the end portion of the shield as the starting point of the locus before the shield moves to the outside of the imaging range.

* * * * *